(12) United States Patent
Maffezzoni et al.

(10) Patent No.: US 6,532,535 B1
(45) Date of Patent: Mar. 11, 2003

(54) METHOD FOR MANAGING PRIMARY AND SECONDARY STORAGE DEVICES IN AN INTELLIGENT BACKUP AND RESTORING SYSTEM

(75) Inventors: Guido Maffezzoni, San Jose, CA (US); David A. Coleman, Silverdale, WA (US); Michael M. Goshey, San Jose, CA (US); Robert S. Hudson, San Jose, CA (US); Yafu J. Ding, Milpitas, CA (US); Gilbert Chang-Tying Wu, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/256,687

(22) Filed: Feb. 23, 1999

Related U.S. Application Data

(63) Continuation-in-part of application No. 09/110,783, filed on Jul. 6, 1998, now Pat. No. 6,205,527.
(60) Provisional application No. 60/075,687, filed on Feb. 24, 1998, and provisional application No. 60/121,824, filed on Feb. 22, 1999.

(51) Int. Cl.⁷ ................................................ G06F 9/00
(52) U.S. Cl. .............................................. 713/1; 713/2
(58) Field of Search ................................ 713/1, 2, 100

(56) References Cited

U.S. PATENT DOCUMENTS

| | | | |
|---|---|---|---|
| 5,269,022 A | | 12/1993 | Shinjo et al. |
| 5,469,573 A | * | 11/1995 | McGill, III et al. ........ 395/712 |
| 5,675,795 A | * | 10/1997 | Rawson, III et al. ........... 713/2 |
| 5,694,600 A | | 12/1997 | Khenson et al. |
| 5,713,024 A | | 1/1998 | Halladay |
| 5,754,782 A | | 5/1998 | Masada |
| 5,930,831 A | * | 7/1999 | Marsh et al. ................ 711/173 |
| 6,205,527 B1 | * | 3/2001 | Goshey et al. .............. 711/162 |
| 6,289,426 B1 | * | 9/2001 | Maffezzoni et al. ........ 711/173 |
| 6,374,363 B1 | * | 4/2002 | Wu et al. ....................... 714/6 |
| 6,374,366 B1 | * | 4/2002 | Maffezzoni .................. 714/27 |
| 6,385,707 B1 | * | 5/2002 | Maffezzoni .................. 711/162 |
| 6,430,663 B1 | * | 8/2002 | Ding .......................... 711/162 |

OTHER PUBLICATIONS

Unknown, *XactCopy Backup and Restore Strategy Promotional Materials and White Paper*, DuoCor, Inc., Nevada City, CA (Jun. 1, 1998), 20 pages.

* cited by examiner

*Primary Examiner*—Dennis M. Bulter
(74) *Attorney, Agent, or Firm*—Martine & Penilla, LLP

(57) ABSTRACT

A method for managing a secondary storage device connected to a computer system having a primary storage device includes hooking a partition session selector device driver in a layered drive structure. An application programming interface call to obtain information related to storage devices connected to the computer system is then performed. The application programming interface call is trapped and the partition session selector device driver is communicated with directly via an interface call to manage a user accessible representation of the primary and secondary storage devices. The interface call communicating with the partition session selector device driver may obtain information related to the secondary storage device, and the method may further include the operation of obtaining information related to storage devices connected to the computer system from a system registry to compile a complete set of data relating to the physical and logical representations of the primary and secondary storage devices. A computer readable media for managing a secondary storage device connected to a computer system having a primary storage device also is described.

24 Claims, 27 Drawing Sheets

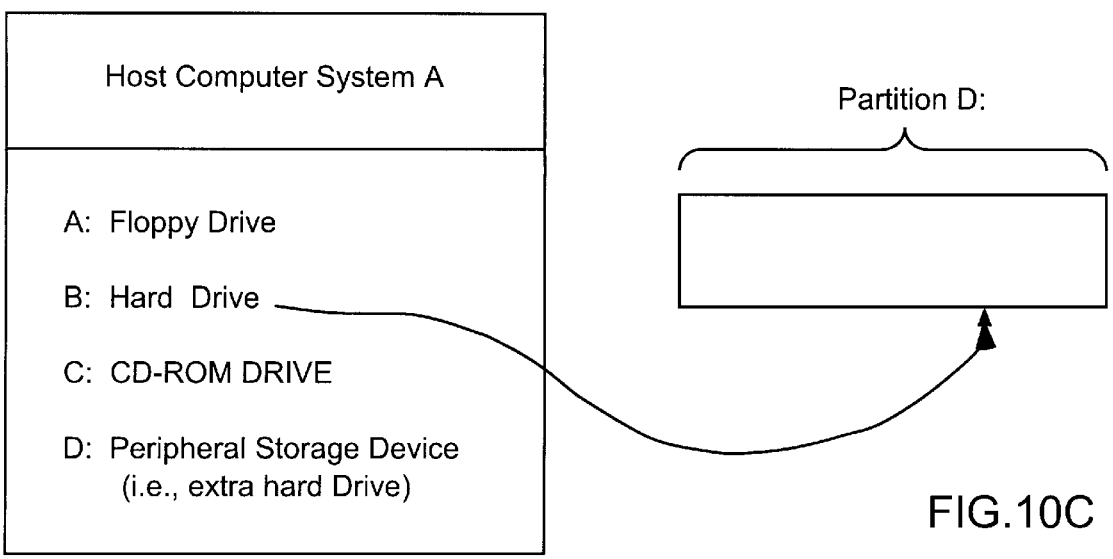
FIG.10B
FIG.10C
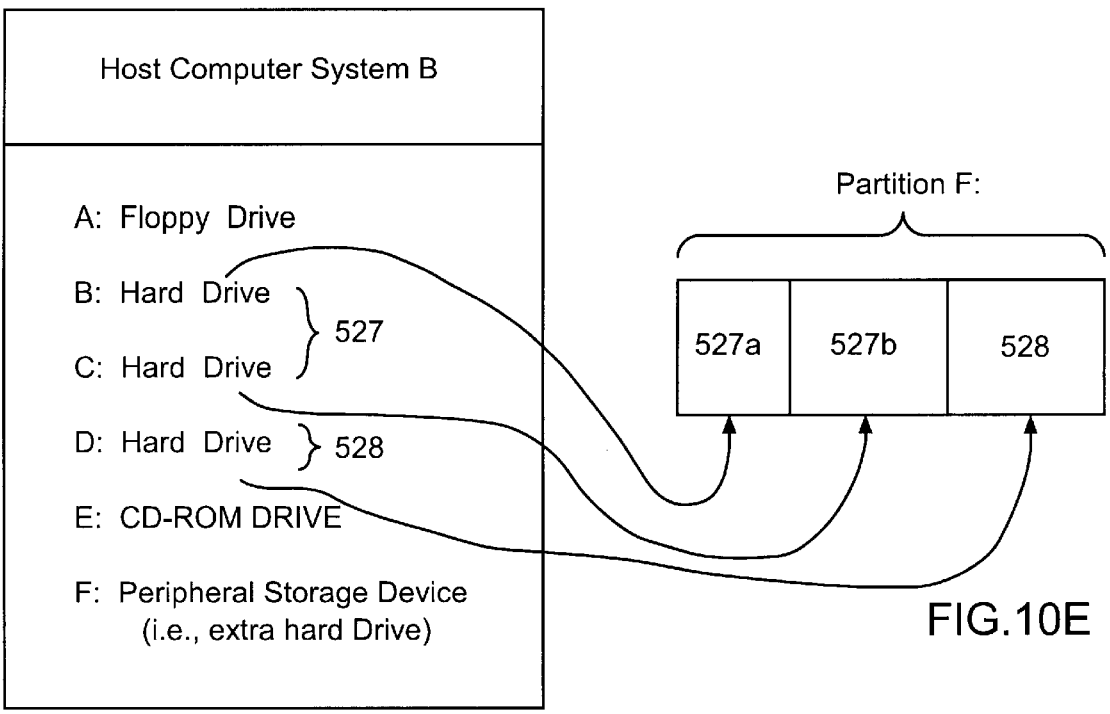
FIG.10D
FIG.10E

METHOD FOR MANAGING PRIMARY AND SECONDARY STORAGE DEVICES IN AN INTELLIGENT BACKUP AND RESTORING SYSTEM

CROSS REFERENCE TO RELATED APPLICATIONS

This application claims priority from U.S. Provisional Patent Application No. 60/075,687, filed Feb. 24, 1998, and entitled "Method and Apparatus for Data Backup and Data Restoring after Storage Drive Failures" and U.S. Provisional Patent Application No. 60/121,824, filed Feb. 22, 1999, and entitled "Method and Apparatus for Data Backup and Data Restoring after Storage Drive Failures." This application also is a continuation-in-part of and claims priority from U.S. patent application No. 09/110,783, filed Jul. 6, 1998, now U.S. Pat. No. 6,205,527 and entitled "An Intelligent Backup and Restoring System and Method for Implementing the Same," now U.S. Pat. No. 6,205,527 B1. Each of these patent applications, from which priority is claimed, is incorporated herein by reference.

This application is related to the following applications: (1) U.S. patent application No. 09/256,676, filed on the same day as the instant application, and entitled "Method of Generating a Database for use in an Intelligent Backup and Restoring System"; (2) U.S. patent application No. 09/256,682, filed on the same day as the instant application, and entitled "Automated Drive Repair Systems and Methods," now U.S. Pat. No. 6,374,366 B1; (3) U.S. patent application No. 09/256,680, filed on the same day as the instant application, and entitled "Method for Finding Application Components in an Intelligent Backup and Restoring System"; (4) U.S. patent application No. 09/256,686, filed on the same day as the instant application, and entitled "Method for Generating a Footprint Image File for an Intelligent Backup and Restoring System," now U.S. Pat. No. 6,374,366 B1; (5) U.S. patent application No. 09/256,601, filed on the same day as the instant application, and entitled "Drive Preparation Methods for Intelligent Backup Systems," now U.S. Pat. No. 6,289,426 B1; and (6) U.S. patent application No. 09/256,681, filed on the same day as the instant application, and entitled "A Method and System for Copying Files between Drives," now U.S. Pat. No. 6,385,707 B1. Each of these related applications is incorporated herein by reference.

BACKGROUND OF THE INVENTION

1. Field of the Invention

This invention relates generally to intelligent backup systems and, more particularly, to methods and apparatus for intelligently backing up selected data from a host computer's main storage drive to prevent loss of data or user productivity.

2. Description of the Related Art

In recent years, personal computers have become an integral necessity in both the work and home environment. For many people, personal computers have become their main communication system, which can be used for sending and receiving electronic mail (i.e., e-mail), transferring files over a local area network (LAN), and communicating over the world wide web via the Internet. Because people have placed such a high level of dependence on their personal computers, when a failure (i.e., crash) to either a hardware or software component occurs, the user will generally suffer greatly in terms of productivity loss.

Many times, failures to either hardware or software components can lead to the complete loss of personal data, which often cannot be recovered using standard data recovery tools. In efforts to remedy the severity of such data loss, many people perform routine backups of their entire hard drives or files. In this manner, if an unrecoverable failure were to occur, then the user would lose only the data that was created between the last backup operation and the unrecoverable failure.

Unfortunately, relying on periodic backups of a computer's storage drives (i.e., hard drives) does not eliminate the loss in productivity suffered while the failure is being attended to, and the need to reconstruct all of the lost data that was created between the last backup and the failure. To further complicate the reconstruction process, most of today's computer software products have to be installed using complex installation software that is designed to place each component of the software product in the correct system folder location, registry file, startup file, etc., to preserve proper functionality with the computer's operating system. As a result, even though the entire contents of a backup can be retrieved from the backup media, the restoring of a subsequently repaired storage drive will require a substantial amount of reconstruction.

Although the restoration of failed storage devices can sometimes be a trivial process when only a minor number of programs are re-installed onto the failed computer system, most of today's computer systems use a wide number of programs, each requiring custom installation for proper operation. Furthermore, because most computer users purchase, update, and modify computer programs over the Internet, it is often impossible to reconstruct the original state of all programs, patches, or executables that are loaded onto a computer without keeping detailed logs of where each component was acquired. As a result, when attempts to reconstruct a user's computer system are made, many of the originally installed software programs or components may not be installed because they are no longer available or supported by the original supplier.

Not with standing that most failures that are a result of a hardware malfunction or a software problem can be fixed, either by complete replacement or by performing repairs, users still experience data losses that produce harsh penalties in productivity or require significant down time. That is, even if users systematically backup their system regularly, some amount of data will be lost between the time of the last backup and the subsequent restoration. In certain circumstances, even if only a small amount of data is lost, that small amount may translate into many hours of reconstruction time. Furthermore, if the lost data was a time sensitive piece of data, then reconstruction over many hours or days may not be acceptable.

In view of the foregoing, there is a need for an intelligent backup system and method for implementing the system to protect data of a computer's storage drive in case a system failure occurs. There is also a need for a system and a method for implementing the system that will enable a user to continue working from the intelligently backed-up data after a system failure occurs, and then restore the failed system after the system failure is intelligently identified and repaired.

SUMMARY OF THE INVENTION

Broadly speaking, the present invention fills these needs by providing an intelligent backup and restore system that prevents downtime productivity losses, and assists the user in trouble shooting the failure, repairing the failure if possible, and restoring the failed system back to its pre-failure condition. All of these functionalities are provided to the user through a user friendly graphical user interface that helps the user resume his or her normal computer use by booting to a peripheral storage device (that holds an intelligently backup data set) while the failure is remedied. It should be appreciated that the present invention can be implemented in numerous ways, including as a process, an apparatus, a system, a device, a method, or a computer readable medium. Several inventive embodiments of the present invention are described below.

In one aspect of the invention, a method for managing a secondary storage device connected to a computer system having a primary storage device is provided. In this method, a partition session selector device driver is first hooked in a layered drive structure. An application programming interface call to obtain information related to storage devices connected to the computer system is then performed. In one embodiment, the partition session selector device driver traps the application programming interface call. The partition session selector device driver is then communicated with directly via an interface call to manage a user accessible representation of the primary and secondary storage devices.

The partition session selector device driver is preferably hooked in the layered drive structure before any physical drives. The interface call that communicates with the partition session selector device driver is preferably an IOCTL interface call that is specific to the partition session selector device driver. In one embodiment, the IOCTL interface call obtains information related to the secondary storage device, and the method further includes the operation of obtaining information related to storage devices connected to the computer system from a system registry to compile a complete set of data relating to the physical and logical representations of the primary and secondary storage devices. This complete set of data includes the information obtained from the application programming interface, the partition session selector device driver, and the system registry.

The partition session selector device driver is preferably configured to hide the representation of the secondary storage device from a user when the computer system boots from the primary storage device and to hide the representation of the primary storage device from a user when the computer system boots from the secondary storage device. The secondary storage device is preferably a hard drive or a removable media drive.

In another aspect of the invention, a computer readable media is provided. In one embodiment, the computer readable media contains program instructions implementing the above-described method for managing a secondary storage device connected to a computer system having a primary storage device. Thus, in this embodiment the computer readable media contains program instructions for (1) hooking a partition session selector device driver in a layered drive structure, (2) performing an application programming interface call to obtain information related to storage devices connected to the computer system, (3) trapping the application programming interface call, and (4) communicating with the partition session selector device driver directly via an interface call to manage a user accessible representation of the primary and secondary storage devices.

In another embodiment, the program instructions for communicating with the partition session selector device driver include program instructions for obtaining information related to the secondary storage device. In this embodiment, the computer readable media further includes program instructions for obtaining information related to storage devices connected to the computer system from a system registry to compile a complete set of data relating to the physical and logical representations of the primary and secondary storage devices. In yet another embodiment, the partition session selector device driver is configured to implement program instructions for hiding the representation of the secondary storage device from a user when the computer system boots from the primary storage device and to implement program instructions for hiding the primary storage device from the user when the computer system boots from the secondary storage device.

The backup and restore system of the present invention is advantageously designed to intelligently protect a user's data and productivity upon experiencing a hard disk failure. In one embodiment, once the backup and restore system is installed and setup, the backup operations are performed in an incremental fashion (e.g., after the initial full backup, only those files that have changed from one backup to another will be backed up) to a peripheral storage device media. It should be appreciated that this incremental backup technique provides a powerful level of performance enhancement over conventional backup systems.

Another advantage of the intelligent backup and restore system of the present invention is that it substantially eliminates the tremendous downtime that is typical of when a hard disk crash is experienced and no backup or simple conventional backup techniques are used. As a result, user productivity will no longer suffer when hard disk failures occur. In addition, the embodiments of the present invention also assist the user in attempting to repair the crashed hard disk. However, if the crashed hard disk is not repairable, the system will automatically detect when a new hard disk is added to the user's system, and then assists in partitioning and formatting the hard disk for the user. When a new hard disk is prepared or the old hard disk is repaired, the system will restore the operating system and data files to their current state as now present on the peripheral storage device media. Upon re-booting, the newly restored hard disk will once again become the boot device. Another advantage of the present invention is that the peripheral storage device media does not have to be identical to that of the system's hard drive. More specifically, even though most computer systems implement IDE/EIDE hard drives, the peripheral storage device (that is internal or external) does not have to be an IDE/EIDE drive. Although they can be the same, they may be of any type, standard, or size other than that of the computer system. Further yet, because the peripheral storage device media may be of a different kind and size than that of the computer system, when the spare tire backup is created, a file-based copying operation is advantageously implemented.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 10B through 10E illustrate the intelligent partitioning performed on the peripheral storage device media when one or more logical local hard drives are present on the host computer system in accordance with one embodiment of the present invention.

DETAILED DESCRIPTION OF THE PREFERRED EMBODIMENTS

An invention is described for an intelligent backup and restore system that prevents downtime productivity losses, and assists the user in troubleshooting the failure, repairing the failure if possible, and restoring the failed system back to its pre-failure condition. It will be obvious, however, to one skilled in the art, that the present invention may be practiced without some or all of the specific details set forth below. In other instances, well known process operations have not been described in detail to avoid unnecessarily obscuring the present invention.

In the following description, the intelligent backup and restore system will be referred to by its development name "Genesis," however, emphasis will be placed on describing the technical functionality and software interactions between its various components, a host computer system's operating system, and peripheral storage devices and associated media.

Figure 1A:
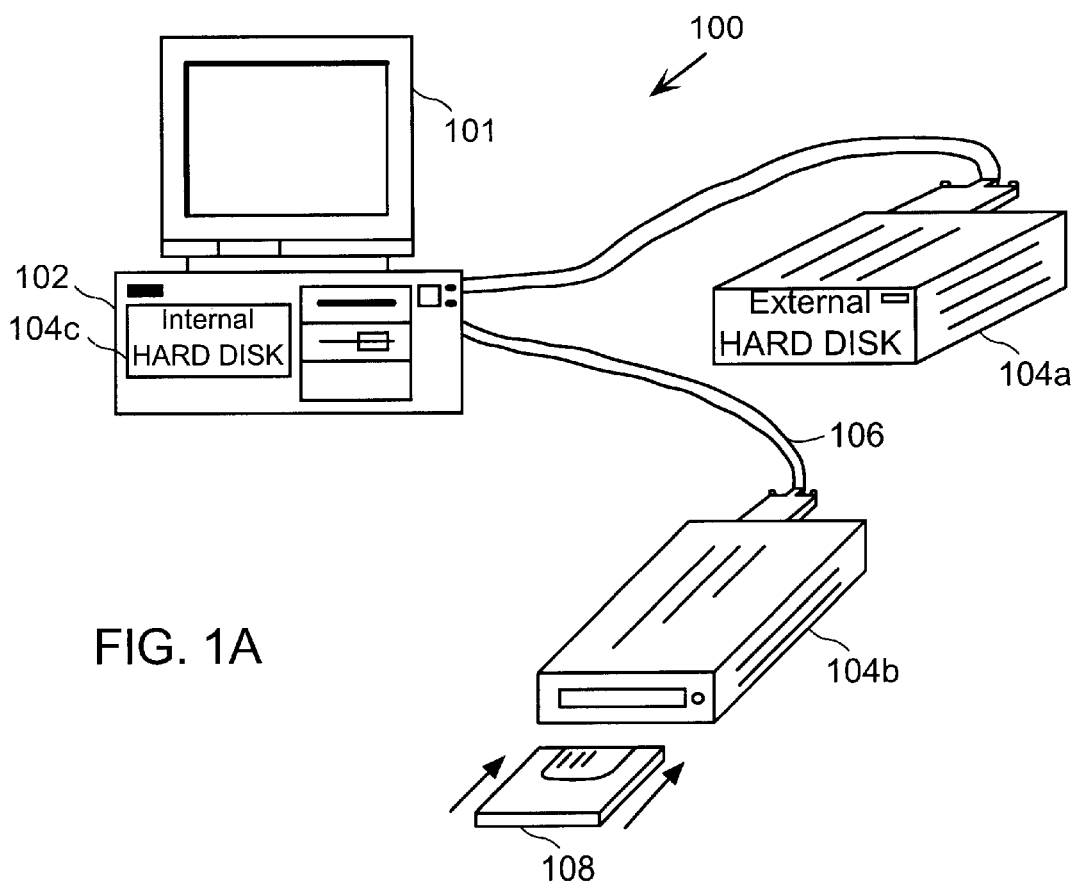
FIGS. 1A and 1B show simplified diagrams of a computer system being connected to a peripheral storage device in accordance with one embodiment of the present invention.

FIG. 1A shows a simplified diagram of a computer system 100 that includes a computer monitor 101 and a computer housing 102 that includes, among other standard hardware/software components, a central processing unit (CPU), memory (i.e., ROM and RAM), and a mother board having PCI slots. The computer housing 102 is shown connected to two exemplary peripheral storage devices, such as an external hard disk 104a and a removable media storage device 104b. The computer housing 102 typically includes a standard hard disk (not shown), and in one embodiment of the present invention, the computer housing 102 can also including an extra internal hard disk 104c. Although examples of three different types of peripheral storage devices 104a, 104b, and 104c are provided to illustrate the modularity of the intelligent backup and restore protection system of the present invention, only one extra peripheral storage device 104 is actually needed.

Figure 1B:
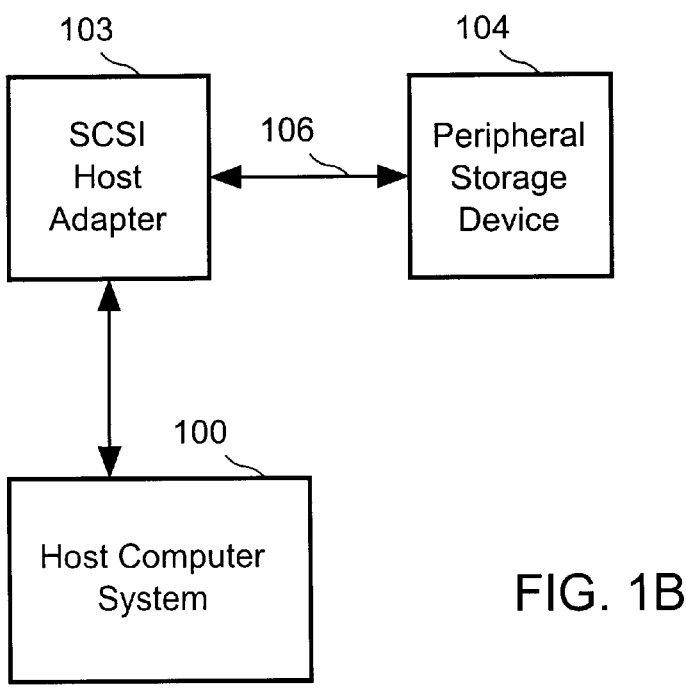

Preferably, the peripheral storage device 104 is connected to a SCSI host adapter 103 via a SCSI cable 106. As shown in FIG. 1B, the SCSI host adapter 103 is connected to a PCI bus slot of the host computer system 100, which enables connection to the peripheral storage device 104. In addition, the computer system 100 may include a CD-ROM drive (e.g., an ATAPI CD-ROM drive) which will facilitate the installation of the Genesis software components from a CD-ROM media. Of course, in another embodiment, the Genesis software may also be downloaded from an appropriate world wide web Internet site upon purchasing a suitable license.

Although other communication protocols can be used, SCSI communication links are preferred due to their fast speeds and simple to use modularity. In a preferred embodiment, the peripheral storage device 104 can be either a Jaz™ drive, which is available from Iomega Corporation of Roy, Utah, or a second hard disk drive (internal or external). When the peripheral storage device 104 is a Jaz™ drive, a cartridge 108 is preferably a Jaz™ drive cartridge or other suitable storage media cartridge that is capable of storing a large volume of data. Even though larger capacity media cartridges will be available in the future, present Jaz™ drive cartridges are available in 1 gigabyte (GB) and 2 gigabyte (GB) sizes, and either size may be used depending on the user's backup needs. Of course, larger drive cartridges are capable of storing more data.

The SCSI host adapter 103 is preferably a host adapter that is enabled with a special Adaptec, Inc. BIOS that allows users to boot up their computers from the peripheral storage device 104. The special Adaptec, Inc. BIOS is available on Adaptec's AHA-2930CU SCSI Host Adapter and other future host adapters, which are or may be available from Adaptec, Inc. of Milpitas, Calif. In this manner, when a hard disk failure occurs, the special Adaptec, Inc. BIOS will allow the user to boot from the peripheral storage device 104 and continue working until the failure is fixed. In a preferred embodiment, the cartridge 108 media (or the second hard disk) will not only contain valuable data, but also will include the user's operating system (OS) and other important software programs.

For example, when boot control is passed to the peripheral storage device 104, the user's system will boot to its preferred OS (i.e., Windows 95, Windows 98, or Windows NT) seamlessly. In this manner, users can run their programs, e.g., Microsoft Office™, receive and send e-mail, browse the Internet, access their important files, etc., just as if the system never experienced a hard disk crash. Of course, only those software applications selected for backup by the user will be available when booting to the peripheral storage device 104.

Figure 2:
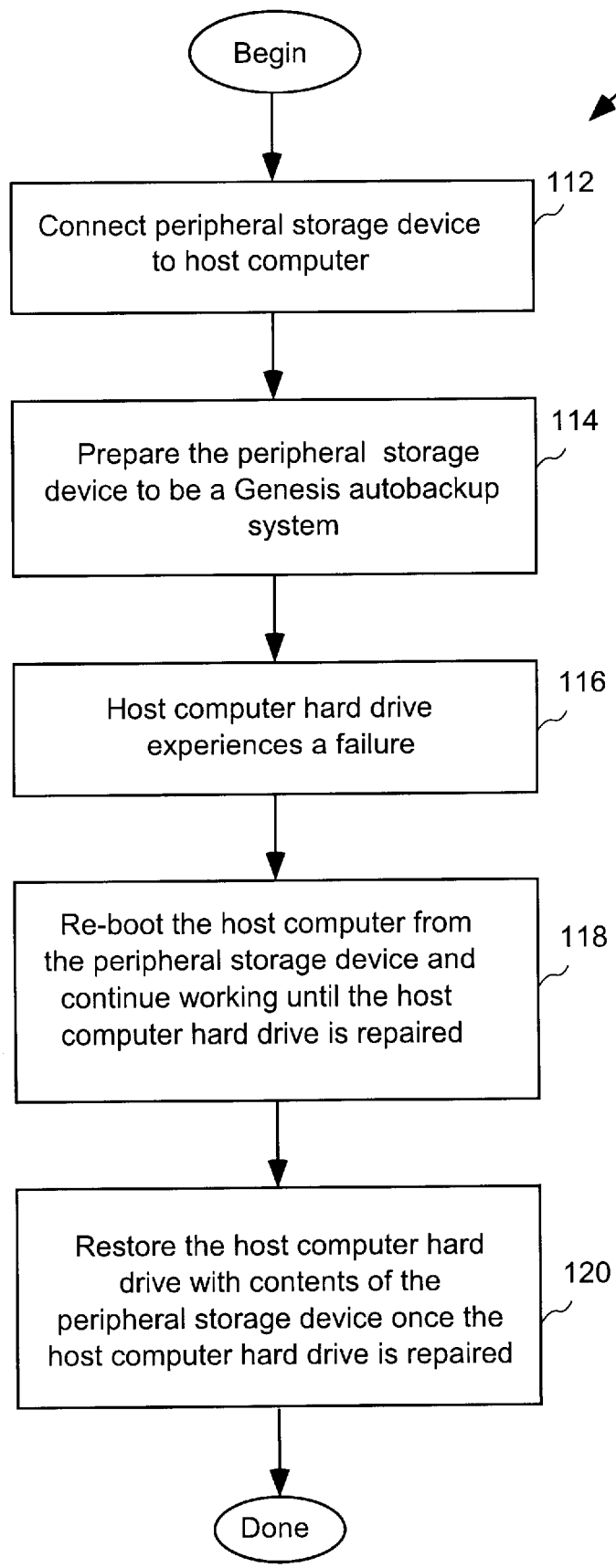
FIG. 2 shows a simplified flowchart diagram illustrating the intelligent backup protection provided by one embodiment of the present invention.

FIG. 2 shows a simplified flowchart diagram 110 illustrating the intelligent backup protection provided by one embodiment of the present invention. The method begins at an operation 112 where the peripheral storage device 104 is connected to the host computer system 110 via a suitable SCSI cable 106, that is connected to a SCSI host adapter. Once the peripheral storage device has been appropriately connected in operation 112, the method proceeds to an operation 114 where the peripheral storage device (i.e., the media of a cartridge or a hard disk) is prepared to be a Genesis-enabled backup system.

In the process of preparing the peripheral storage device to be a Genesis-enabled backup system, the peripheral storage device is first verified to be appropriately installed and connected to a suitable SCSI host adapter. As mentioned above, the SCSI host adapter is preferably an Adaptec AHA-2930CU SCSI host adapter that contains a special BIOS that enables the host computer system to be booted from the peripheral storage device 104, even if an EIDE hard drive is connected to the host computer system. The ability to boot the computer to a SCSI peripheral device is described in greater detail in U.S. patent application Ser. No. 09/016,764, filed on Jan. 30, 1998, and entitled "Method for Selectively Booting from a Desired Peripheral Device." This application, which is assigned to the assignee of the present application, is incorporated herein by reference in its entirety.

In an alternative embodiment, booting to a selected peripheral device may be accomplished without the need for the special BIOS. To accomplish the booting to the peripheral storage device in this alternative embodiment, a boot select program (BSP) code that is part of the Genesis software is used. In Table 1 below, an exemplary ABS (Adaptec boot select) and master boot record (MBR) layout in zero based logical block address (LBA) format is shown.

TABLE 1

ABS MBR Layout

| 0 | 1 | 2 | 3 | 4 | 5 | 6 | 7+ |
|---|---|---|---|---|---|---|----|
| [MBR] ABS 1 Image {Boot Management Code part 1} | Genesis Signature or Boot Signature | ABS 2 Image {Boot Management Code part 2 - overflow from part 1 if needed} | | | | | |

In one embodiment, an installation program is used to generate ABS image codes and a signature that are stored on (i.e., written to) a primary boot drive media as shown in Table 1. As used herein, the primary boot drive is typically the EIDE drive (80h), which is used by the system during normal and default operation. In this example, the ABS 1 Image shown above is first loaded into memory and executed by the system BIOS. This code then loads the ABS 2 Image into system memory and transfers execution control to it. The ABS 2 Image shown above in Table 1 is configured to: (a) look for all Int 13h drives connected to the system; and (b) examine sector 0 (in LBA) of all Int 13h drives for a Genesis Signature or a Boot signature (to enable booting to the primary drive during normal operation). Preferably, the boot priority is determined by the following order to enable selection of one by the user:

1. Boot Signature;
2. Genesis Signature, if Boot Signature is not found; and
3. Primary boot drive, if neither the Boot Signature nor the Genesis signature is found.

Once the boot priority is determined, the decision concerning whether an Int 13h handler requires installation will have been made. If the desired boot drive is the primary boot drive (80h), then the desired boot drive does not have to install its own handler; otherwise, an Int 13h handler is installed to re-order the Int 13h drive numbers in the manner shown in Table 2 below.

TABLE 2

| System Default Environment | Boot Drive | ABS Controlled Environment |
|---|---|---|
| 80h | Default | 81h |
| 81h | | 82h |
| 82h | Desired | 80h |
| 83h | | 83h |

Once the boot drive has been identified and the Int 13h handler, if necessary, has been installed, the method loads the MBR of the desired boot drive and examines the partition table (the partition table is typically the last 66 bytes of the MBR sector, which has 512 bytes). If an active partition is not found, then the method must go back to find an alternate boot drive. If an active partition is found, then the method determines whether the partition requires Int 13h extension support by checking the partition type and whether the boot sector resides within the first 8.4 GB. If an Int 13h extension is not required to load the boot sector, then a regular Int 13h command is used to load the boot sector, to validate the boot sector by checking the signature, and to indicate whether the partition is bootable.

If an Int 13h extension is required to load the boot sector, then the method determines whether the Int 13h extension is supported. If the Int 13h extension is supported, then an Int 13h extension command is used to load the boot sector, to validate the boot sector by checking the signature, and to indicate that the partition is bootable. If the Int 13h extension is not supported, then the method must find an alternate boot drive.

After a bootable partition has been identified, a graphical user interface display, such as the example of Table 3 below, is provided to the user for selecting a drive from which to boot. Once the Genesis software is installed on a system, each time the system is booted, the display of Table 3 is provided to the user. If the computer is operating normally, then the user will usually select the designated boot drive (selection (1) in Table 3). In most cases, it is not until a crash or other failure has occurred with the designated boot drive (i.e., the primary boot drive) that the user will desire to boot from the Genesis drive (selection (2) in Table 3). In certain cases where the primary boot drive is completely inoperative, the user may not be able to take advantage of the special booting using the ABS code. In such cases, the user may rely on the special BIOS described above or, alternatively, may boot to a peripheral storage device using a special floppy disk that enables the selection of a desired drive from which to boot.

TABLE 3

Please Select (1) or (2) To Boot From.
1. Designated Boot Drive {Normal Operation}
2. Genesis Drive {Upon Failure}

If the selected boot drive has a bootable partition, then control is transferred to the code on the boot sector. If the selected boot drive does not contain a bootable partition, then the method must look for an alternate boot drive, as mentioned above, until a bootable partition is found. Although three specific ways in which booting to a desired peripheral device can be achieved when the primary hard drive is an EIDE drive (or other type of primary boot drive) are described herein, it will be apparent to those skilled in the art that other equivalent manners of booting to a desired peripheral storage devices can be used to achieve the benefits of the intelligent backup and restore system of the present invention.

Broadly speaking, the preparation 114 of the peripheral storage device 104 begins when the cartridge 108 is inserted (or an extra hard disk drive is connected), and the user implements a Genesis Preparation Wizard (i.e., in the form of a user friendly graphical user interface) to convert a standard cartridge media (or hard disk media) into a Genesis-enabled cartridge. At this point, the user will follow the Genesis Preparation Wizard and a SpareTire Wizard graphical user interface to generate a backup set using file-based copying and activate the intelligent Genesis backup system. After the peripheral storage device 104 and the host's Genesis software have been prepared to be a Genesis-enabled backup system, the method will proceed to an operation 116.

For purposes of this example, if the host computer system's hard drive experiences a failure in operation 116, then the Genesis-enabled backup system will be ready for the user to enable re-booting to the peripheral storage device 104, which will allow the user to continue working until the host computer hard drive is repaired in operation 118. The ability to continue working after the host computer system's hard drive has experienced a failure is a powerful feature that enables a user to maintain his or her productivity, even when the host computer system may have a serious problem that may require extensive work or complete replacement of the hard drive.

Next, the method proceeds to an operation 120 where the host computer hard drive will be restored (using the Spare-Tire Wizard) with the contents of the peripheral storage device 104 once the host computer hard drive has been repaired. This operation provides a user with the ability to revert back to work from the host computer's hard drive once this drive has been repaired. Thus, the method of the invention not only enables users to continue working without interruption when a host computer hard drive failure occurs, but also enables users to revert to working from the host computer hard drive once this drive has been repaired. These features are therefore powerful in that they substantially eliminate the loss in productivity experienced by users of today's complex and powerful computer systems when failures occur with a host computer hard drive.

Figure 3A:
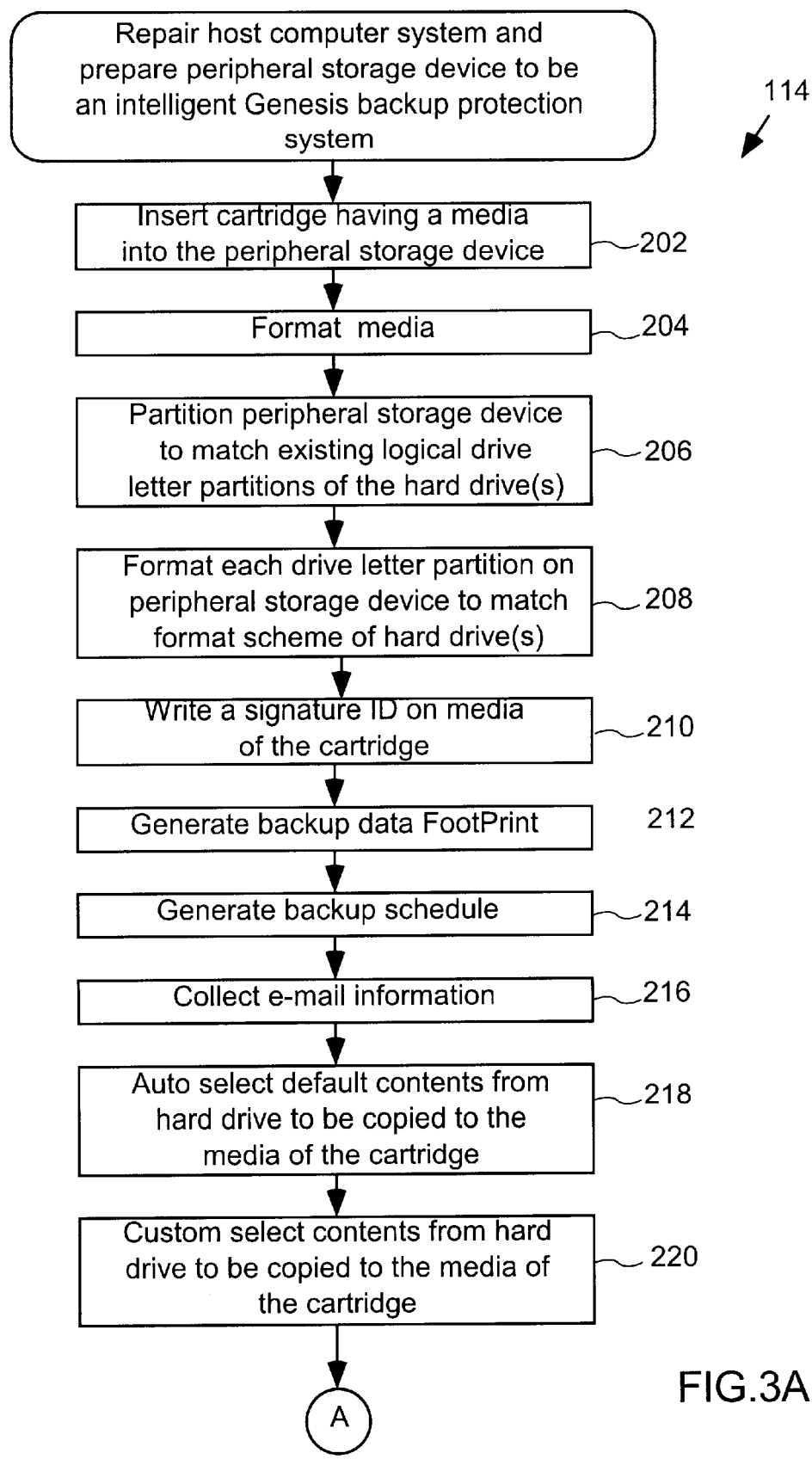
FIGS. 3A and 3B show more detailed flowchart diagrams of the method operations performed in preparing the host computer system and peripheral storage device to be an intelligent Genesis backup protection system in accordance with one embodiment of the present invention.

FIG. 3A shows a more detailed flowchart diagram 114 of the method operations performed in preparing the host computer system and peripheral storage device to be an intelligent Genesis backup protection system in accordance with one embodiment of the present invention. In the following examples, it will be assumed that the selected peripheral storage device is the Jaz™ drive, however, these examples are equally applicable to situations in which the selected peripheral storage device is a second hard disk drive.

The method begins at an operation 202 where a cartridge having a storage media is inserted into the peripheral storage device. As mentioned above, the cartridge is preferably an Iomega Jaz™ drive cartridge, which is capable of storing a large amount of data. Of course, other suitable peripheral storage devices and cartridges also may be used with appropriate modifications. Once the cartridge has been inserted into the peripheral storage device, the method proceeds to an operation 204 where the storage media is formatted.

After the media has been formatted, the peripheral storage device media is partitioned to match existing logical drive letter partitions of the hard drive or drives of the host computer system. The method then proceeds to an operation 208 where each drive letter partitioned on the peripheral storage device media is formatted to match the format scheme of the hard drive(s). Once formatted, the method proceeds to an operation 210 where a Genesis signature ID is written on the media of the cartridge. Preferably, the signature ID is written in one or more sectors after the master boot record (MBR) sector of the media. The signature ID will therefore identify this particular cartridge as being a Genesis-enabled cartridge, which, when inserted into the peripheral storage device and detected by the computer's host adapter BIOS, indicates that the intelligent backup is able to commence.

On the other hand; if a non-Genesis-enabled cartridge (i.e., one not prepared in the manner set forth above) is inserted into the peripheral storage device, then the peripheral storage device will operate normally without performing the intelligent backup protection. Alternatively, in the event the peripheral storage device is a second hard disk drive, the intelligent backup and restore protection system will generally be in a ready state. The method now proceeds to an operation 212 where a backup data FootPrint image file is generated. This initial FootPrint image file is referred to herein as a "before image." In general, the FootPrint image file is configured to detect and list all hardware (i.e., hard drives and controllers). In this manner, the intelligent Genesis backup protection system will be able to troubleshoot what the source of a failure may be (i.e., to determine which hard drive may have failed). Specifically, when a failure occurs, a new FootPrint image file is created. This FootPrint image file is referred to as an "after image."

By comparing the "before" and "after" image files, the intelligent Genesis backup system will either know or, at a minimum, be in a position to narrow down the cause of a failure. This enables the intelligent Genesis backup system to take appropriate actions to repair the problem (or to suggest a solution). After the backup data FootPrint image file is generated in operation 212, the method proceeds to an operation 214.

In operation 214, a backup schedule is generated. In this operation, users will have the option of selecting when incremental backups will occur during normal operation. Some of the options will include performing the incremental backups during startup, shut down, screen saver periods, or periods of inactivity. As used herein, an "incremental" backup means that only those files or data that are newer than that previously backed up will be backed up again. The use of such incremental backups is beneficial because it eliminates the need for long backup sessions. The custom scheduling of the backup operations also enables users to set up the backups for when it is most convenient to the individual user, depending on his or her work habits.

Once the backup schedule is generated in operation 214, the method proceeds to an operation 216 where the intelligent Genesis backup protection system will prompt the user to provide an e-mail address for his or her computer support personnel. In this manner, if a failure occurs with the host computer system's hard drive (or some type of system failure), then the intelligent Genesis backup protection system will automatically send an e-mail message to the computer support personnel to inform them that the hard drive of the computer system has experienced a failure. In addition, the e-mail message may provide an indication as to the source of the problem. Once the e-mail information has been collected in operation 216, the method proceeds to an operation 218.

In operation 218, default contents from the hard drive are auto selected to be copied to the media of the cartridge. In this operation, the auto selected contents will typically include the standard boot files that are critical to the booting process and operating system files. The method then proceeds to an operation 220 where contents from the host computer system's hard drive are custom selected to be copied to the media of the cartridge. In this operation, the user is provided with a Genesis X-file viewer interface, which provides the user with a Windows Explorer-like directory of the hard drive's data. From this user friendly interface, the user is allowed to select (i.e., by checking a box or the like) which files will be tracked for incremental backups by the intelligent Genesis backup protection system.

Figure 3B:
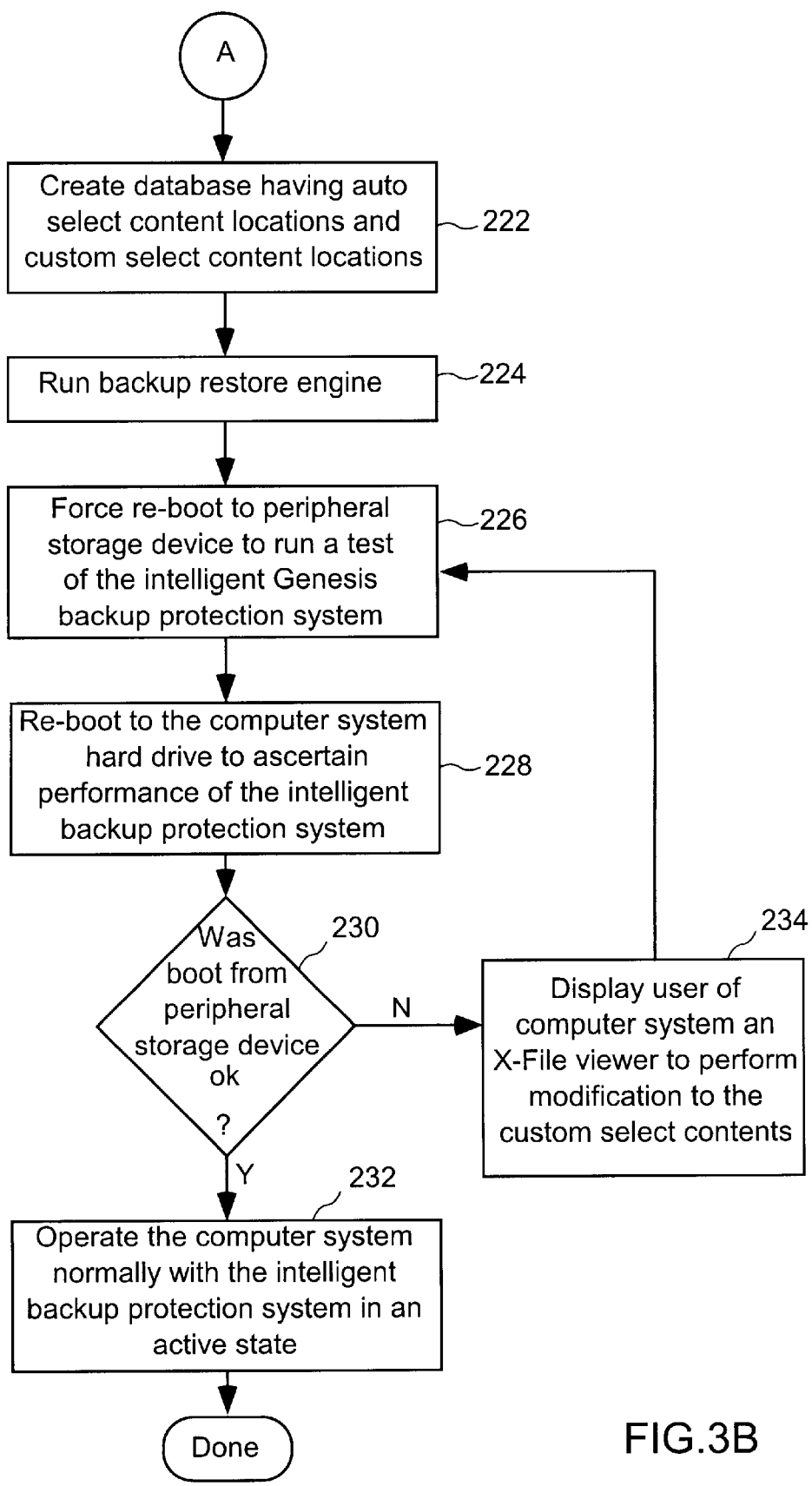

In one embodiment, if the host computer system's hard drive is smaller than the capacity of the cartridge media, then the user may choose to make a complete replica of the entire contents of the hard drive. In this manner, when a computer failure occurs, the user will be able to continue working from the identical contents of the peripheral storage device while the computer system's hard drive is repaired. From operation 220, the method proceeds to a pointer A as shown in FIG. 3B.

Once the contents of the initial backup set have been selected, a database having the auto selected content locations and custom selected content locations is created in operation 222. This database is generally a text file having pointers to the various selected applications and files that are on the computer system's hard drive. In one embodiment, the aforementioned X-file viewer is responsible for generating the database, which is constructed using the custom selected data.

When the X-file viewer has created the database, the method proceeds to an operation 224 where a backup restore engine is run. The backup restore engine is configured to copy all of the information that is selected in the database to the media of the peripheral storage device. In general, the backup restore engine is responsible for handling the file-based copying process from the user source drive(s) to the peripheral storage drive, as well as from the peripheral storage drive to the user's hard drive. The basic operation of the backup restore engine includes receiving paths to the files (called the source) and copying them to the proper backup and restore location (called the destination). File-based copying is a powerful feature that enables copying data between media having different sizes, configurations, and operating standards. In addition to the basic copying process, this engine is responsible for maintaining file attributes after being copied (e.g., hidden files will remain hidden on the destination drive).

The backup restore engine is also capable of maintaining security attributes for files under NTFS. In general, to ensure that older files do not overwrite newer files, the engine is also configured to avoid copying files if the destination is newer than the source. The backup restore engine is also charged with performing virus checking on all files before the copying is performed. In this manner, any detected viruses are disinfected prior to performing any copying operations.

From operation 224, the method proceeds to an operation 226 where a re-boot to the peripheral storage device is forced to run a test of the intelligent Genesis backup protection system. As mentioned before, the peripheral storage device may be a Jaz™ drive (or a second hard drive) that is connected to the computer via a SCSI cable and a SCSI host adapter. Next, the method proceeds to an operation 228 where the computer system is again re-booted to the computer system's hard drive to ascertain the performance of the intelligent backup protection system.

The method now proceeds to a decision operation 230 where it is determined whether the boot from the peripheral storage device was O.K. If the booting to the peripheral storage device was O.K., then the method proceeds to an operation 232 where the computer system is allowed to operate normally with the intelligent Genesis backup protection system in an active state. In general, the intelligent backup protection system will work automatically in the background without disturbing the user during normal operation.

Referring back to operation 230, if the boot from the peripheral storage device was not O.K., then the user is provided with an X-file viewer to enable the user to perform modifications to the custom selected contents for backup in operation 234. Once the user has made the appropriate modifications to the selected contents, the method will again proceed to operation 226 where re-booting to the peripheral storage device is again forced to run a test of the intelligent Genesis backup protection system. Once the boot from the peripheral storage device has been determined to be O.K. in operation 230, the method will then proceed to operation 232 and thereafter the method will end.

Figure 4:
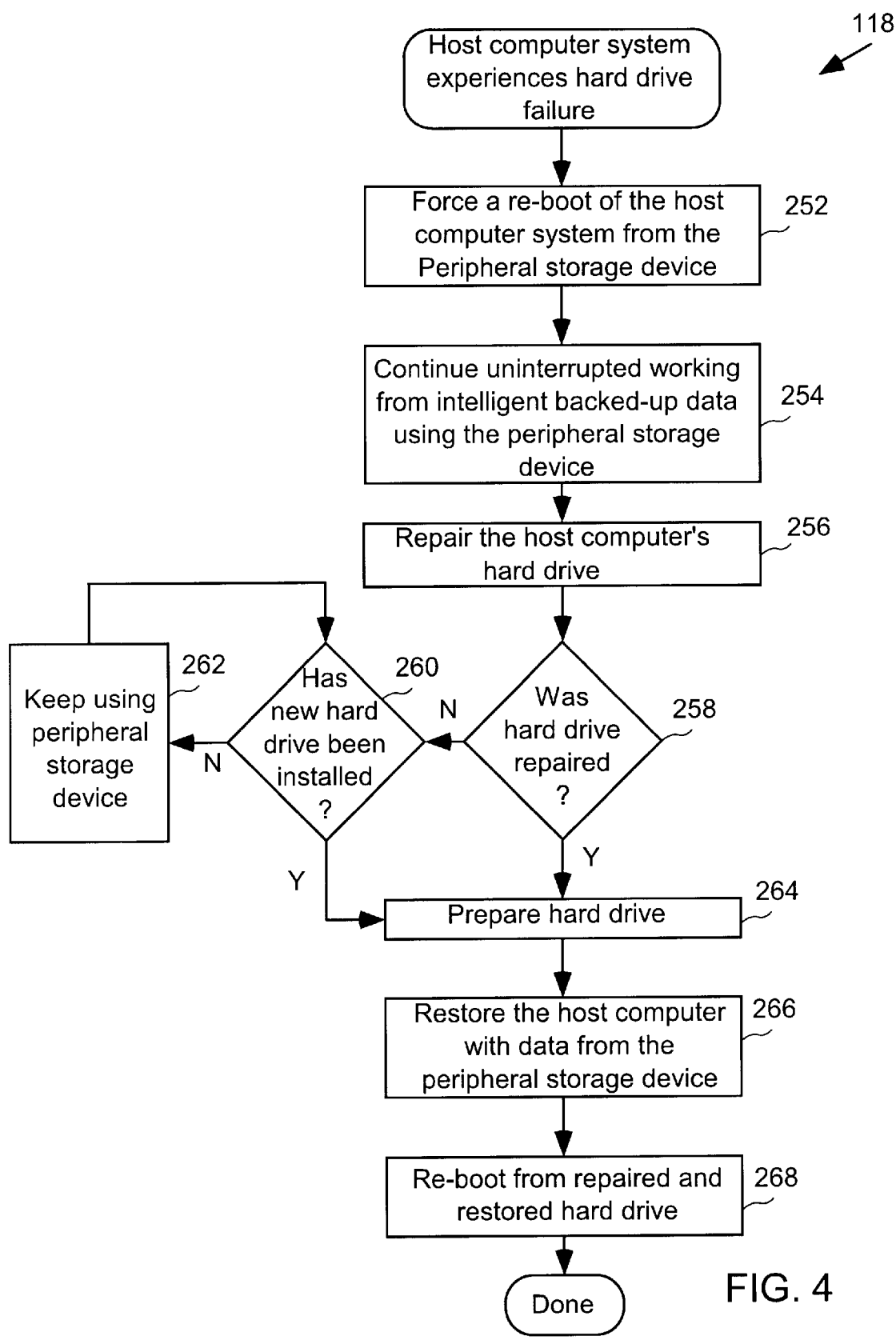
FIG. 4 shows a more detailed flowchart diagram illustrating the operations performed by the intelligent Genesis backup protection system when the host computer system experiences a hard drive failure in accordance with one embodiment of the present invention.

FIG. 4 shows a more detailed flowchart diagram 118 illustrating the operations performed by the intelligent Genesis backup protection system when the host computer system experiences a hard drive failure. The method begins at an operation 252 where the intelligent Genesis backup protection system will automatically prompt the user (via a graphical user interface or text) to re-boot the host computer system from the peripheral storage device, if desired, upon experiencing the hard drive failure which is detected by a system BIOS. Once re-booted to the peripheral storage device, the method will proceed to an operation 254 where the user can continue uninterrupted working from the intelligently backed-up data using the peripheral storage device, as if no failure had occurred. While the user is working uninterrupted from the intelligently backed-up data of the peripheral storage device, the method will proceed to an operation 256 where the host computer's hard drive will be repaired.

Next, the method will proceed to a decision operation 258 where it is determined whether the hard drive was repaired. If it has not been repaired, the method will proceed to another decision operation 260 where it is determined whether a new hard drive has been installed. If a new hard drive has not been installed, the method will proceed to an operation 262 where the user will keep using the peripheral storage device until the hard drive is repaired or replaced. When the hard drive is repaired or replaced, the method will proceed to an operation 264 where the new hard drive or repaired hard drive is prepared.

The preparation of a new hard drive generally involves partitioning the hard drive in the state it was originally in (i.e., to match the partitions of the peripheral storage device media), and then formatting the hard drive to its original state. Once the hard drive is prepared in operation 264, the method will proceed to an operation 266 where the host computer is restored with the data from the peripheral storage device media. As mentioned above, the restoring operation includes copying the data stored on the peripheral storage device media back to the repaired hard drive of the computer system. Once the restoring has been completed in operation 266, the method proceeds to an operation 268 where the computer system is re-booted from the repaired and restored hard drive. At this point, the method is done.

Figure 5A:
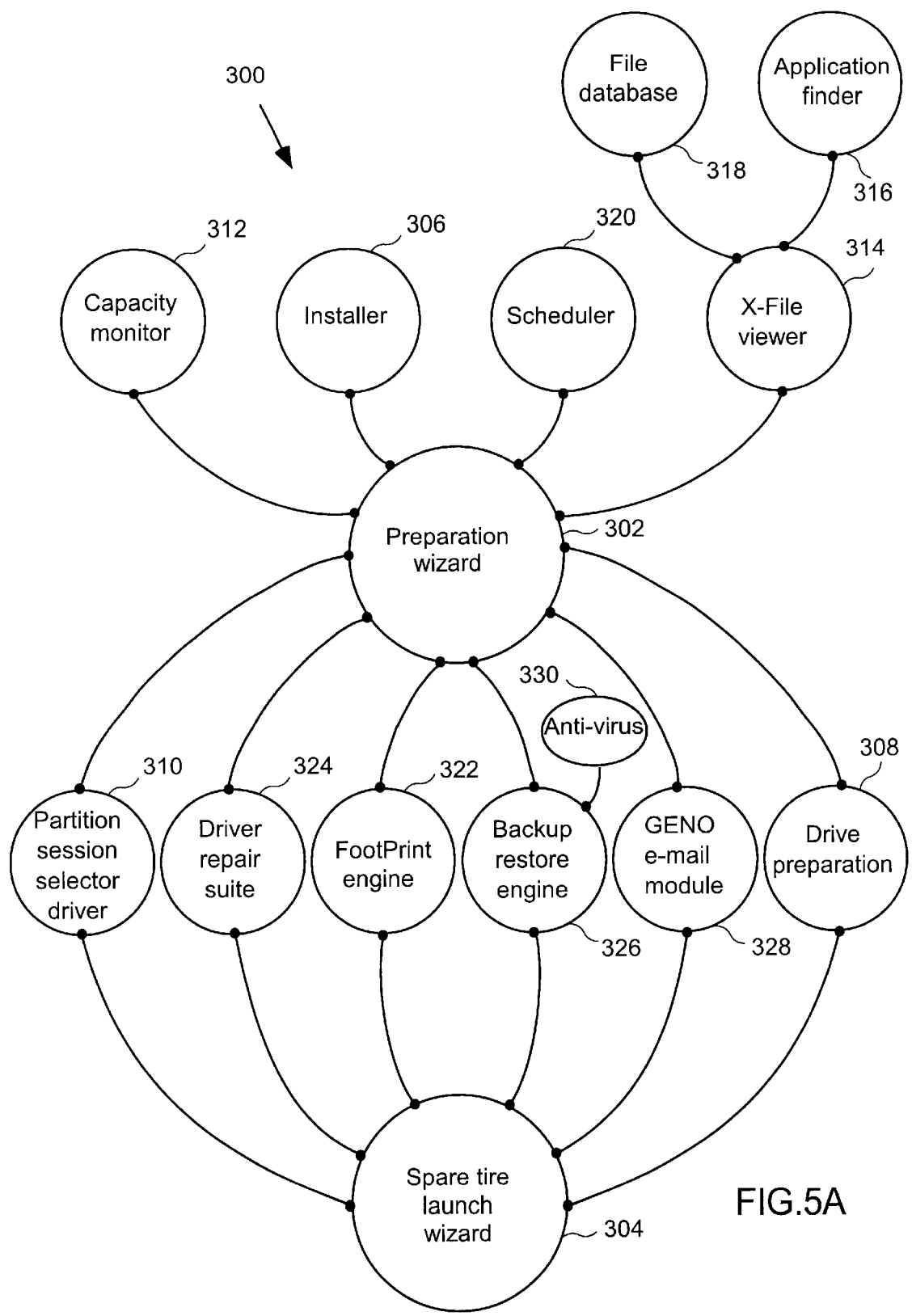
FIG. 5A shows an object representation of software modules and their communication with other modules of the system in accordance with one embodiment of the present invention.

FIG. 5A shows a software object representation 300 in accordance with one embodiment of the present invention. The software object representation illustrates the interactions between the main software components of the intelligent Genesis backup protection system. The two main components of the software object representation 300 include a Genesis Preparation Wizard 302 and a SpareTire Launch Wizard 304. The Preparation Wizard 302 is a software interface which will interact with various software modules to prepare the host computer system and a peripheral device media to be Genesis enabled.

On the other hand, the SpareTire Launch Wizard 304 is used to enable the user to boot from and work off of the backed-up data after an error or failure occurs with the host computer system's hard drive. As shown, the SpareTire Launch Wizard 304 also interacts with various software components as does the Preparation Wizard 302. In this example, the Preparation Wizard 302 is configured to communicate with an installer object 306, which is configured to handle the installation and verification of various registry entries created during the Genesis software installation process. If any keys are missing, then the installation object 306 will suggest to the user via the Preparation Wizard 302 that a re-installation is required.

In addition, the installer object 306 is configured to check whether an appropriate peripheral storage drive is connected to a suitable SCSI host adapter. If the Preparation Wizard 302 is unable to detect the special BIOS from the SCSI host adapter that enables booting to the SCSI peripheral device, then the Preparation Wizard 302 will notify the user and explain to the user how an upgraded BIOS can be obtained. As mentioned above, the detailed functionality of this special BIOS is described in U.S. patent application Ser. No. 09/016,764, filed on Jan. 30, 1998, the disclosure of which is incorporated herein by reference.

The Preparation Wizard 302 is also in communication with a drive preparation object 308. The drive preparation object 308 is responsible for preparing the peripheral storage device to be a Genesis-enabled system. The preparation generally includes partitioning the media of the peripheral storage device, formatting the partitions, and writing the Genesis signature ID to the media. Generally, the peripheral storage device media will be partitioned to match the number of logical drive letter partitions of the host computer system hard drive(s). The drive preparation object 308 is also charged with preparing a new hard disk when the computer system's hard disk is not repairable, and a new hard disk is installed when the SpareTire Launch Wizard 304 is in control.

The preparation of a new hard disk typically includes detecting that a new hard disk is installed (i.e., which is possible because of the Footprint image file), verifying the physical media, partitioning, and formatting. To detect a new hard disk, the SpareTire Launch Wizard 304 will search for a matching entry in the FootPrint image file and, when detected in the FootPrint image file, this matching entry will indicate that a new device has been added (i.e., the new hard disk). Using this method, it is also possible to detect all other properties of the device, which are attached to the new entry in the Footprint image file.

In one embodiment, the partitions of the host computer system are those defined by drive letters of a Windows-type operating system (OS). In this embodiment, the partitioning may be performed by using a GUI partitioning utility, such as one provided as part of an Adaptec, Inc. EZ-SCSI program, which is available from Adaptec, Inc. of Milpitas, Calif. During the initial drive preparation, the peripheral device storage media may be erased to ensure that all data is removed before the media is identified to be a Genesis-enabled media. In addition, the drive preparation object 308 will be configured to verify the media. The media may be verified by scanning the entire media surface on a sector-by-sector basis. Bad sectors will be noted in the file allocation table (FAT) when the disk is formatted so that they are not used for backup. During formatting, the drive may be formatted to FAT-16 for Windows 95/98 and Windows NT. For Windows 95/98 OSR-2 configurations, formatting to FAT-32 will also be an option for the user. In addition, NTFS will also be available for Windows NT.

Figure 5B:
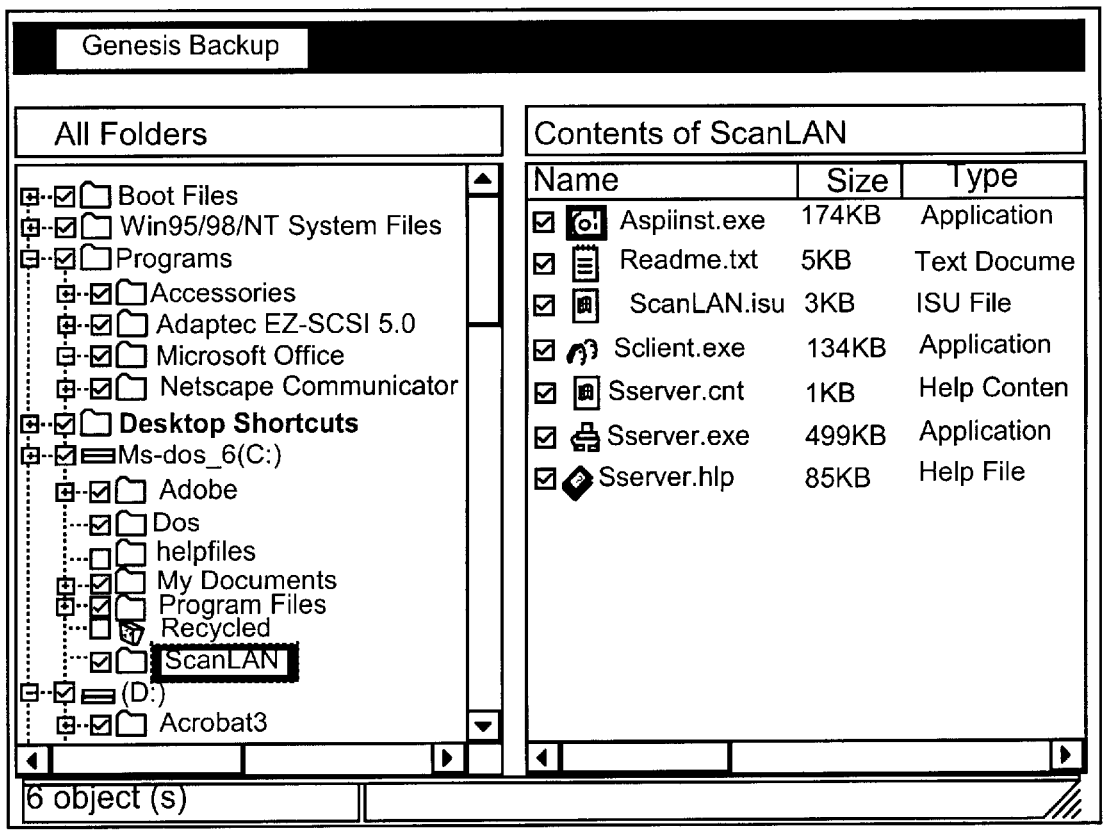
FIG. 5B is an exemplary graphical user interface of an X-file viewer in accordance with one embodiment of the present invention.

The Preparation Wizard 302 is also coupled to an X-file viewer 314 which allows the user to select which programs and files are to be incrementally backed up by the intelligent Genesis backup protection system. As shown in FIG. 5B, an exemplary X-file viewer is shown having selection boxes next to those programs, folders, and files which are to be backed up by the intelligent backup system. In this example, the boot files and the Windows 95 system files are automatically selected by default to be backed up by the intelligent backup system. However, the user is allowed to selectively identify and check those boxes for programs, folders, and files which are also to be backed up by the intelligent backup system.

The Preparation Wizard 302 is further shown in communication with a capacity monitor 312, which is charged with ensuring that no more than an allowed amount of data is targeted for certain partitions of the peripheral storage device media. In general, the capacity monitor 312 will ensure that only a percentage of each partition will be allocated when the user is selecting programs for the intelligent backup operations of the Genesis system. In this manner, enough space remains in each partition for subsequent incremental backups during normal operation.

Eventually, however, one or more of the partitions of the peripheral storage device will become filled. At that time, the user will be required to perform a refresh of the peripheral storage device media, which is substantially similar to the initial backup. Upon the refresh operation, newly calculated partition sizes are made to provide additional space on each of the partitions for more incremental backups.

Once the user has implemented the X-file viewer 314 to select those programs, files, and folders that should be incrementally backed up, a file database 318 will be generated by the X-file viewer. The file database will essentially be a list of those selected items and their locations on the various local logical drive letters of the computer system. The X-file viewer 314 is also in communication with an application finder 316 that enables the X-file viewer to find those programs (and all associated components) which are logically contained within the various partitions and associated drives as shown in FIG. 5B.

The Preparation Wizard 302 is also in communication with a scheduler 320, which will provide a user the option of selecting when the incremental backups are to occur. As mentioned above, some of the options will include backing up at startup, shutdown, during a screen saver period, or even during operation. In this embodiment, the incremental backups are responsible for updating the peripheral storage device media when stored files have been modified since the last backup to reduce the amount of time spent during backup sessions.

The Preparation Wizard 302 is also in communication with a FootPrint module 322, which is configured to detect and list all hardware components in a FootPrint image file to identify the source of the failure that resulted in the booting to the peripheral storage device media. As mentioned above, this FootPrint image file is created and copied to the peripheral storage media during the initial backup, after each boot to a normal working system, and with each incremental backup operation. In one embodiment, the FootPrint image file will contain the items identified in Table 4 below.

TABLE 4

Operating System

Version
Location
List of Peripherals

Device indexes (e.g., DEVICE00) referencing another part of the footprint file containing detailed information about the corresponding device.
Registry path of device
Hardware device address (e.g., SCSI target/LUN or IDE master/slave)
"Inquiry" data including vendor, model and revision
Partition data (i.e., size, type, file-system)
Drive-letter mappings
Controller Cards Controller indexes (e.g., CONTROLLER00) referencing another part of the footprint file that contains detailed information about the corresponding controller.
Type (e.g., EIDE/SCSI)
Configuration information (e.g., I/O Port, IRQ, DMA, etc.)
List of attached devices (reference to peripheral section)
Time stamp (e.g., when was the FootPrint image created)

A majority of the information in Table 4 will come from the system registry. As such, this information is relatively easy to compile because there no need to probe hardware. This information is then written to a FootPrint image file in text format each time a successful boot occurs to the operating system. A copy of this file is stored in the root directory of the hard drive that contains the operating system as well as in the root directory of the peripheral storage device (i.e., Jaz™ drive or second hard disk drive). As mentioned above, when the peripheral storage device becomes the boot device, this FootPrint image file is analyzed and compared to a newly created FootPrint image file to determine which device has failed (or which devices have failed). The SpareTire Launch Wizard 304 uses this information to inform the user of the failure and to suggest a possible course of action to repair the problem.

Another application of the FootPrint image file is one in which new drives are automatically detected for the user. Each time the system is booted, the previous FootPrint image file (before image) is compared to the newly created FootPrint image file (after image). If additional devices are detected, then the intelligent Genesis backup protection system may notify the user of the new device or devices and, if desired, proceed to partition and format the new media.

Figure 5C:
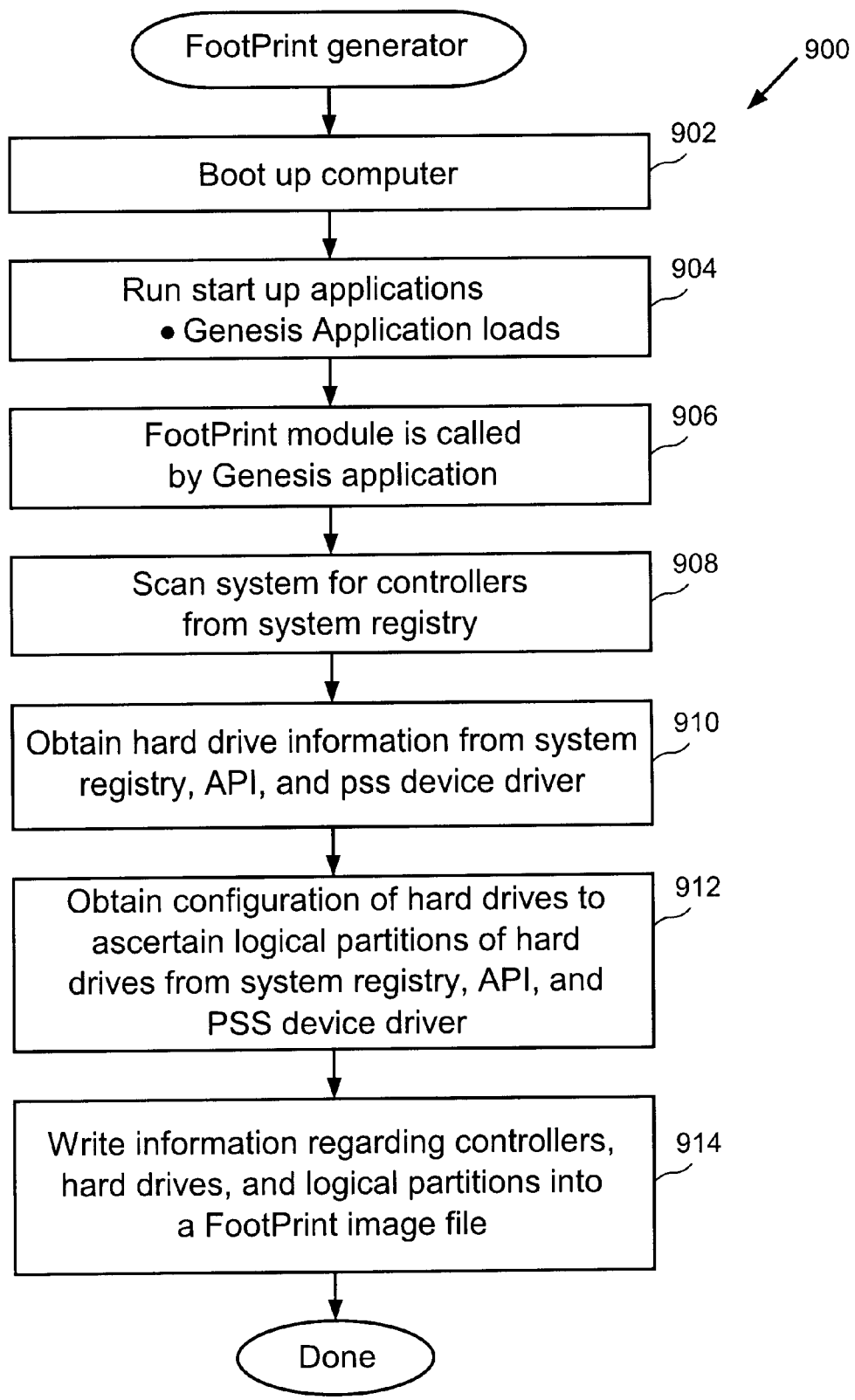
FIG. 5C shows a detailed flowchart diagram illustrating the method operations performed by the FootPrint generator in accordance with one embodiment of the invention.

In another embodiment of the present invention, FootPrint module 322 includes a FootPrint generator and a FootPrint analyzer. FIG. 5C shows a detailed flowchart diagram 900 illustrating the method operations performed by the FootPrint generator in accordance with this embodiment. The method begins in operation 902 in which the host computer system, e.g., a personal computer, is booted up using well-known techniques. In operation 904, the host computer system runs the start up applications. During this start up phase, the host computer system loads the Genesis application. Thereafter, in operation 906, the Genesis application issues a call to the FootPrint module 322 to obtain information regarding certain aspects of the system configuration at the time the system is booted up. The requested information regarding the system configuration may be varied, but preferably includes a listing of the hard drives connected to the host computer system, the logical partitions of those hard drives, and the controllers connected to those hard drives.

The FootPrint generator then proceeds to obtain the requested information regarding the system configuration in operations 908, 910, and 912. In operation 908, the FootPrint generator scans the computer system for controllers from the system registry using well-known techniques. In operation 910, the FootPrint generator obtains information regarding the hard drives connected to the computer system from the system registry, an application programming interface (API), and a partition session selector (PSS) device driver 310 (see FIG. 5A). In operation 912, the FootPrint generator obtains the configuration of the hard drives to ascertain the logical partitions of the hard drives from the system registry, the API, and PSS device driver 310. Those skilled in the art are familiar with suitable techniques for obtaining information regarding the hard drives and the logical partitions thereof from the system registry and the API, which is provided by Microsoft Corporation as part of Windows-type operating systems. PSS device driver 310 obtains information that cannot be obtained from either the system registry or the API, as will be explained in more detail later.

Once operation 912 has been performed, the FootPrint generator proceeds with operation 914 in which the information regarding the controllers, hard drives, and logical partitions of the hard drives is written into a FootPrint image file in accordance with well-known techniques. Upon creation of the FootPrint image file, the FootPrint generator is done.

An exemplary FootPrint image file for a controller is shown below in Table 5.

TABLE 5

[Controller00]
Type=fdc
RegistryPath=BIOS\*PNP0700\04
Description=Standard Floppy Disk Controller
Manufacturer=(Standard floppy disk controllers)
HardwareVersion=
IOAddressRange=3f2-3f5,0-0
BIOSAddress=0
BaseAddress=0
IRQNumber=6
DMAChannel=2
PCIVendorID=0
PCIDeviceID=0
PCIBusNumber=0
PCIDeviceNumber=0
PCIFunctionNumber=0
Problem=0
NumPhysicalDevices=1
PhysicalDeviceList=PhysicalDevice02

An exemplary FootPrint image file for a physical drive, e.g., a hard drive, is shown below in Table 6.

TABLE 6

[PhysicalDevice00]
DeviceType=DiskDrive
RegistryPath=ESDI\GENERIC__IDE__DISK__TYPE47__\MF&
CHILD0000&PCI&VEN__8086&DEV__7111&BUS__00&DEV__04&
FUNC__0100
DeviceName=GENERIC IDE DISK TYPE47
HardDiskNumber=128
PortNumber=0
PathID=0
TargetID=0
LogicalUnitNumber=0
VendorID=GENERIC TABLE 6-continued ProductID=IDE DISK TYPE47
RevisionLevel=
Int13Device=1
Removable=0
Problem=0
IOControlAccess=1
ReadAccess=1
WriteAccess=1
NTDiskSignature=00000000
GenesisBootID=Adaptec4472D640-167F-11d2-A707-444553540000
DiskID=07d4340a
PSSDevice=0
PSSMedia=0
Capacity=4157
SectorsPerTrack=63
Heads=255
Cylinders=530
Sectors=8514450
BytesPerSector=512
NumDriveLetters=3
DriveLetterAssigned=CDE
Boot=1
NumPartitions=0
PartitionList=
ControllerList=Controller03
NumLogicalDrives=3
LogicalDriveList=LogicalDrive00,LogicalDrive01,LogicalDrive02

An exemplary FootPrint image file for a logical drive, i.e., a logical partition of a physical drive, is shown below in Table 7.

TABLE 7

[LogicalDrive00]
DriveType=3
DriveLetter=C:
VolumeName=D1P1
SerialNumber=285022546
ComPonentLength=255
FileSystemFlags=00004006
FileSystemType=FAT
Capacity=2138243072
FreeSpace=251920384
Cluster=65254
SectorsPerCluster=64
BytesPerSector=512
OriginalDriveLetter=C:
GenesisPartition=0
GenesisPartitionNum=-1
Hidden=0
PhysicalDeviceList=PhysicalDevice00

Figure 5D:
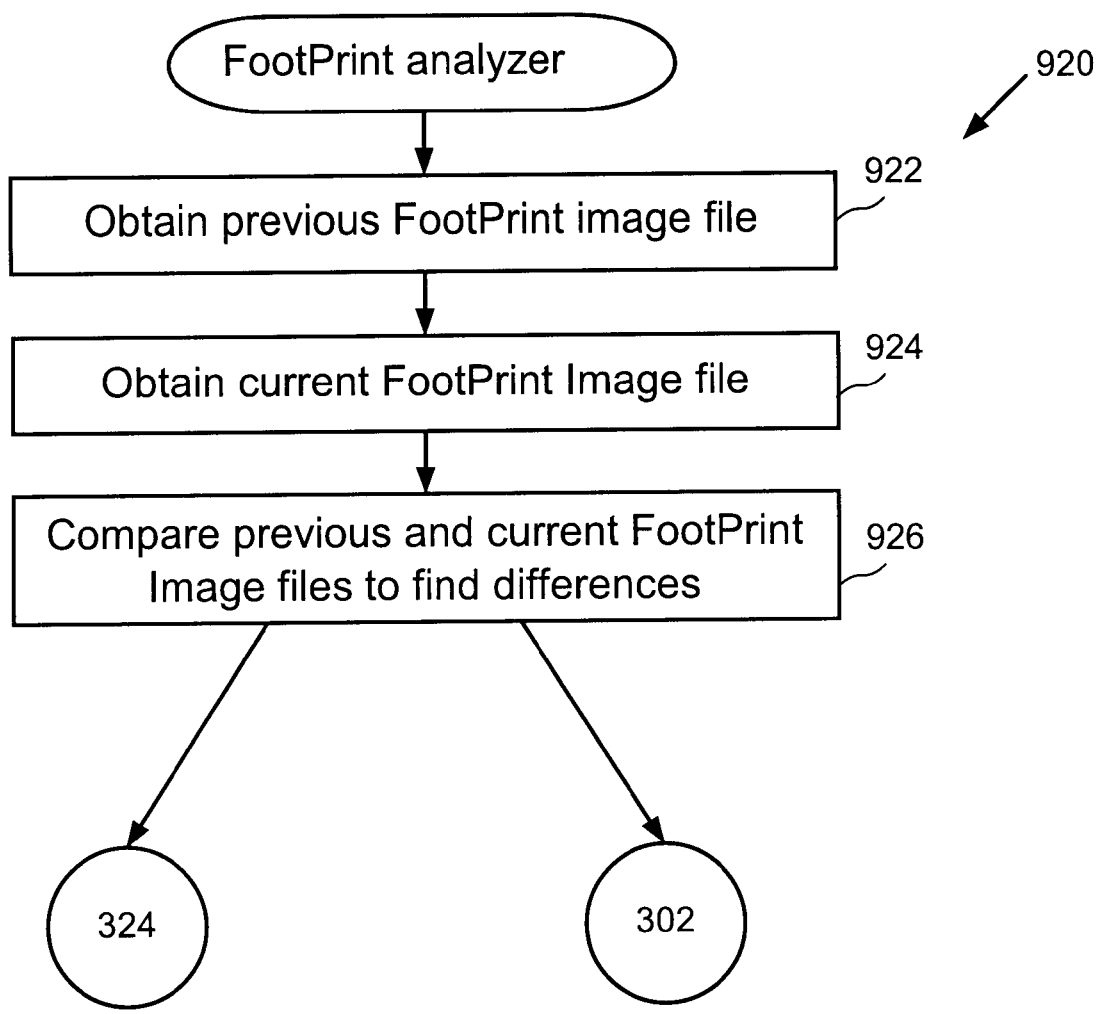
FIG. 5D shows a detailed flowchart diagram illustrating the method operations performed by the FootPrint analyzer in accordance with one embodiment of the invention.

FIG. 5D shows a detailed flowchart diagram 920 illustrating the method operations performed by the FootPrint analyzer in accordance with this embodiment. In operation 922, the FootPrint analyzer obtains a previous FootPrint image file, i.e., a FootPrint image file from a previous boot. Next, in operation 924, the FootPrint analyzer obtains a current FootPrint image file, i.e., a FootPrint image file from the current boot. The previous and current FootPrint image files are compared using well-known techniques to find differences therebetween in operation 926. This comparison enables the FootPrint analyzer to determine whether the host computer system has changed between boots. For example, the comparison may reveal that a hard drive has been added or that a hard drive is missing. As shown in FIG. 5D, the result obtained from the comparison performed in operation 926 is made available to a drive repair suite 324, which is described in detail below, and the Preparation Wizard 302. By way of example, if a hard drive is found to be missing, then the drive repair suite 324 may be used to attempt to repair the hard drive. If a hard drive has been added to the host computer system, then the Preparation Wizard 302 may be used to prepare the new hard drive to be a Genesis-enabled drive, as described herein.

Figure 5E:
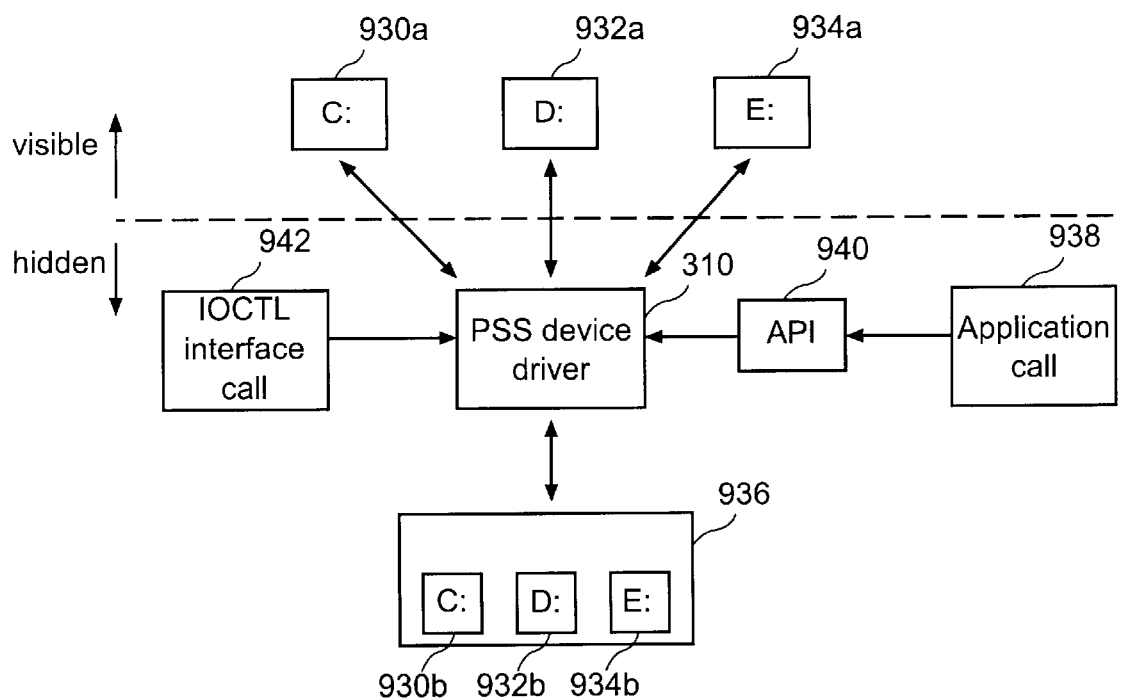
FIGS. 5E and 5F are block diagrams illustrating the functionality of the partition session selector device driver in accordance with one embodiment of the invention.
Figure 5F:
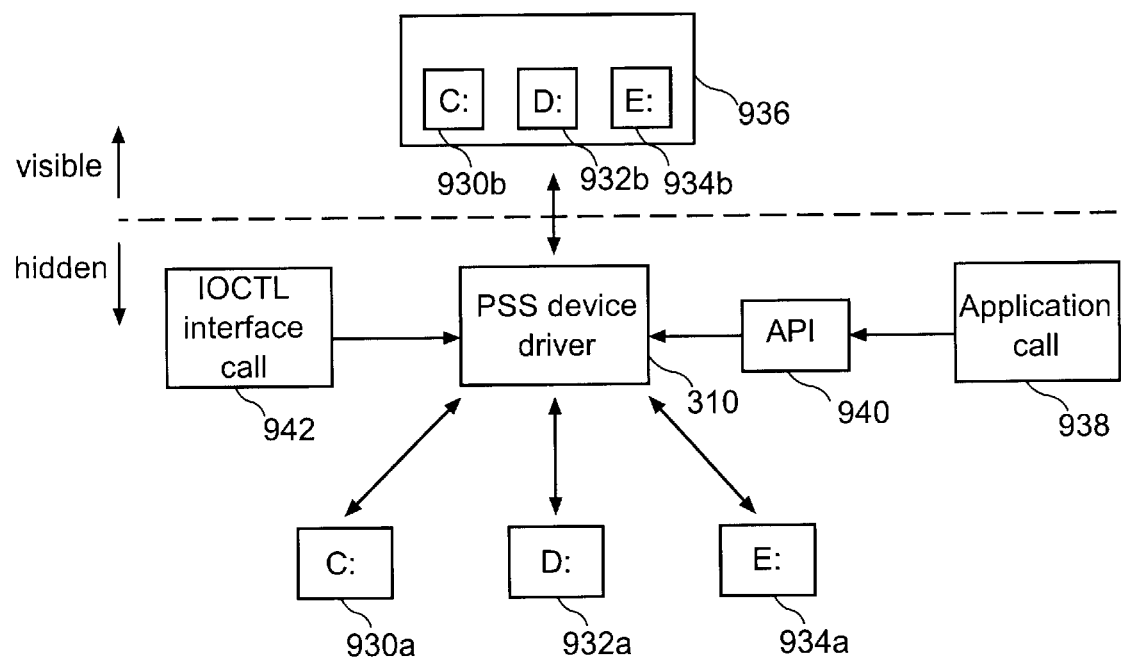

FIGS. 5E and 5F illustrate the functionality of partition session selector (PSS) device driver 310. As shown in FIG. 5E, in normal operation, i.e., when the host computer system boots from the primary storage device, PSS device driver 310 hides the secondary storage device, e.g., Genesis-enabled drive 936, from the user. Thus, as indicated by the respective arrows in FIG. 5E, logical partitions 930a, 932a, and 934a are visible to the user whereas the corresponding backup partitions 930b, 932b, and 934b of Genesis-enabled drive 936 are hidden from the user. In contrast, as shown in FIG. 5F, when working from the SpareTire, i.e., when the host computer boots from the secondary storage device, e.g., Genesis-enabled drive 936, PSS device driver 310 hides logical partitions 930a, 932a, and 934a from the user. Thus, as indicated by the respective arrows in FIG. 5F, backup partitions 930b, 932b, and 934b of Genesis-enabled drive 936 are visible to the user whereas logical partitions 930a, 932a, and 934a are hidden from the user.

As shown in FIGS. 5E and 5F, logical partitions 930a, 932a, and 934a and the corresponding backup partitions 930b, 932b, and 934b of Genesis-enabled drive 936 are designated C:, D:, and E:, respectively. This parallel designation scheme is enabled by PSS device driver 310, which controls Genesis-enabled drive 936. In particular, when application call 938 is issued to API 940 for information regarding the storage devices connected to the computer system, PSS device driver 310 traps the API call and thereby prevents API 940 from communicating with Genesis-enabled drive 936. When PSS device driver 310 traps an API call, an IOCTL interface call 942 is used to communicate directly with the PSS device driver to obtain the requested information regarding Genesis-enabled drive 936 without having the logical partitions thereof assigned different drive letters. In this manner, the corresponding backup partitions 930b, 932b, and 934b of Genesis-enabled drive 936 may retain the designations C:, D:, and E:, respectively, rather than being assigned the next available drive letters, e.g., F:, G:, and H:, which would occur in the absence of the PSS device driver.

Figure 5G:
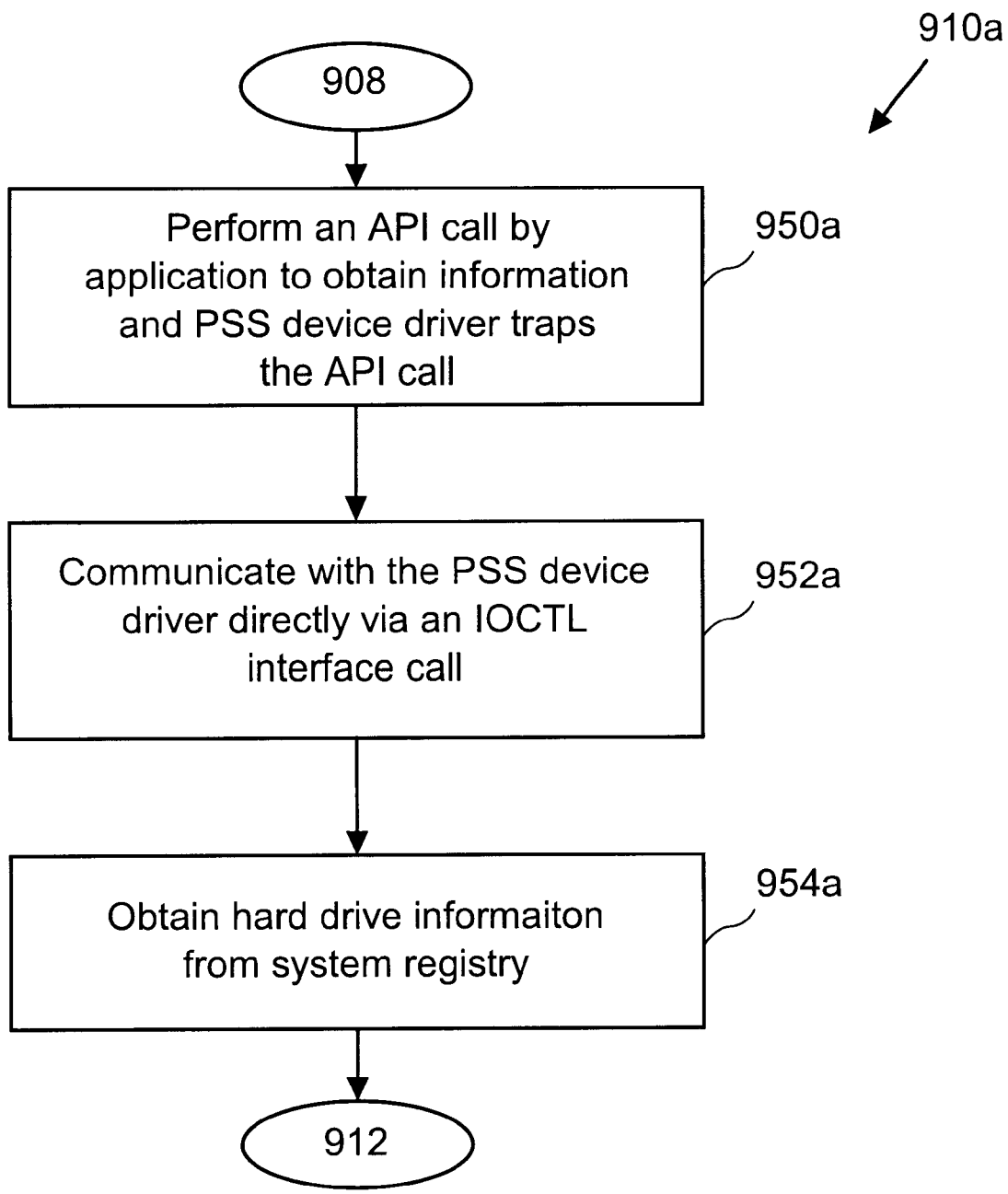
FIG. 5G is a flowchart diagram illustrating the method operations performed by the FootPrint generator to obtain hard drive information from the system registry, the API, and the PSS device driver in accordance with one embodiment of the present invention.

FIG. 5G is a flowchart diagram 910a illustrating the method operations performed by the FootPrint generator to obtain hard drive information from the system registry, the API, and the PSS device driver in accordance with one embodiment of the present invention. After scanning the system for controllers from the system registry in operation 908 (see FIG. 5C), in operation 950a, a call is made to the API to obtain hard drive information and PSS device driver 310 traps the API call to prevent such information from being obtained from the Genesis-enabled drive. To achieve this result, PSS device driver 310 is hooked into the host computer system in a specific location, as set forth below in connection with the description of FIG. 5I. As a result, in normal operation, operation 950a obtains information from the API, e.g., capacity, regarding the physical drive serving as the primary storage device, i.e., the hard drive that is visible to the user. In operation 952a, the FootPrint generator communicates directly with PSS device driver 310 via an IOCTL interface call that is specific to the PSS device driver. This communication obtains information regarding the physical drive serving as the secondary storage device, i.e., the Genesis-enabled drive, which, in normal operation, is hidden from the user. Finally, in operation 954a, additional information regarding the physical drives, e.g., vendor ID, I/O address, and drive letter, is obtained from the system registry in accordance with known techniques. Once this operation is complete, the FootPrint generator proceeds with operation 912 (see FIG. 5C).

Figure 5H:
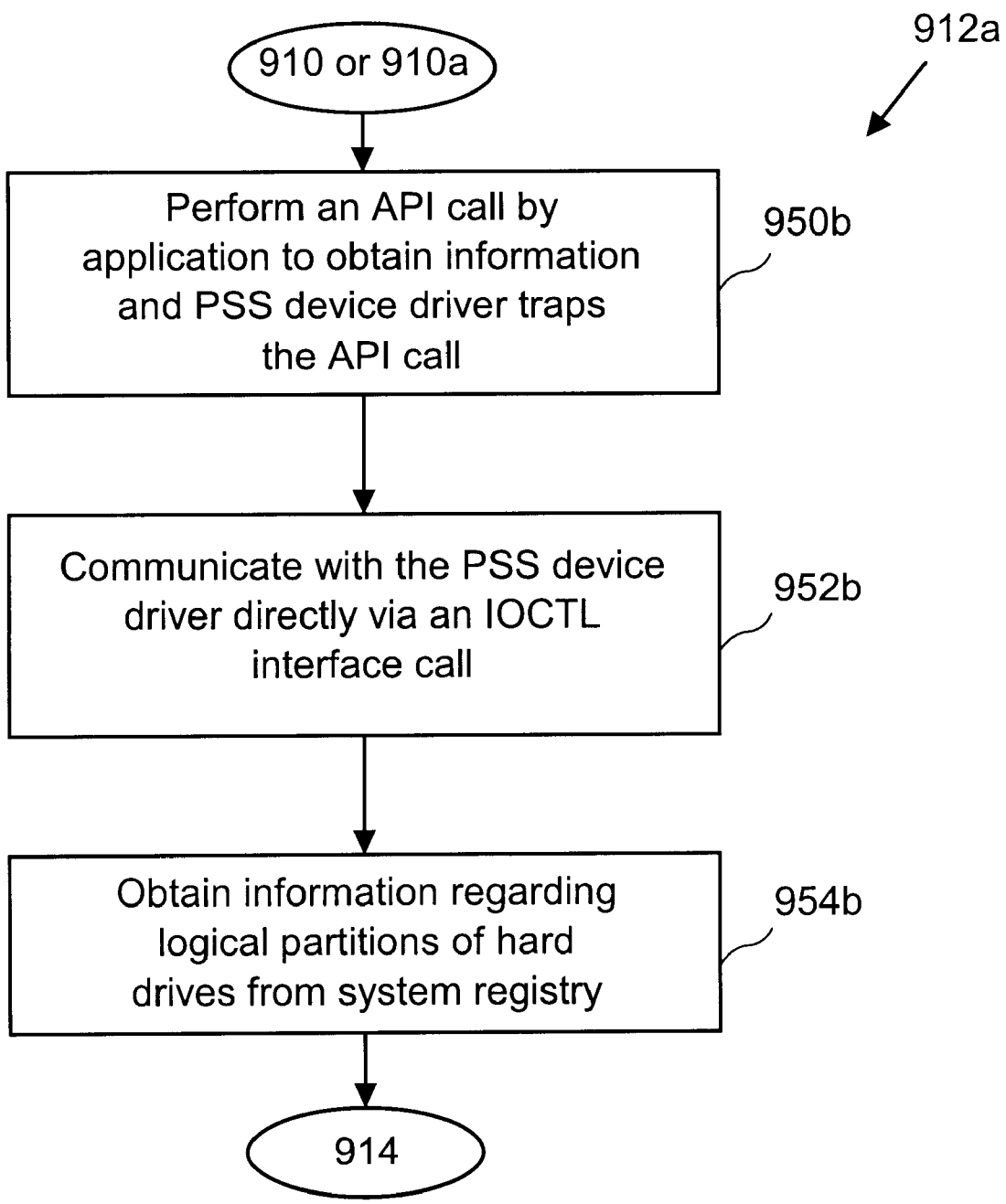
FIG. 5H is a flowchart diagram illustrating the method operations performed by the FootPrint generator to obtain the configuration of the hard drives from the system registry, the API, and the PSS device driver to ascertain the logical partitions of the hard drives in accordance with one embodiment of the present invention.

FIG. 5H is a flowchart diagram 912a illustrating the method operations performed by the FootPrint generator to obtain the configuration of the hard drives from the system registry, the API, and the PSS device driver to ascertain the logical partitions of the hard drives in accordance with one embodiment of the present invention. After operation 910 (see FIG. 5C) or 910a (see FIG. 5G), in operation 950b, a call is made to the API to obtain the configuration of the hard drives and PSS device driver 310 traps the API call to prevent such information from being obtained from the Genesis-enabled drive. As a result, in normal operation, operation 950b obtains information from the API regarding the logical partitions of the physical drive serving as the primary storage device, i.e., the hard drive that is visible to the user. In operation 952b, the FootPrint generator communicates directly with PSS device driver 310 via an IOCTL interface call that is specific to the PSS device driver. This communication obtains information regarding the logical partitions of the physical drive serving as the secondary storage device, i.e., the Genesis-enabled drive, which, in normal operation, is hidden from the user. Finally, in operation 954b, additional information regarding the logical partitions of the physical drives, e.g., serial number, sector size, and partition name, is obtained from the system registry in accordance with known techniques. Once this operation is complete, the FootPrint generator proceeds with operation 914 (see FIG. 5C).

By obtaining information from the API, the PSS device driver, and the system registry, e.g., in operations 910a and 912a shown in FIGS. 5G and 5H, respectively, the FootPrint generator compiles a complete set of data relating to the physical and logical representations of the primary and secondary storage devices connected to the host computer system. As described above, the information compiled by the FootPrint generator is written into a FootPrint image file. Exemplary FootPrint image files for a physical drive, e.g., a hard drive, and a logical drive, i.e., a logical partition of a physical drive, are shown above in Tables 6 and 7, respectively. Those skilled in the art will recognize that the information regarding the physical and logical drives included in the FootPrint image file may be varied from that shown in Tables 6 and 7.

Figure 5I:
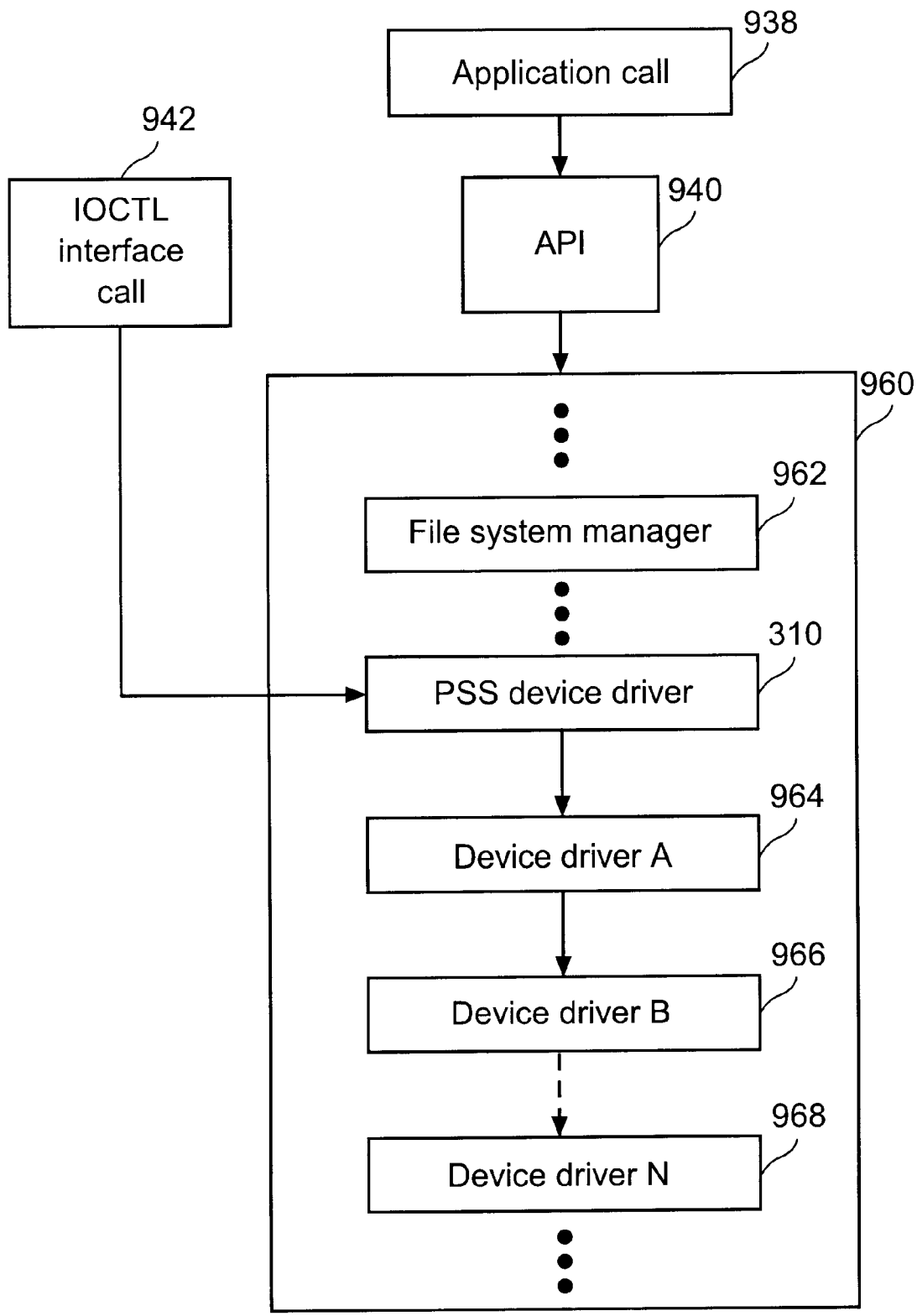
FIG. 5I is a block diagram showing a partition session selector device driver hooked in a layered drive structure in accordance with one embodiment of the present invention.

As mentioned above, PSS device driver 310 must be hooked into the host computer system in a specific location to trap the API call so that it does not communicate with the Genesis-enabled drive 936. As shown in FIG. 5I, PSS device driver 310 is hooked in layered drive structure 960 after File System Manager 962 but before the physical drives 964, 966, and 968, which are designated as device driver A, device driver B, and device driver N, respectively. In Windows-type operating systems, layered drive structure 960 is defined by Microsoft Corporation. PSS device driver 310 may be hooked in the layered drive structure 960 by placing the PSS device driver name in the system registry or the I/O subsystem directory, depending on the operating system. With PSS device driver 310 hooked in the proper location, when application call 938 is issued to API 940 for information regarding the storage devices connected to the computer system, the PSS device driver traps the API call and thereby prevents API 940 from communicating with the Genesis-enabled drive. As described above, when PSS device driver 310 traps the API call, an IOCTL interface call 942 is used to communicate directly with the PSS device driver. Although PSS device driver 310 must be hooked in layered drive structure 960 before the physical drives, those skilled in the art will appreciate that other drivers, e.g., modem drivers, mouse drivers, etc., may be hooked in layered drive structure 960 before the PSS device driver.

As described above, the IOCTL interface call used to communicate directly with the PSS device driver is specific to the PSS device driver. For a Windows 95 operating system, the IOCTL interface preferably includes the structures shown below in Table 8.

TABLE 8

```
typedef struct_PSS95NumDriveStruct
{
    int   NumPhysDrives;
    int   NumLogicalDrives;
} PSS95NumDriveStruct;
NumPhysDrives - Number of physical drives on the system
NumLogicalDrives - Number of logical drives on the system
typedef struct_PSS95DriveInfoStruct
{
    int                    NumPhysDriveStructs;
    PSS95PhysDriveStruct   *pPhysDrives;
    int                    NumLogicalDriveStructs;
    PSS95LogDriveStruct    *pLogDrives;
} PSS95DriveInfoStruct;
NumPhysDriveStructs - Number of entries allocated in the pPhysDrives array
pPhysDrives - Array of physical drive structures allocated dynamically
NumLogicalDriveStructs - Number of entries allocated in the pLogDrives array
pLogDrives - Array of logical drive structures allocated dynamically
typedef struct_PSS95PhysDriveStruct
{
    int      NumPartitions;     // Number of logical drives
                                // on this phys device
    int      DeviceType;        // SCSI or IDE
    DWORD    Heads;
    DWORD    Cylinders;
    DWORD    SectorsPerTrack;
    BYTE     HAID;
    BYTE     TargetID;
    BYTE     LUN;
    BYTE     Int13DriveNumber;  // 0x80, 0x81, etc.
    DWORD    DiskID;            // Genesis Disk ID
    BYTE     VendorID[8];       // NOT NULL terminated
    BYTE     ProductID[16];     // NOT NULL terminated
    BOOL     Genesis;           // True if Genesis device
    BOOL     Boot;              // True if Boot device
} PSS95PhysDriveStruct;
NumPartitions - Number of logical drives (partitions) on this physical device
DeviceType - indicated SCSI or IDE - see PDT_XXX constants
Heads - number of heads on drive
Cylinders - number of cylinders on drive
SectorsPerTrack - number of sectors per track on drive
HAID - HA ID of drive
TargetID - Target ID of drive
LUN - LUN of drive
Int13DriveNumber - Int 13 drive number of drive
DiskID - Unique Disk ID
VendorID - SCSI inquiry information - NOT NULL terminated
ProductID - SCSI inquiry information - NOT NULL terminated
Genesis - TRUE if Genesis device, FALSE if normal
Boot - TRUE if this drive is boot drive, FALSE if not
typedef struct_PSS95LogDriveStruct
{
    int     PhysDriveIndex;     // index into array of physical drives
    BYTE    OrigDriveLetter;    // 0-based (0=A, 1=B . . . , 0xFF = Unassigned)
    BYTE    CurrentDriveLetter; // 0-based (0=A, 1=B . . . 0xFF = Unassigned)
    BOOL    Genesis;            // True if exists on Genesis device
    BOOL    Hidden;             // is this partition on a Genesis device and
                                // hidden from user?
} PSS95LogDriveStruct;
PhysDriveIndex - Index into array of PSS95PhysDriveStruct's which is the physical drive for this
partition
OrigDriveLetter - 0-based drive designator originally assigned to the partition by OS, 0xFF if
unassigned
CurrentDriveLetter - 0-based drive designator currently assigned to the partition by the driver
Genesis - TRUE if this partition is on a Genesis device
Hidden - TRUE if this partition is hidden from user
typedef struct_PSS995GetCurrentPartitionStruct
{
    int     CurrentPartition;
} PSS95GetCurrentPartitionStruct;
CurrentPartition - 0-based partition index of current Genesis partition. If there are 4 Genesis
partitions, this value will be in the range of 0–3.
```

TABLE 8-continued

```
typedef struct _PSS95DriveLetterStruct
{
BYTE    DriveLetter;       // 0-based drive designator (A=0, B=1, etc . . . )
} PSS95DriveLetterStruct;
DriveLetter - 0-based drive designator of/for Genesis drive
typedef struct _PSS95BootStruct
{
    BOOL    IsGenesisBoot;      // TRUE if Genesis boot, FALSE if normal boot
} PSS95BootStruct;
IsGenesisBoot - TRUE if boot to Genesis drive, FALSE if normal boot
typedef struct _PSS95WriteProtectStruct
{
    BOOL    WriteProtect;
} PSS95WriteProtectStruct;
    WriteProtect - TRUE if/to write protect, FALSE if not
```

A number of exemplary functions for the IOCTL interface for a Windows 95 operating system are shown below in Tables 9–17. Table 9 illustrates an exemplary function for obtaining the number of physical devices and logical drives on the host computer system via a PSS95NumDriveStruct structure. In general, this function should be called before calling the PI_GET_DEVICE_INFO function to calculate how many physical and logical drive structures to allocate.

TABLE 9

```
Function: PI_GET_NUM_DEVICES
The parameters passed for this function include:
Input pointer:     NULL
Input length:      0
Output pointer:    PSS95NumDriveStruct
Output length:     sizeof(PSS95NumDriveStruct)
```

Table 10 illustrates an exemplary function for obtaining information about the devices on the host computer system via a PSS95DriveInfoStruct structure. In general, the function PI_GET_NUM_DEVICES should be called first to calculate how many PSS95PhysDriveStruct structures and PSS95LogDriveStruct structures should be allocated. The values for the NumPhysDriveStruct and NumLogicalDriveStruct structures should be the number of structures allocated and passed down to the driver. These values must be filled out before calling the driver.

TABLE 10

```
Function: PI_GET_DEVICE_INFO
The parameters passed for this function include:
Input pointer:     NULL
Input length:      0
Output pointer:    PSS95DriveInfoStruct
Output length:     sizeof(PSS95DriveInfoStruct)
```

Table 11 illustrates an exemplary function for obtaining the partition on the Genesis drive to which I/O requests are being directed. This information is returned via a PSS95GetCurrentPartitionStruct structure.

TABLE 11

```
Function: PI_GET_CURRENT_PARTITION
The parameters passed for this function include:
Input pointer:     NULL
Input length:      0
Output pointer:    PSS95GetCurrentPartitionStruct
Output length:     sizeof(PSS95GetCurrentPartitionStruct)
```

Table 12 illustrates an exemplary function for setting the partition on the Genesis drive to which I/O requests are being directed. This information is passed via a DWORD.

TABLE 12

```
Function: PI_SET_CURRENT_PARTITION
The parameters passed for this function include:
Input pointer:     DWORD               //The partition number
Input length:      sizeof(DWORD)
Output pointer:    NULL
Output length:     0
```

Table 13 illustrates an exemplary function for obtaining the drive letter currently associated with the Genesis drive. This information is returned via a PSS95DriveLetterStruct structure.

TABLE 13

```
Function: PI_GET_DRIVE_LETTER
The parameters passed for this function include:
Input pointer:     NULL
Input length:      0
Output pointer:    PSS95DriveLetterStruct
Output length:     sizeof(PSS95DriveLetterStruct)
```

Table 14 illustrates an exemplary function for setting the drive letter associated with the Genesis drive. This drive letter is set via a PSS95DriveLetterStruct structure. This function changes the Genesis drive letter on-the-fly and does not require a re-boot.

TABLE 14

```
Function: PI_SET_DRIVE_LETTER
The parameters passed for this function include:
Input pointer:     PSS95DriveLetterStruct
Input length:      sizeof(PSS95DriveLetterStruct)
Output pointer:    NULL
Output length      0
```

Table 15 illustrates an exemplary function for determining whether the host computer system booted to the normal boot drive, i.e., the primary storage device, or the Genesis-enabled drive, i.e., the secondary storage device. This information is returned via a PSS95BootStruct structure.

TABLE 15

Function: PI_IS_GENESIS_BOOT
The parameters passed for this function include:
Input pointer:   NULL
Input length:    0
Output pointer:  PSS95BootStruct
Output length:   sizeof(PSS95BootStruct)

Table 16 illustrates an exemplary function for write protecting the Genesis-enabled drive. This function is set via a PSS95WriteProtectStruct structure.

TABLE 16

Function: PI_WRITE_PROTECT
The parameters passed for this function include:
Input pointer:   PSS95WriteProtectStruct
Input length:    sizeof(PSS95WriteProtectStruct)
Output pointer:  NULL
Output length:   0

Table 17 illustrates an exemplary function for determining whether the drive letter for the Genesis-enabled drive is write protected. This information is returned via a PSS95WriteProtectStruct structure.

TABLE 17

Function: PI_GET_WRITE_PROTECT
The parameters passed for this function include:
Input pointer:   NULL
Input length:    0
Output pointer:  PSS95WriteProtectStruct
Output length:   sizeof(PSS95WriteProtectStruct)

In addition, the IOCTL interface preferably includes a header file. For a Windows 95 operating system, this header file, e.g., PSS95CTL.H, preferably contains all structures and constants necessary to communicate with the PSS device driver via the DeviceIocontrol interface.

An exemplary specification for a PSS device driver supporting a Windows NT (version 4.0) operating system within a PC (Intel) architecture is set forth in Table 18. The PSS device driver is a kernel mode filter driver, which, as discussed above, is a module of the Genesis application that provides control of and access to storage devices and partitions within the host computer system. Among other functions, the PSS device driver provides specific support and control of the Genesis adapter (e.g., AHA2930C) with Genesis BIOS support, as well as specific support and control of the Genesis storage device and its partitions. In conjunction with a Windows NT PSSDL device driver, the PSS device driver provides the "low-level" support required for the functionality of the Genesis application described herein.

TABLE 18

1. Operating System
    The PSS driver is stored in the %SystemRoot%\system32\drivers directory. The driver is loaded
    via the registry key HKEY_LOCAL_MACHINE\SYSTEM\CurrentControlSet\Services\PSS,
    which should contain the following keys.

| Key | Type | Value | Description |
    |---|---|---|---|
    | ErrorControl | REG_DWORD | 0x1 | Continues OS load if driver error. |
    | Group | REG_SZ | "Filter" | Specifies load order group. |
    | Start | REG_DWORD | 0x0 | Specifies the OS loader starts the driver. |
    | Tag | REG_DWORD | 0x1 | Specifies load order within load group. |
    | Type | REG_DWORD | 0x1 | Specifies kernel mode driver. |
    | Flags | REG_DWORD | 0x1 | Specifies flag to load driver. |

2. Initialization
    The driver entry point for initialization is DriverEntry(). The following sections describe
    initialization functions and are in the order in which they occur.
    2.1. DriverFlags
    The driver first attempts to retrieve the driver flags from within the registry path -
    HKEY_LOCAL_MACHINE\SYSTEM\CurrentControlSet\Services\PSS\Flags.
    If the driver flags are retrieved successfully and the LoadFlag is TRUE, the driver will load,
    otherwise it will not load and return an error status.
    2.2. PSS Device
    The driver creates a driver control device named PSS. This is the device used by Win32
    applications to control and configure the driver via IOCTLs.
    2.3. BIOS Header
    The driver searches the memory range 0x0C0000 through 0x0E0000 for the Genesis BIOS
    header. If the header is not found, the driver deletes the control device PSS, does not load and
    returns error status.
    2.4. Adapter Resources
    The driver compares the resources found in the Genesis BIOS header to adapters the operating
    system has found. If no resources match, the driver deletes the control device PSS, does not load
    and returns error status.
    2.5. PSS Device Detection
    The driver attempts to detect a PSS device by issuing a SCSI inquiry command to every storage
    device (PhysicalDriveX), and searching the inquiry data - vendor and product IDs, for the
    determined vendor and product strings. If the inquiry command fails or the vendor or product IDs
    don't compare, the driver deletes the control device PSS, does not load and returns error status.
    2.6. Boot Environments
    There are two distinct initialization and run time environments. The environment used to
    initialize and dictate run time behavior is selected depending upon the system boot device.
    The Genesis adapter with Genesis BIOS support can map the PSS device to the system boot
    device (BIOS drive 0x80) via user selection. The driver must determine if the PSS device and
    media combination are the system boot device. This is accomplished by comparing the disk
    signature found in the registry path -

TABLE 18-continued

HKEY_LOCAL_MACHINE\HARDWARE\DESCRIPTION\MultifunctionAdapter\XX\
DiskControler\XXX\DiskPeripheral\0\Identifier,
to the actual PSS device disk signature read from the PSS device media.

2.6.1. Non-PSS Device Boot Environment

If the PSS device is not the boot device, the driver will attach (intercept I/O requests) to the PSS device only.

If the PSS media is determined to be Genesis media, I/O control, read, and write access to the PSS physical device is enabled. For the PSS device's first partition I/O control and read accesses are enabled, write access is disabled. For all other partitions I/O control, read, and write access is disabled.

If the PSS media is determined to not be Genesis media, I/O control, read, and write access to the PSS physical and all partition devices is enabled.

The driver will return the media type as RemovableMedia for get disk geometry IOCTL calls to the PSS physical and partition devices.

2.6.2. PSS Device Boot Environment

If the PSS device is the boot device, the driver will attach (intercept I/O requests) to the PSS device as well as all storage devices (non-removable) in the system up to the number of partitions on the PSS device.

If the PSS media is determined to be Genesis media, I/O control, read, and write access is enabled for the physical and all partition devices of the PSS device. I/O control, read, and write access is disabled for all other attached-to physical and partition devices. The driver will return the media type as FixedMedia for get disk geometry IOCTL calls to the PSS physical and partition devices.

If the PSS media is determined to not be Genesis media, I/O control, read, and write access is enabled for the physical and all partition devices of the PSS device, and all other attached-to physical and partition devices. The driver will return the media type as RemovableMedia for get disk geometry IOCTL calls to the PSS physical and partition devices. The driver will return the media type as FixedMedia for get disk geometry IOCTL calls to all other attached-to physical and partition devices 2.7. Re-Initialization The driver requests the operating system to call the driver entry point (DriverEntry()) again, after loading and initializing all other drivers in the GroupOrderList of the registry. This is done to attach to any storage device added after the first call to DriverEntry, depending upon the boot environment.

3. RunTime

The following are entry points into the driver, called from drivers layered above the PSS driver.

3.1. Create

Returns STATUS_SUCCESS, indicating that the device or partition exists. For the caller, this request opens the device for I/O.

A higher-level driver is attempting to connect or attach one of its device objects to the target device object, or a user-mode process has attempted to open a file stored on the physical device, thereby causing a file system to carry out a mount operation.

3.2. Read Requests

If the device's read access is enabled, the request is passed to the next layered driver in the chain.
If the device's read access is disabled, the request is returned with error status.

3.3. Write Requests

If the devices write access is disabled, the request is returned with error status.
If the device's write access is enabled the following occur.
    A count of write requests maintained per device is incremented.
    An I/O completion routine is setup to be called after the request passed to the next
    layered driver in the chain completes.
    The I/O completion routine decrements the count of write requests maintained per
    device.
This count of write requests is maintained to provide synchronization when switching current devices.

3.4. Device IOCTL Interface

If the device's I/O control access is enabled, the request is passed to the next layered driver in the chain, unless it is one of the following IOCTL codes.
IOCTL_DISK_VERIFY
IOCTL_DISK_GET_DRIVE_GEOMETRY
IOCTL_DISK_CHECK_VERIFY
IOCTL_STORAGE_CHECK_VERIFY
IOCTL_DISK_GET_PARTITION_INFO
IOCTL_DISK_SET_PARTITION_INFO
IOCTL_DISK_GET_DRIVE_LAYOUT
IOCTL_DISK_SET_DRIVE_LAYOUT
IOCTL_DISK_IS_WRITABLE
IOCTL_DISK_FIND_NEW_DEVICES
If the code is IOCTL_DISK_GET_DRIVE_GEOMETRY, the driver updates the MediaType field of the DISK_GEOMETRY structure, with the device flags removable flag. The remaining codes are called by the PSS driver to the next layered driver in the chain. If the IOCTL call was successful, the driver will then attempt to attach to any new devices found during the called IOCTL.

If the device's I/O control access is disabled, the request is returned with error status.

3.5. PSS Device IOCTL Interface

The following IOCTL codes are the only method of configuring and controlling the driver beyond its own initial configuration. This interface is supported by Win32 as DeviceIoControl functions. The calling process must have the proper security rights (administrative) to successfully make these calls.

3.5.1. PSS_IOCTL_BOOT

TABLE 18-continued

This IOCTL returns a flag via a PSS_BOOT structure, indicating weather the PSS device is the boot device.
DeviceIoControl Parameters:
```
    typedef struct  _PSS_BOOT
    {
        BOOLEAN   PSSBoot;
    }
    PSS_BOOT, *PPSS_BOOT;
    Input Pointer:  None
    Input Length:   0
    Output Pointer: PPSS_BOOT
    Output Length:  sizeof(PSS_BOOT)
Returns: BOOLEAN   PSSBoot   TRUE = PSS device is the boot device.
                             FALSE = PSS device is not the boot
         device.
```
3.5.2. PSS_IOCTL_FULL_STATUS_LENGTH
This IOCTL returns the required buffer size, in bytes, via a FULL_STATUS_LENGTH structure, for a PSS_IOCTL_GET_FULL_STATUS IOCTL call to the driver.
DeviceIoControl Parameters:
```
    typedef struct  _FULL_STATUS_LENGTH
    {
        ULONG       FullStatusLength;
    }
    FULL_STATUS_LENGTH, *PFULL_STATUS_LENGTH;
    Input Pointer:  None
    Input Length:   0
    Output Pointer: PFULL_STATUS_LENGTH
    Output Length:  sizeof(FULL_STATUS_LENGTH)
Returns: ULONG     FullStatusLength
         Required byte size buffer for use in the PSS_IOCTL_GET_FULL_STATUS
         IOCTL call.
```
3.5.3. PSS_IOCTL_GET_FULL_STATUS
This IOCTL returns the status of every device the driver is attached to via a FULL_STATUS and STATUS structures. It should be preceded by a PSS_IOCTL_FULL_STATUS_LENGTH IOCTL call to get the buffer size required for this IOCTL.
DeviceIoControl Parameters:
```
    typedef struct  _STATUS
    {
        BOOLEAN           PSSDevice;
        BOOLEAN           PSSMedia;
        ULONG             HarddiskNumber;
        ULONG             PartitionNumber;
        SCSI_ADDRESS      ScsiAddress;
        DISK_GEOMETRY     Geometry;
        ACCESS            Access;
        UCHAR             DiskId[32];
        UCHAR             VendorId[9];
        UCHAR             ProductId[17];
        ULONG             DiskSerialNumber;
        ULONG             PartitionCount;
    }
    STATUS, *PSTATUS;
    typedef struct  _FULL_STATUS
    {
        ULONG             NumberOfDrives;
        STATUS            DriveStatus[NumberOfDrives];
    }
    Input Pointer:  None
    Input Length:   0
    Output Pointer: PFULL_STATUS
    Output Length:  sizeof(FULL_STATUS)+STATUS
Returns: NumberOfDrives   = Number of drives status is returned for.
         PSSDevice        = TRUE if device is the PSS device, FALSE if not.
         PSSMedia         = TRUE if current media in the PSS device is
                            Genesis media, FALSE if not.
         HarddiskNumber   = System ordered hard drive number.
         PartitionNumber  = Partition number - 0 = physical device.
         ScsiAddress      = OS defined device address.
         Geometry         = Original geometry of attached device.
         Access           = Access flags.
         DiskId           = Unique identifier for each physical device.
         VendorId         = VendorId field of SCSI-2 inquiry data.
         ProductId        = ProductId field of SCSI-2 inquiry data.
         DiskSerialNumber = OS assigned disk serial number.
         PartitionCount   = Partition count for physical devices only.
```
3.5.4. PSS_IOCTL_GET_STATUS
This IOCTL returns the status of the specified device the driver is attached to, via a STATUS structure.
DeviceIoControl Parameters:

TABLE 18-continued

```
    typedef struct  _PSS_IOCTL_DEVICE
    {
        SCSI_ADDRESS    ScsiAddress;
        ULONG           PartitionNumber;
    }
    PSS_IOCTL_DEVICE, *PPSS_IOCTL_DEVICE;
    typedef struct  _STATUS
    {
        BOOLEAN         PSSDevice;
        BOOLEAN         PSSMedia;
        ULONG           HarddiskNumber;
        ULONG           PartitionNumber;
        SCSI_ADDRESS    ScsiAddress;
        DISK_GEOMETRY   Geometry;
        ACCESS          Access;
        UCHAR           DiskId[32];
        UCHAR           VendorId[9];
        UCHAR           ProductId[17];
        ULONG           DiskSerialNumber;
        ULONG           PartitionCount;
    }
    STATUS, *PSTATUS;
    Input Pointer:   PPSS_IOCTL_DEVICE
    Input Length:    sizeof(PSS_IOCTL_DEVICE)
    Output Pointer:  PSTATUS
    Output Length:   sizeof(STATUS)
Returns: PSSDevice         = TRUE if device is the PSS device, FALSE if not.
         PSSMedia          = TRUE if current media in the PSS device is
                             Genesis media, FALSE if not.
         HarddiskNumber    = System ordered hard drive number.
         PartitionNumber   = Partition number - 0 = physical device.
         ScsiAddress       = OS defined device address.
         Geometry          = Original geometry of attached device.
         Access            = Access flags.
         DiskId            = Unique identifier for each physical device.
         VendorId          = VendorId field of SCSI-2 inquiry data.
         ProductId         = ProductId field of SCSI-2 inquiry data.
         DiskSerialNumber  = OS assigned disk serial number.
         PartitionCount    = Partition count for physical devices only.
```
3.5.5. PSS_IOCTL_GET_PARTITION_INFO
This IOCTL returns the PARTITION_INFORMATION of the specified device the driver is
attached to, via a PARTITION_INFORMATION structure, regardless of the device's current I/O
control access.
DeviceIoControl Parameters:
```
    typedef struct  _PSS_IOCTL_DEVICE
    {
        SCSI_ADDRESS    ScsiAddress;
        ULONG           PartitionNumber;
    }
    PSS_IOCTL_DEVICE, *PPSS_IOCTL_DEVICE;
    PPARTITION_INFORMATION;
    Input Pointer:   PPSS_IOCTL_DEVICE
    Input Length:    sizeof(PSS_IOCTL_DEVICE)
    Output Pointer:  PPARTITION_INFORMATION
    Output Length:   sizeof(PARTITION_INFORMATION)
Returns: PPARTITION_INFORMATION
```
3.5.6. PSS_IOCTL_GET_ACCESS
This IOCTL returns the access rights of the specified device the driver is attached to, via a
GET_ACCESS structure.
DeviceIoControl Parameters:
```
    typedef struct  _PSS_IOCTL_DEVICE
    {
        SCSI_ADDRESS    ScsiAddress;
        ULONG           PartitionNumber;
    }
    PSS_IOCTL_DEVICE, *PPSS_IOCTL_DEVICE;
    typedef struct  _GET_ACCESS
    {
        BOOLEAN  IOControlAccess;
        BOOLEAN  ReadAccess;
        BOOLEAN  WriteAccess;
    }
    GET_ACCESS, *PGET_ACCESS;
    Input Pointer:   PPSS_IOCTL_DEVICE
    Input Length:    sizeof(PSS_IOCTL_DEVICE)
    Output Pointer:  PGET_ACCESS
    Output Length:   sizeof(GET_ACCESS)
Returns: BOOLEAN  IOControlAccess  = TRUE if access is enabled.
         BOOLEAN  ReadAccess       = FALSE if disabled.
```

TABLE 18-continued

```
        BOOLEAN   WriteAccess
3.5.7. PSS_IOCTL_SET_ACCESS
This IOCTL sets the access rights of the specified device the driver is attached to, via a ACCESS
structure.
DeviceIoControl Parameters:
    typedef struct   _PSS_IOCTL_DEVICE
    {
        SCSI_ADDRESS   ScsiAddress;
        ULONG          PartitionNumber;
    }
    PSS_IOCTL_DEVICE, *PPSS_IOCTL_DEVICE;
    typedef struct   _SET_ACCESS
    {
        PSS_IOCTL_DEVICE  PSSDevice;
        BOOLEAN   IOControlAccess;
        BOOLEAN   ReadAccess;
        BOOLEAN   WriteAccess;
    }
    SET_ACCESS, *PSET_ACCESS;
    Input Pointer:   PSET_ACCESS
    Input Length:    sizeof(SET_ACCESS)
    Output Pointer:  NULL
    Output Length:   0
Returns: DeviceIoControl status.
3.5.8. PSS_IOCTL_GET_BIOS_HEADER
This IOCTL returns the Genesis adapter BIOS header via a PSS_BIOS_HEADER structure.
DeviceIoControl Parameters:
typedef struct   _PSS_BIOS_HEADER
{
    UCHAR Signature[PSS_ADAPTER_SIGNATURE_LENGTH];   // 0–14
    UCHAR    Revision;                                // 15
    UCHAR    HeaderLength;                            // 16
    UCHAR    Checksum;                                // 17
    USHORT   PSSNVRAMOffset;                          // 18–19
    union
    {
        struct
        {
            ULONGPSSBoot              :   1;          // 20
            ULONGNVRAMOffsetValid     :   1;          // 20
            ULONGNVRAMSize            :   1;          // 20
            ULONGBBSSystem            :   1;          // 20
            ULONGSimpleBoot           :   1;          // 20
            ULONG Reserved            :  11;          // 20–21
            ULONGFunction             :   3;          // 22
            ULONGDevice               :   5;          // 22
            ULONGPCIBus               :   8;          // 23
        };
        ULONG Flags;
    };
    USHORT    IOAddress;                              // 24–25
}
PSS_BIOS_HEADER, *PPSS_BIOS_HEADER
Input Pointer:   NULL
InputLength:     0
Output Pointer:  PPSS_BIOS_HEADER
Output Length:   sizeof(PSS_BIOS_HEADER)
Returns: PSS_BIOS_HEADER
3.5.9. PSS_IOCTL_GET_TYPE
This IOCTL returns the media type reported by the IOCTL_DISK_GET_DRIVE_GEOMETRY
IOCTL call, for the PSS device only, via a GET_TYPE structure
DeviceIoControl Parameters:
    typedef struct   _GET_TYPE
    {
        MEDIA_TYPE   MediaType;
    }
    GET_TYPE, *PGET_TYPE
    Input Pointer:   NULL
    InputLength:     0
    Output Pointer:  PGET_TYPE
    Output Length:   sizeof(GET_TYPE)
Returns: MEDIA_TYPE   MediaType   (See NT DDK)
3.5.10. PSS_IOCTL_SET_TYPE
This IOCTL sets the media type reported by the IOCTL_DISK_GET_DRIVE_GEOMETRY
IOCTL call, for the PSS device Ofly, via a SET_TYPE structure
DeviceIoControl Parameters:
    typedef struct   _SET_TYPE
    {
        MEDIA_TYPE   MediaType;
```

TABLE 18-continued

```
        }
        SET_TYPE, *PSET_TYPE;
        Input Pointer:   PSET_TYPE
        Input Length:    sizeof(SET_TYPE)
        Output Pointer:  NULL
        Output Length:   0
Returns: DeviceIoControl status.
3.5.11. PSS_IOCTL_GET_PSS_STATUS
This IOCTL returns the status of the PSS device the driver is attached to, via a STATUS structure.
DeviceIoControl Parameters:
    typedef struct   _STATUS
        {
        BOOLEAN          PSSDevice;
        BOOLEAN          PSSMedia;
        ULONG            HarddiskNumber;
        ULONG            PartitionNumber;
        SCSI_ADDRESS     ScsiAddress;
        DISK_GEOMETRY    Geometry;
        ACCESS           Access;
        UCHAR            DiskId[32];
        UCHAR            VendorId[9];
        UCHAR            ProductId[17];
        ULONG            DiskSerialNumber;
        ULONG            PartitionCount;
        }
        STATUS, *PSTATUS;
        Input Pointer:   NULL
        Input Length:    0
        Output Pointer:  PSTATUS
        Output Length:   sizeof(STATUS)
Returns: PSSDevice        = TRUE if device is the PSS device, FALSE if not.
         PSSMedia         = TRUE if current media in the PSS device is
                            Genesis media, FALSE if not.
         HarddiskNumber   = System ordered hard drive number.
         PartitionNumber  = Partition number - 0 = physical device.
         ScsiAddress      = OS defmed device address.
         Geometry         = Original geometry of attached device.
         Access           = Access flags.
         DiskId           = Unique identifier for each physical device.
         VendorId         = VendorId field of SCSI-2 inquiry data.
         ProductId        = ProductId field of SCSI-2 inquiry data.
         DiskSerialNumber = OS assigned disk serial number.
         PartitionCount   = Partition count for physical devices only.
3.5.12. PSS_IOCTL_GET_BIOS_BOOT_BYTE
This IOCTL returns the Genesis byte from within the NVRAM of the adapter.
DeviceIoControl Parameters:
    typedef struct   _BIOS_BOOT_BYTE
        {
        UCHAR    BootByte;
        }
        BIOS_BOOT_BYTE, *PBIOS_BOOT_BYTE;
        Input Pointer:   NULL
        InputLength:     0
        Output Pointer:  PBIOS_BOOT_BYTE
        Output Length:   sizeof(BIOS_BOOT_BYTE)
Returns: UCHAR    BootByte    Genesis byte value.
3.5.13. PSS_IOCTL_SET_BIOS_BOOT_BYTE
This IOCTL sets the Genesis byte in the NVRAM of the adapter.
DeviceIoControl Parameters:
    typedef struct   _BIOS_BOOT_BYTE
        {
        UCHAR    BootByte;
        }
        BIOS_BOOT_BYTE, *PBIOS_BOOT_BYTE;
        Input Pointer:   PBIOS_BOOT_BYTE
        Input Length:    sizeof(BIOS_BOOT_BYTE)
        Output Pointer:  NULL
        Output Length:   0
Returns: DeviceIoControl status.
3.5.14. PSS_IOCTL_GET_CURRENT_DEVICE
This IOCTL returns the current device of the specified device.
DeviceIoControl Parameters:
    typedef struct   _PSS_IOCTL_DEVICE
        {
        SCSI_ADDRESS     ScsiAddress;
        ULONG            PartitionNumber;
        }
        PSS_IOCTL_DEVICE, *PPSS_IOCTL_DEVICE;
        Input Pointer:   PPSS_IOCTL_DEVICE
```

TABLE 18-continued

```
    Input Length:    sizeof(PSS_IOCTL_DEVICE)
    Output Pointer:  PPSS_IOCTL_DEVICE
    Output Length:   sizeof(PSS_IOCTL_DEVICE)
Returns: Current device: PPSS_IOCTL_DEVICE
3.5.15. PSS_IOCTL_SET_CURRENT_DEVICE
This IOCTL sets the current device of the specified device
DeviceIoControl Parameters:
    typedef struct  _SET_CURRENT_DEVICE
    {
        PSS_IOCTL_DEVICE    DeviceTarget;
        PSS_IOCTL_DEVICE    DeviceSource;
    }
    SET_CURRENT_DEVICE, *PSET_CURRENT_DEVICE;
    Input Pointer:   PSET_CURRENT_DEVICE
    Input Length:    sizeof(SET_CURRENT_DEVICE)
    Output Pointer:  NULL
    Output Length:   0
Returns: Current device: PPSS_IOCTL_DEVICE
3.5.16. PSS_IOCTL_ORIGINAL_TO_CURRENT
This IOCTL sets the current device of the specified device.
DeviceIoControl Parameters:
    typedef struct  _PSS_IOCTL_DEVICE
    {
        SCSI_ADDRESS    ScsiAddress;
        ULONG           PartitionNumber;
    }
    PSS_IOCTL_DEVICE, *PPSS_IOCTL_DEVICE
    Input Pointer:   PPSS_IOCTL_DEVICE
    Input Length:    sizeof(PSS_IOCTL_DEVICE)
    Output Pointer:  NULL
    Output Length:   0
Returns: DeviceIoControl status.
```

The function headers for the exported functions from a DLL are set forth in Table 19. A common interface through DLLs (one for Windows 95/98 and another for Windows NT) is provided to hide as many low-level, operating system specific details as practical, to provide the same interface regardless of operating system, and to simplify tasks by combining low-level tasks at the DLL level. Through calls to the DLL, the Genesis application may:

1) determine whether the Genesis drive is bootable;
2) determine the number of partitions on the Genesis drive;
3) determine which partition is in use;
4) change the current partition on the Genesis drive; and
5) set the access for a partition.

The current Genesis drive is known to one or both of the PSS device driver and the DLL. Therefore, the functions exported to the application need only be passed pointers to where the information is to be passed for each function.

TABLE 19

The following are the function headers for the exported functions from the DLL. All functions return
TRUE if successful, FALSE if unsuccessful except the IsDriverLoaded function, which returns TRUE if
loaded, and FALSE if not loaded.
BOOL DllExport IsPSSBoot(BOOL *Boot)
    Sets Boot to TRUE if the drive is the boot device, otherwise sets Boot to FALSE.
BOOL DllExport PartitionCount(ULONG *PartitionCount)
    Sets the PartitionCount to the number of partitions on the Genesis drive.
BOOL DllExport GetCurrentPartition(ULONG *PartitionNumber)
    Sets PartitionNumber to the current partition in use on the Genesis drive.
BOOL DllExport SetPartition(ULONG PartitionNumber)
    Sets the current partition to the partition number passed in PartitionNumber.
BOOL DllExport WriteProtect(BOOL Protect)
    Sets or removes write protection on the current partition. Protect = TRUE will write protect the
    drive.
BOOL DllExport GetWriteProtection(BOOL *WriteProtection)
    Returns write protection status of the current partition. If WriteProtection is TRUE the drive is
    write protected.
BOOL DllExport IsDriverLoaded()
    Returns TRUE if the driver is loaded. Returns FALSE if the driver is not loaded.
BOOL DllExport GetGenesisDriveLetter(BYTE *pDriveLetter)
    Returns the drive letter assigned to the Genesis drive. This is returned in pDriveLetter.
BOOL DllExport ShowGenesisDriveLetter(BOOL LetterOn)
    LetterOn = TRUE : The drive letter is visible, LetterOn = FALSE : The letter is not visible.
The following two functions relate to "Pinging" the removable media to ascertain if the media is present
and if it is Genesis media. The status of the media is reported through Windows events.
There are four events set (created) in the DLL:
    1.  GenesisYes   when triggered signals that genesis media is present.
    2.  GenesisNo    when triggered signals that genesis media is not present.

TABLE 19-continued

```
    3.  NoCart      when triggered signals that no media is present.
    4.  GenError    when triggered signals that an error has occurred.
A calling app should open the event:
    HANDLE hGenesisYesEvent = OpenEvent(SYNCHROMZE, FALSE,"GenesisYes"); and then,
    in a thread, do a WaitForSingleObject on the event.
The two ping functions are as follows:
BOOL DllExport StartPing(BOOL InitPing, int TimeDelay = 0, int HA = 0, nt TargetID = 0, int LUN = 0)
    This function is used to "Ping" a removable drive to see if it has genesis media in it. The
    parameters passed in are:
        InitPing   TRUE to begin pinging, FALSE to stop.
                   If false, all other parameters are ignored and can be NULL.
        TimeDelay  The time in seconds to delay between pings.
        HA         The SCSI host adapter number.
        TargetID   The SCSI ID
        LUN        The SCSI Logical Unit Number.
    If pinging is already initiated, this works like a PingDrive and returns the current status of the
    removable media.
    If the function is successful it returns TRUE, otherwise FALSE.
BOOL DllExport PingDrive()
    Causes the next ping of the removable media to return its status. The status of removable media is
    normally reported only when the state of the media changes. This function changes the state of
    the media to NOTINITIALIZED. The next ping cycle then reports the status of the media.
    If pinging is not initiated, the function will return FALSE. If it is successful it will return TRUE.
Void DllExport  SetGenesisDriveLetter(BYTE DriveLetter)
    Sets the drive letter for the Genesis drive. The drive letter is passed in DriveLetter. If the drive
    letter cannot be changed (for example, if the drive letter passed in is already used) no changes are
    made.
NT Only:
BOOL DllExport SetRegEntries()
    Sets up the registry entries in
(HKEY_LOCAL_MACHINE\SYSTEM\CURRENT_CONTROL_SET\Services\PSS\Config).
    Assumes that the driver is installed. It gets the status of all drives on the system and sets up the
    registry entries for each drive. It also rearranges the drive letters of the non-PSS drives to be
    consecutive while honoring all user assigned drive letters. This function requires that the driver
    does NOT move drive letters if there is no registry entry.
    If the registry is set up successfully, the function returns TRUE, otherwise FALSE.
BOOL DllExport DelRegEntries()
    Removes the registries in:
(HKEY_LOCAL_MACHINE\SYSTEM\CURRENT_CONTROL_SET\Services\PSS\Config).
    Values Config and Files are removed.
BOOL DllExport HideGDL()
    Hides all of the drive letters that may be assigned to a Genesis drive and moves the remaining
    drive letters down to be continuous if they are not user assigned.
BOOL DllExport UnlockDrive(BOOL UL)
    Removes write protection and allows I/O to the physical device (NT partition 0). The I/O access
    is normally not allowed to the physical drive by default.
```

Referring back to FIG. 5A, the SpareTire Launch Wizard 304 is in communication with a drive repair suite 324. The drive repair suite 324 is the mechanism by which minor hard drive failures can be repaired to avoid complete replacement of the failed hard drive. The drive repair suite 324 will be initiated only after a failure has occurred with the host computer system's hard drive and a boot to the peripheral storage device has occurred. The drive repair suite 324 is capable of performing a master boot record (MBR) boot sector repair, file system repair, a media scan for defects, and virus scans. The MBR boot sector repair is performed when a hard drive is no longer bootable because its MBR or boot sector has become corrupt. In such a case, the data is still intact, but the drive is no longer bootable. By repairing the MBR, the drive can once again become bootable.

Additionally, the file system repair may include checking an existing file system structure. This advantageously provides an added level of advanced user functionality. If the file system is corrupt, then an attempt can be made to fix it by examining the file system data structures and performing sanity checks. If a fix is possible, then the user will be notified of such and the fix will be attempted. However, in certain circumstances, if the file system is corrupt, then the drive will generally have to be reformatted. The drive repair suite 324 is also capable of communicating with an operating system's ScanDisk™ program. The ScanDisk™ program can verify the media on the hard drive to determine its condition. In some cases, bad sectors can be mapped out.

A backup restore engine 326 is also provided in communication with the SpareTire Launch Wizard 324. The SpareTire Launch Wizard 324 may then access the backup restore engine 326 to copy those files that are stored in the peripheral storage device media back to a repaired host computer hard drive. As mentioned above, the backup restore engine 326 is responsible for handling the file copying process from the user's source drives to the peripheral storage device media as well as from the storage device media to the user's hard drive. During the initial backup to the peripheral storage device, the data is first passed through an anti-virus module 330 to prevent copying of infected items. Once the virus scan has been completed, the information is verified before being transferred to the peripheral storage device media.

Also provided is a Genesis E-mail Notification Object (GENO), which is responsible for sending an e-mail notification to the computer support staff when the computer system goes down, and the SpareTire Launch Wizard 304 is initiated.

As mentioned above, a partition session selector driver 310 is also provided. The partition session selector driver 310 is in communication with the Preparation Wizard 302 to enable it to select each partition of the peripheral storage device media one at a time, after it has been partitioned by the drive preparation object 308. In this embodiment, the ability to select one of the partitions is needed when there is more than one partition associated with the hard drive(s). For example, if the user has a hard drive with two partitions, C: and D:, and a CD-ROM is E:, then the Genesis drive will be assigned F:. Even though the Genesis drive will have two partitions, one for C: and one for D:, it will be viewed as only one partition (i.e., partition F:). The partition session selector driver 310 functionality will be described in greater detail below with reference to FIGS. 10B through 10E.

Figure 6A:
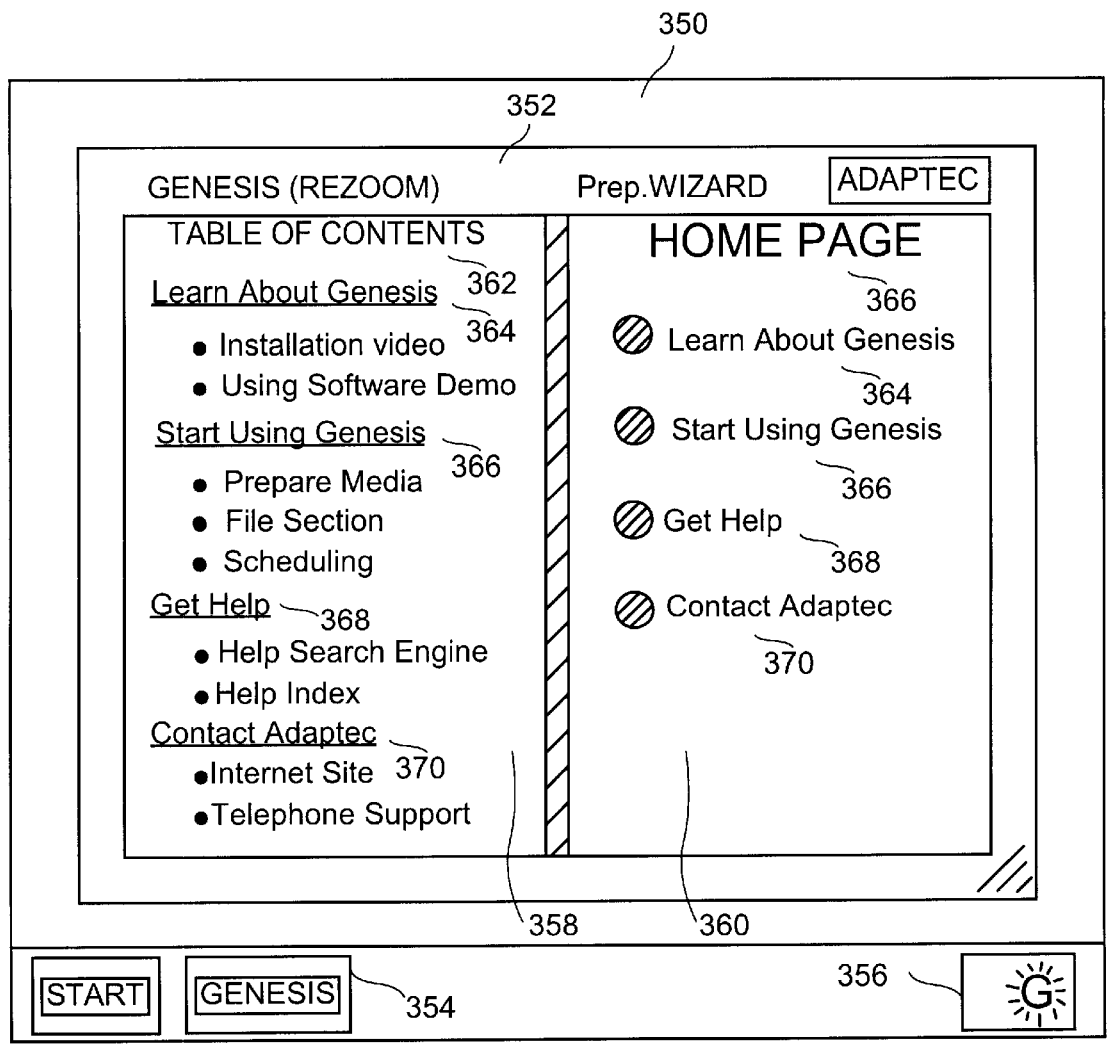
FIG. 6A shows a computer screen illustrating a Genesis Preparation wizard graphical user interface in accordance with one embodiment of the present invention.

FIG. 6A shows a computer screen 350 illustrating a Genesis Preparation Wizard graphical user interface 352 in accordance with one embodiment of the present invention. Upon the installation of the Genesis software, the Preparation Wizard graphical user interface 352 will be presented to the user in a Web page look and feel environment. This Web page look and feel environment will enable the user to learn about the features in Genesis quickly and to start using the Genesis product. The Preparation Wizard graphical user interface 352 is shown having a first frame 358 that includes a table of contents 362, and a second frame 360 that includes a home page 366.

In the table of contents 362, several links are provided including, by way of example, a Learn About Genesis link 364, a Start Using Genesis link 366, a Get Help link 368, and a Contact Adaptec link 370. For exemplary purposes only, the Learn About Genesis link 364 may include an installation video and a software demo. The Start Using Genesis link 366 may include sub-menus for preparing the media, selecting files, and scheduling. The Get Help link 368 may include a help search engine, and a help index to assist the user during the preparation process. In addition, the Contact Adaptec link 370 may include a link to Adaptec's Internet site, and a telephone support directory.

Once the Preparation Wizard graphical user interface 352 is used to install the Genesis software and prepare the peripheral storage device media to be a Genesis-enabled media, the intelligent Genesis backup protection system will run in the background. In this manner, the user operating the intelligent Genesis backup protection system will notice only a small icon 356 that may be displayed in a task bar of a Windows (i.e., 95, 98, etc.) or Windows NT (i.e., 3.51, 4.0, 5.0, etc.) platform. Also, when the preparation wizard graphical user interface 352 is activated, the task bar may also include a link 354 to the Genesis program when in a minimized state. Of course, in other operating systems such as, for example, an Apple Computer OS and a UNIX OS, the program may also operate in the background to avoid interrupting a user during normal use.

Upon being enabled, the intelligent Genesis backup protection system will remain in that active state until a failure to the user's hard drive occurs. At that point, the system BIOS will inform the user that an error has occurred with the computer system's hard drive, and the Adaptec BIOS will provide the user with an option to boot the computer system from the peripheral storage device media.

Figure 6B:
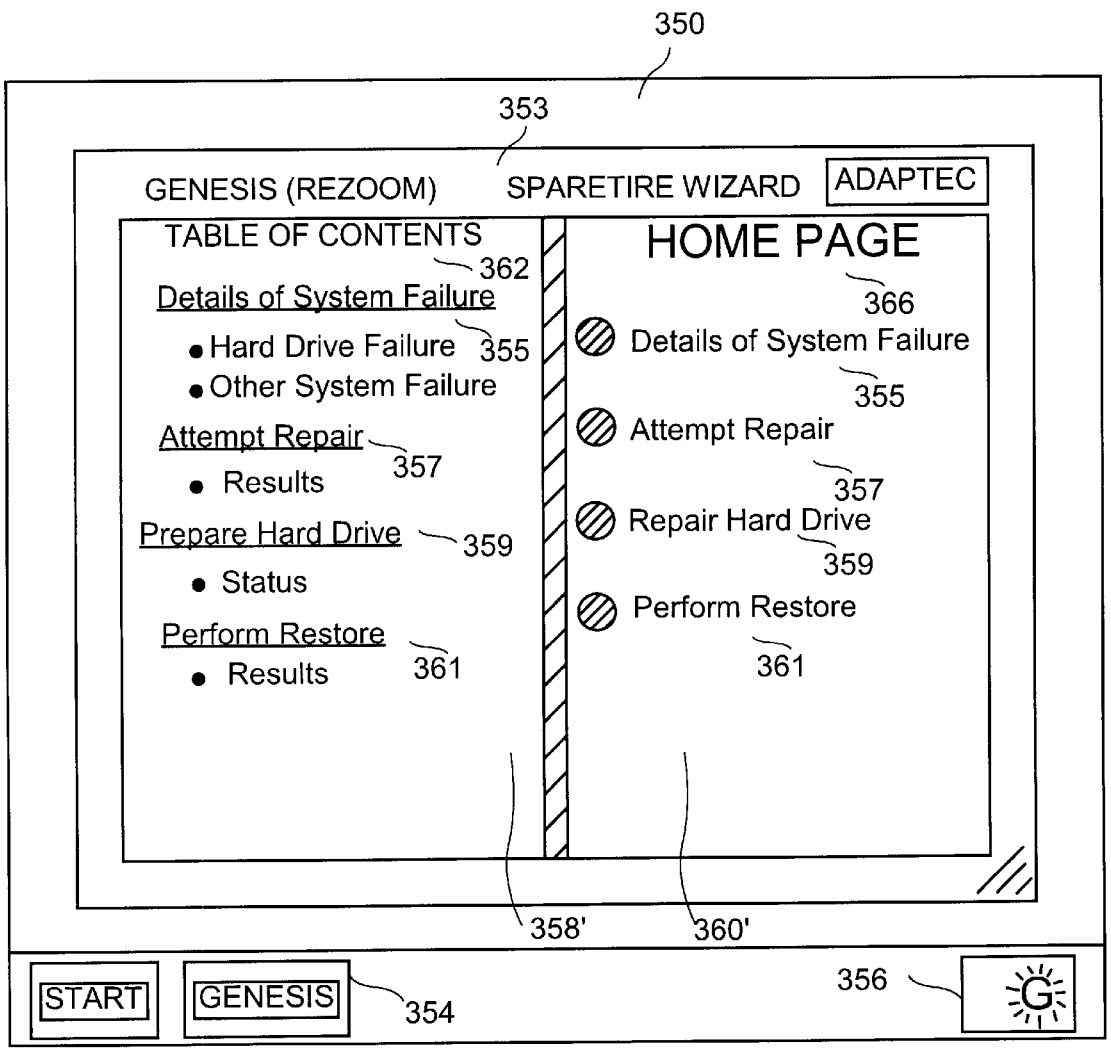
FIG. 6B shows a computer screen illustrating a Genesis SpareTire wizard graphical user interface in accordance with one embodiment of the present invention.

Next, a SpareTire Wizard graphical user interface 353 will be provided to the user as shown in FIG. 6B. Upon launching the SpareTire Wizard 353, a simple-to-use Web page look and feel user interface is provided to the user for ease of use. In this example, the SpareTire Wizard graphical user interface 353 is divided into a first frame 358' and a second frame 360'. In the first frame 358', a Table of Contents 362 is provided. From here, the user may select a Details of System Failure link 355, an Attempt Repair Link 357, a Repair Hard Drive link 359, or a Perform Restore link 361.

Upon selecting any one of the aforementioned links, the user will be provided with more information on performing the desired task. On the other hand, the user may desire to continue working from the peripheral storage device media until the computer support personnel assists in repairing the system failure.

FIGS. 7 through 16 provide a more detailed description of the method operations associated with installing the intelligent Genesis backup protection system, preparing the media of the peripheral storage device to be a Genesis-enabled media, scheduling the intelligent backup increments, creating a SpareTire, launching the SpareTire, booting to the peripheral storage drive after failure to continue working, and performing a restore operation.

Figure 7:
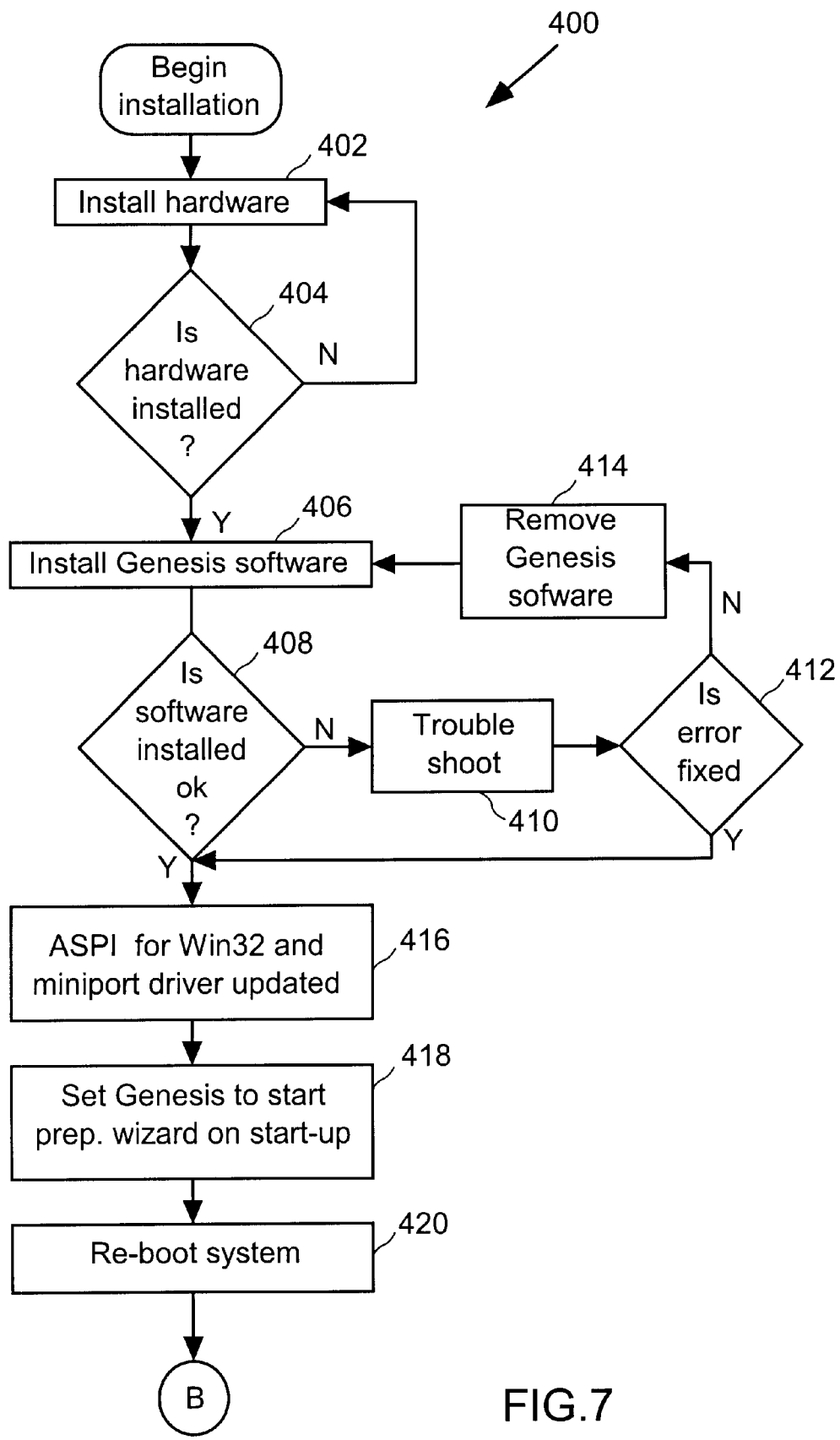
FIGS. 7 and 8 illustrate a more detailed description of the method operations performed during the installation of the Genesis hardware and software in accordance with one embodiment of the present invention.

Reference is now made to FIG. 7 where the installation process 400 of the intelligent Genesis backup protection system is described in accordance with one embodiment of the present invention. The method begins at an operation 402 where the hardware is installed. The hardware includes a SCSI host adapter, a peripheral storage device, and a SCSI cable (or bus) that interconnects the peripheral storage device to the SCSI host adapter. In a preferred embodiment, the SCSI host adapter is preferably an Adaptec host adapter that has a special BIOS which enables booting to a SCSI peripheral storage device even when an EIDE drive is installed in the host computer.

Once the hardware is installed in operation 402, the method proceeds to a decision operation 404. In decision operation 404, it is determined whether the hardware is installed. If the hardware has not been installed, then the method proceeds back to operation 402. On the other hand, if the hardware is installed, then the method proceeds to an operation 406 where the Genesis software is installed. Upon installation, the method proceeds to a decision operation 408 where it is determined whether the software is installed properly. If the software is not installed properly, then the method proceeds to an operation 410 where troubleshooting is performed. Once troubleshooting is performed, the method proceeds to a decision operation 412 where it is determined whether the error is fixed.

If the error is not fixed, then the method will proceed to an operation 414 where the Genesis software is removed from the host computer system. Once the Genesis software is removed from the host computer system, the method proceeds back to the installation operation 406 where the Genesis software is re-installed. On the other hand, if it is determined that the error is fixed in operation 412, then the method will proceed to an operation 416. Likewise, if it is determined in operation 408 that the software is installed properly, then the method will also proceed to operation 416. In operation 416, an ASPI for Win32 and an ASPI for a Miniport driver is updated. Once the update is performed, the method proceeds to an operation 418 where Genesis will start the Preparation Wizard upon startup.

Figure 8:
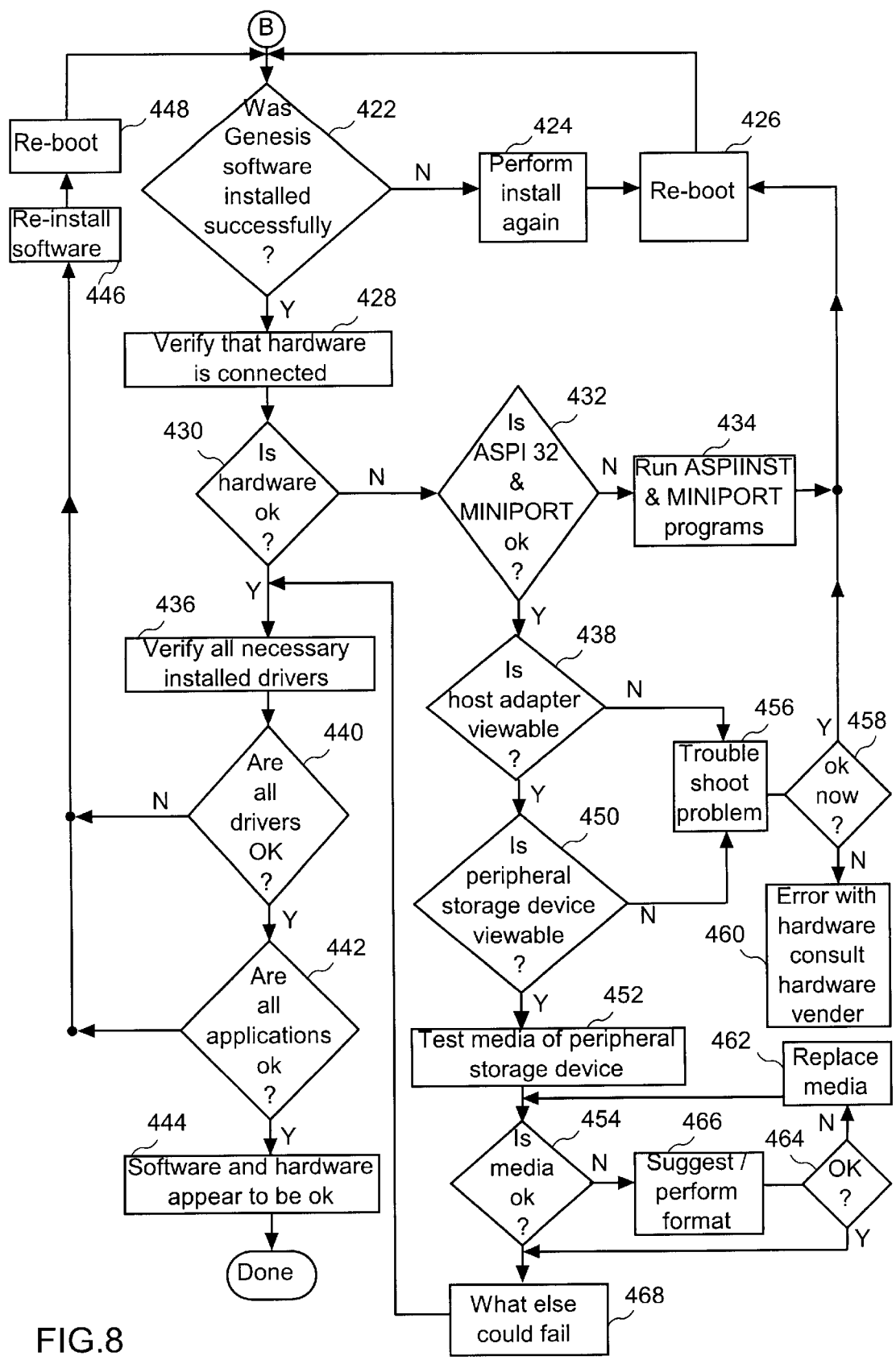

At this point, the method proceeds to an operation 420 where the system is re-booted and then proceeds to a pointer B. With reference to FIG. 8, the method now proceeds to a decision operation 422 where it is determined if the Genesis software is installed properly. If it is not installed properly, then the method will proceed to an operation 424 where the installation is performed again, and then a re-boot is performed in operation 426 before the method reverts back to operation 422. When it is determined that the Genesis software is installed successfully, the method will proceed to an operation 428. In operation 428, a verification is performed to determine whether the hardware is connected. Next, the method will proceed to a decision operation 430 where it is determined whether the hardware is O.K. If the hardware is not O.K., then the method will proceed to a decision operation 432 where it is determined whether the ASPI for Win32 and the ASPI for the Miniport driver are O.K.

If the ASPI for either Win32 or the Miniport driver is not O.K., then the method will proceed to an operation 434. In operation 434, at least one of an ASPI INST program and a Miniport program is run. Upon running the at least one of the ASPI INST and Miniport programs, the operation reverts back to operation 426 where the computer is re-booted. However, if it is determined in operation 432 that the ASPI for Win32 and the ASPI for the Miniport driver are O.K., then the method will proceed to an operation 438. In operation 438, it is determined whether the host adapter is viewable by the host computer system. If the host adapter is not viewable, then the method proceeds to an operation 456 where the problem is troubleshooted.

Next, the method proceeds to a decision operation 458 to determine whether the host adapter is now viewable. If the host adapter is viewable, then the method will proceed back to operation 426 where the computer is re-booted. On the other hand, if it is determined that the host adapter is viewable in operation 438, then the method will proceed to an operation 450 where it is determined whether the peripheral storage device is viewable. If the peripheral storage device is not viewable, then the method will proceed back to operation 456 where the problem is troubleshooted. The method will then proceed back to decision operation 458 to determine whether the problem is now O.K. If the problem is O.K., then the method will return back to operation 426 where the computer is re-booted. However, if it is determined at any point at operation 458 that the problem is not O.K., then the method will proceed to an operation 460 where it is determined that an error has occurred with the hardware and the user is suggested to consult a specific hardware vendor.

Returning again to decision operation 450, if it is determined that the peripheral storage device is viewable, then the method will proceed to an operation 452. In operation 452, the media of the peripheral storage device is tested. The method then proceeds to a decision operation 454 where it is determined whether the media is O.K. If the media is not O.K., then the method will proceed to an operation 466 where it is suggested that a reformat of the media be performed. At this point, the method will proceed to a decision operation 464 where it is determined whether the media is now O.K. If the media is not O.K., then the method will proceed to an operation 462 where the media is replaced.

However, if it is determined that the media is O.K. in operation 454, or if the media is O.K. after a reformat, then the method will proceed to an operation 468 where it is determined whether anything else could fail. Referring now back to decision operation 430, if it is determined that the hardware is O.K., then the method will proceed to an operation 436 where a verification of all necessary install drivers is performed. Once the verification is performed in operation 436, the method proceeds to a decision operation 440. In operation 440, it is determined whether all drivers are O.K. If any driver is not O.K., then the method will proceed to an operation 446 where a re-install of the Genesis software is performed. Once the software is re-installed, the method will proceed to an operation 448 where the computer is re-booted and the method proceeds back to decision operation 422.

On the other hand, if it is determined in operation 440 that all drivers are O.K., then the method will proceed to a decision operation 442 where it is determined whether all applications are O.K. If all applications are not O.K., then the method will again proceed back up to operations 446, 448, and 422 and back down to operation 442. Once all applications are O.K., the method will proceed to an operation 444 where the software and hardware are determined to be O.K., and the installation process will be done.

Figure 9:
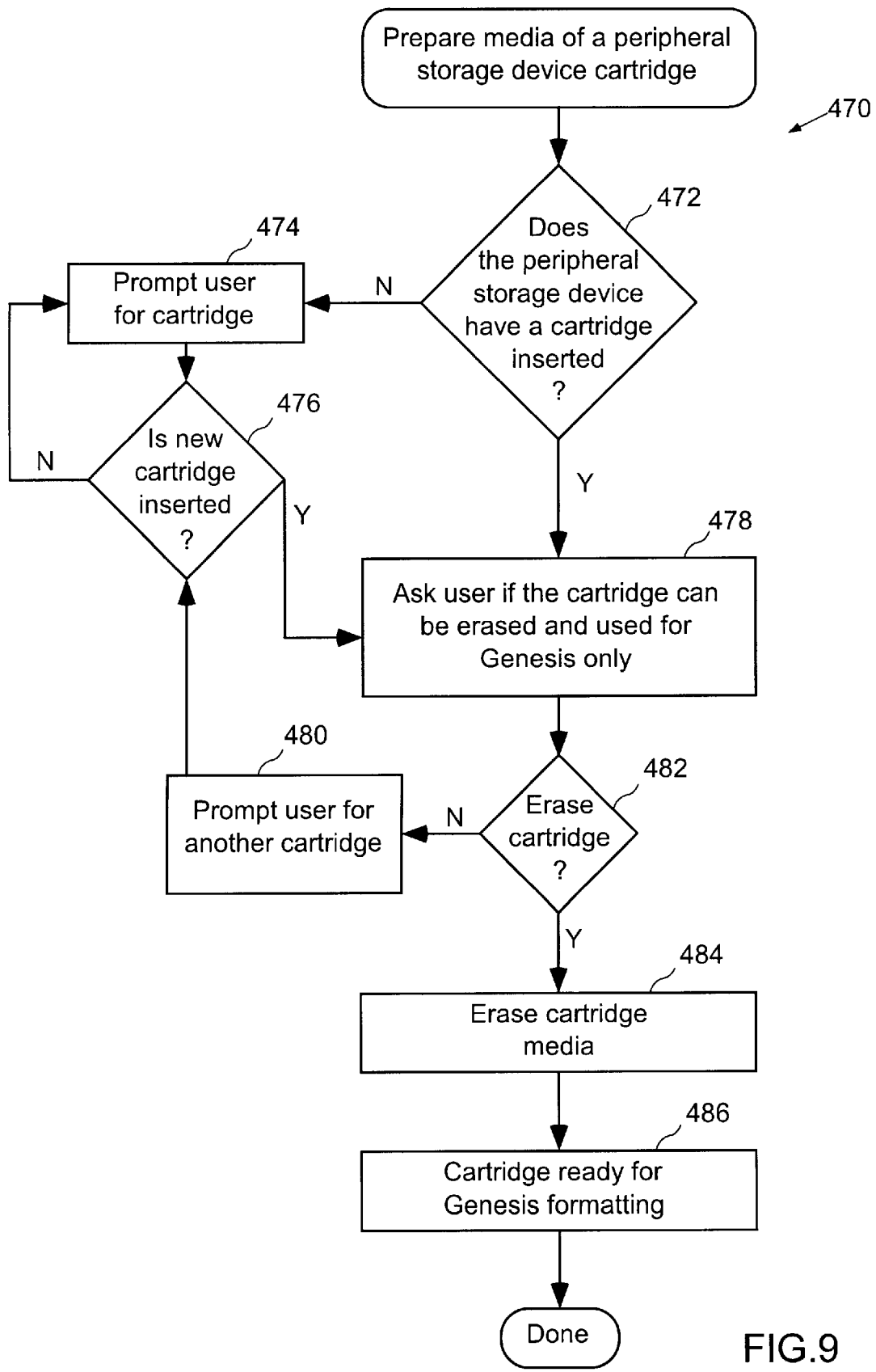
FIG. 9 shows a detailed flowchart diagram illustrating the method operations performed in preparing a media of a peripheral storage device cartridge in accordance with one embodiment of the present invention.

FIG. 9 shows a detailed flowchart diagram 470 illustrating the method operations performed in preparing a media of a peripheral storage device cartridge in accordance with one embodiment of the present invention. In this embodiment, the cartridge is preferably one that has the capability of storing a large amount of data and being inserted into a peripheral storage device, such as a Jaz™ drive. The method now begins at an operation 472 where it is determined whether the peripheral storage device has a cartridge inserted therein.

If the cartridge is not inserted, then the Preparation Wizard graphical user interface 352 will inform the user in operation 474 that the cartridge is not inserted and one should be placed into the peripheral storage device. The method then proceeds to a decision operation 476 where it is determined whether the cartridge that was inserted into the peripheral storage device is new. If the cartridge is not new, then the user will be prompted to insert a new cartridge in operation 474. Once a new cartridge is inserted, the method will proceed to a decision operation 478 where the user is asked whether the cartridge media may be erased and used for Genesis purposes only. The method now proceeds to a decision operation 482 where it is determined whether the cartridge may be erased.

If the cartridge may not be erased, then the method will proceed to an operation 480 where the user is prompted to insert another cartridge that may be erased. If the cartridge may be erased, then the method will proceed from decision operation 482 to an operation 484. In operation 484, the cartridge media is erased. Once the cartridge media has been erased, the method will proceed to an operation 486 where the cartridge media will be ready for Genesis formatting and the method will be done. Of course, if the peripheral storage device is a second hard disk drive, then there will be no need to detect whether a cartridge is inserted, and the hard disk drive media will already be in condition for Genesis formatting.

Figure 10A:
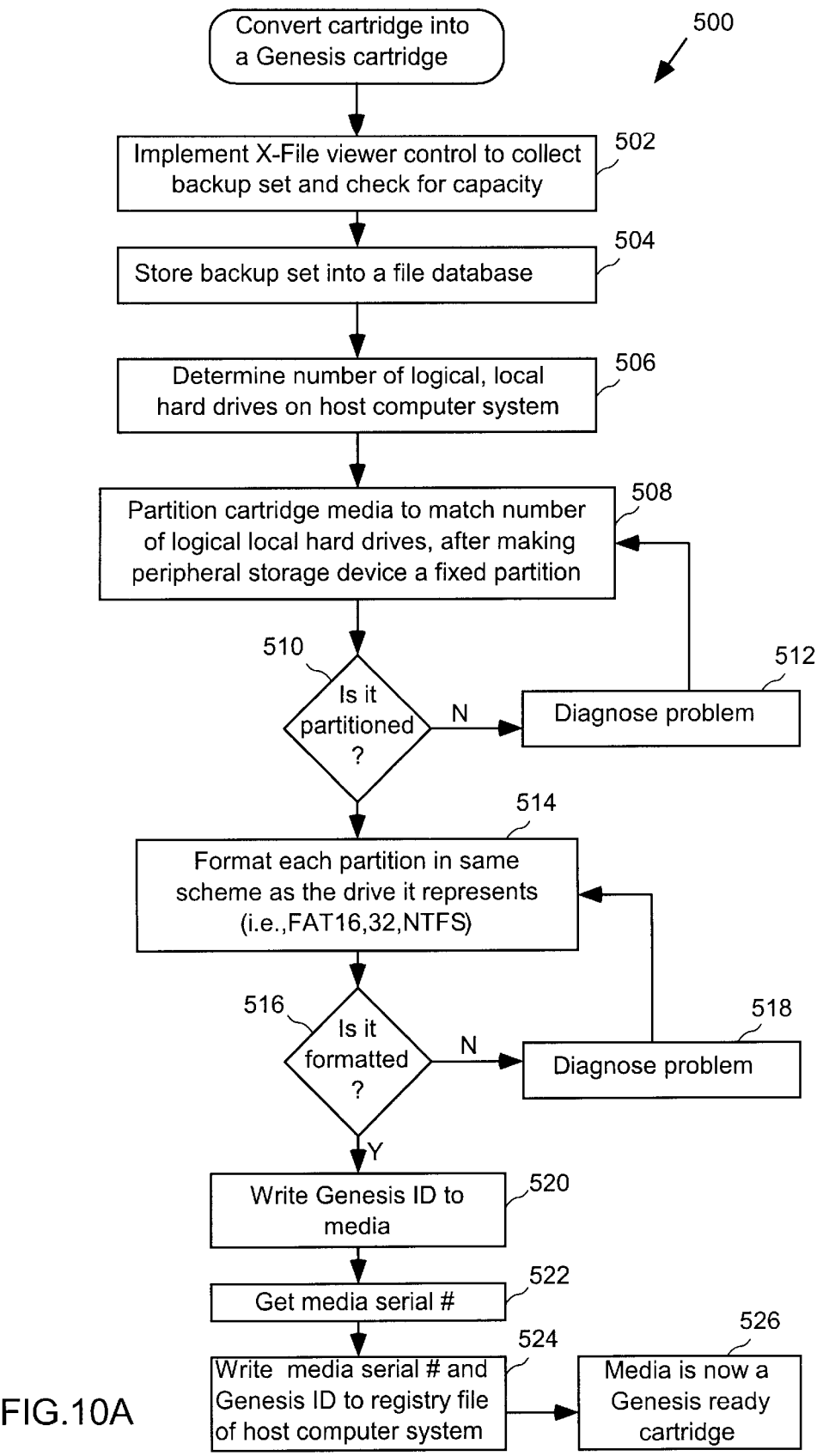
FIG. 10A illustrates the method operations performed in converting a cartridge into a Genesis enabled cartridge in accordance with one embodiment of the present invention.

FIG. 10A illustrates the method operations 500 performed in converting a cartridge into a Genesis-enabled cartridge in accordance with one embodiment of the present invention. In general, when a cartridge has been converted into a Genesis-enabled cartridge, the host adapter BIOS will automatically detect that a Genesis-enabled cartridge has been inserted into the peripheral storage device, and the intelligent Genesis backup protection system will thereby be enabled.

The method begins at an operation 502 where the Preparation Wizard graphical user interface will allow the user to use the X-file viewer control to collect a backup set and check for capacity. As described above with reference to FIG. 5B, the X-file viewer control will allow the user to select certain programs, files, and folders that will be automatically and incrementally backed up by the intelligent Genesis backup system. Of course, certain files such as, for example, boot files and operating system files, will be automatically selected by default to enable booting to the peripheral storage device in the event a system error occurs within the host computer system.

In one embodiment, when the media of the Genesis cartridge holds about two gigabytes (GB) of data, the capacity monitor 312 of FIG. 5B will preferably allow the user to collect data that will fill only about 80 percent of the drive (i.e., about 1.6 GB). In this manner, once the intelligent Genesis backup system is functioning, additional space will be available for saving data during routine use, adding new programs, etc. Once the X-file viewer control has been implemented to collect the backup set and check for capacity in operation 502, the method will proceed to an operation 504. In operation 504, the backup set will be stored into a file database. The file database is essentially a list of all of the programs, files, and data selected by the user to be part of the backup set, and will also provide a pointer to the location in the user's host computer system hard drive.

Once the file database has been generated in operation 504, the method will proceed to an operation 506 in which the number of logical local drive partitions present on the host computer system is determined. Once the number of logical local drives currently present on the host computer system has been determined in operation 506, the method will proceed to an operation 508 where the cartridge media is partitioned to match the number of logical local drives on the host computer system, after making the peripheral storage device a fixed partition. Next, the method proceeds to a decision operation 510 where it is determined whether the cartridge media is partitioned. If the cartridge media is not partitioned correctly, then the method will proceed to an operation 512 where the problem is diagnosed and partitioning is performed again.

If the cartridge media is partitioned correctly, then the method will proceed to an operation 514 where each partition is formatted in the same scheme as the drive it represents. For example, the formatting may be performed in FAT-16, FAT-32, and NTFS schemes. Once each partition has been formatted in operation 514, the method proceeds to a decision operation 516 where it is determined whether each partition is formatted. If each partition is not formatted correctly, then the method will proceed to an operation 518 where the problem is diagnosed and formatting is performed again in operation 514. Once it is determined in operation 516 that the drive is properly formatted, the method will proceed to an operation 520 where a Genesis ID signature is written to the media. After the Genesis ID has been written to the media in operation 520, the media serial number is retrieved by Preparation Wizard 302 of the Genesis software in operation 522.

At this point, the media serial number that was retrieved and the Genesis ID are written to the registry file of the host computer system in operation 524. In this manner, when a cartridge having the Genesis signature ID and the media serial number is inserted into the peripheral storage device, the computer system will know that the intelligent Genesis backup protection system is ready for use. Next, the method will proceed to an operation 526 where the media is now a Genesis-ready cartridge. Of course, any number of cartridges may be formatted in the same way as described with reference to method 500.

FIGS. 10B through 10E illustrate the partitioning performed on the peripheral storage device media when one or more logical local drives are present on the host computer system in accordance with one embodiment of the present invention. For example, FIG. 10B shows an exemplary host computer system A having logical partitions A:, B:, C:, and D:. In this example, partition A: is for a floppy drive, partition B: is for a hard drive, partition C: is for a CD-ROM drive, and partition D: is for a peripheral storage device which may be used for the intelligent Genesis backup protection system. Thus, when only one logical local drive is present on the host computer system A, the peripheral storage device media has one partition and matches that of the host computer system A as shown in FIG. 10C.

FIG. 10D illustrates an example of when a host computer system B has more than one logical local drive partition. In this case, the peripheral storage device media, which is given a fixed logical drive letter F: in the host computer system B, is partitioned into three separate partitions as shown in FIG. 10E. In this example, logical partitions B: and C: are associated with a physical hard disk 527 and logical partition D: is associated with a physical hard disk 528. The resulting partitions in the peripheral storage device are shown in FIG. 10E as partitions 527a, 527b, and 528. In addition, each partition within the peripheral storage device media is sized such that a percentage of the partition is unused to enable the user to use the peripheral storage device media normally after the host computer system has experienced a failure.

Figure 11A:
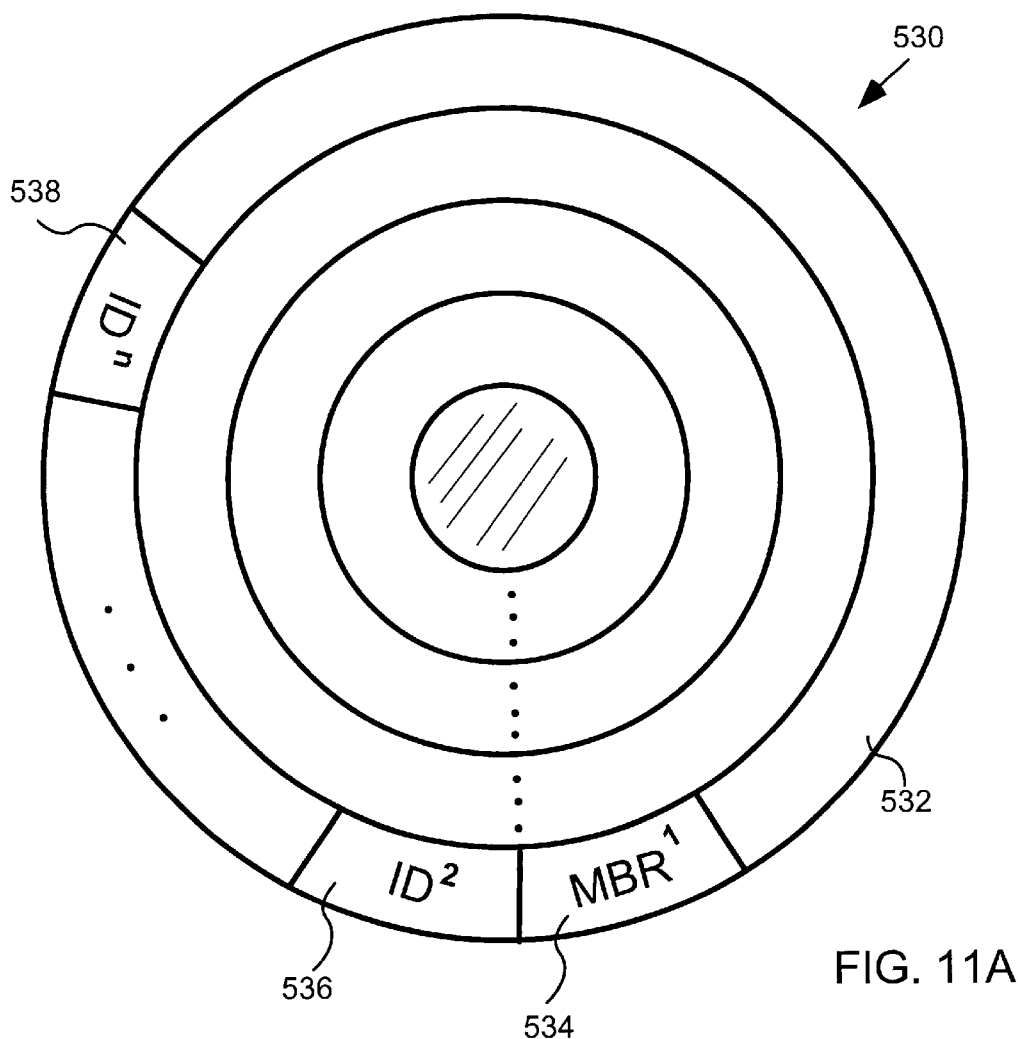
FIG. 11A shows a top view of a first selected track and selected sectors of a peripheral storage device media accordance with one embodiment of the present invention.
Figure 11B:
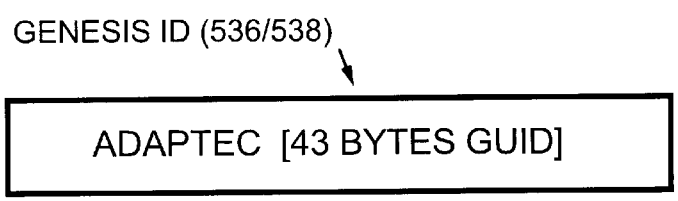
FIGS. 11B–11C show the format of a Genesis ID that is written to one or more sectors of the peripheral storage device media and the data that is written to the system's registry file in accordance with one embodiment of the present invention.

FIG. 11A shows a top view of a peripheral storage device media (cartridge media or hard disk media) 530 in accordance with one embodiment of the present invention. In this example, a first track 532 is shown having a master boot record (MBR) in a first sector 534, and a Genesis ID 536 in a second sector following the MBR sector 534. For redundancy purposes, at least a second Genesis ID is written in another sector 538 along the same first track 532. FIG. 11B shows an exemplary Genesis ID signature 536, 538, which will preferably include the designation of Adaptec followed by 43 bytes of a global unique identifier (GUID).

Figure 11C:
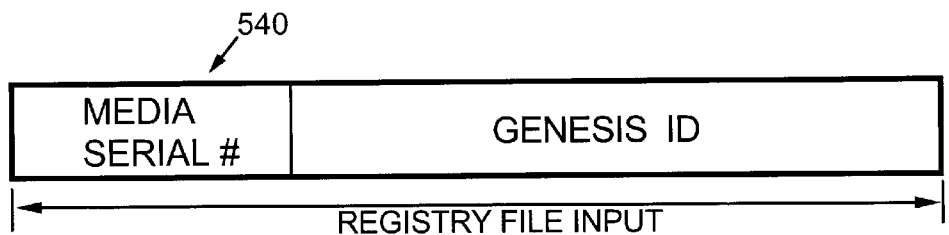

After the Genesis IDs 536, 538 have been written onto the peripheral storage device media 530 in the first track 532, Preparation Wizard 302 of the intelligent Genesis backup protection system will obtain a unique serial number for the peripheral storage device media 530, which is typically located in the media's Z-sector. As shown in FIG. 11C, the media serial number 540 that was retrieved from the Z-sector of the peripheral storage device media 530 will be combined with the Genesis ID to define a single registry file input. In this manner, each time a new peripheral storage device media is prepared to be a Genesis-enabled media, its unique media serial number and the Genesis ID will be placed into the host computer's system registry file and peripheral storage device media. Thus, any time the peripheral storage device media that has been formatted to be a Genesis-enabled media is inserted into a peripheral storage device, the intelligent Genesis backup protection system will be ready to be enabled.

Figure 12:
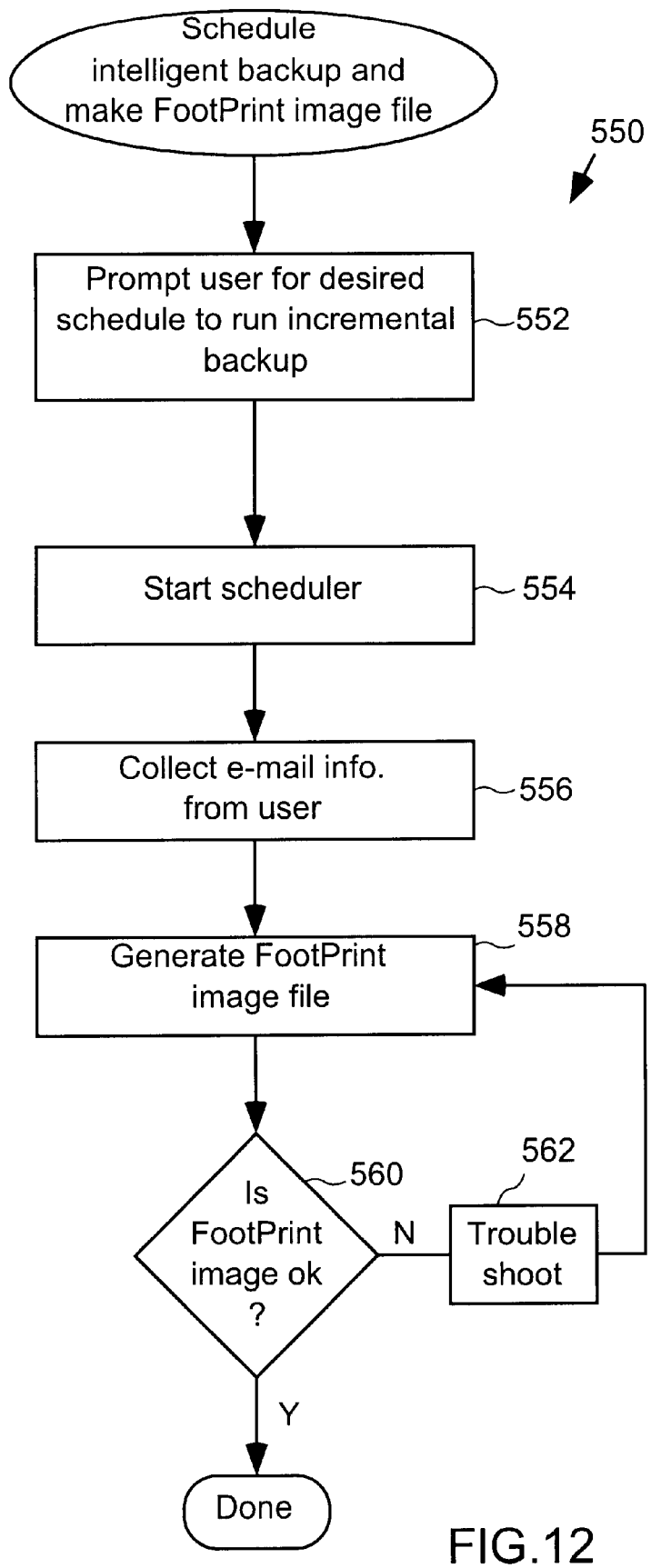
FIG. 12 shows a flowchart diagram illustrating the method operations performed in scheduling the intelligent backup and making a footprint snapshot in accordance with one embodiment of the present invention.

FIG. 12 shows a flowchart diagram 550 illustrating the method operations for scheduling the intelligent backup and making a footprint snapshot, i.e., a FootPrint image file, in accordance with one embodiment of the present invention. The method begins at an operation 552 where the user is prompted to input a desired schedule to run the incremental backup operations. Once the user has input the desired schedule, the method will proceed to an operation 554 where the scheduler is started. Once the scheduler has been started, the method proceeds to an operation 556 where an e-mail address for computer support personnel is collected from the user. As mentioned above, this e-mail address is used by the intelligent Genesis backup system to notify the appropriate computer support personnel that the user has experienced a system failure.

Next, the method proceeds to an operation 558 in which a FootPrint image file of the host computer system's data is generated as described above. Once the FootPrint image file of the computer system's data has been generated, the method will proceed to a decision operation 560 where it is determined whether the FootPrint image file is O.K. If the FootPrint image file is not O.K., then the method will proceed to an operation 562 in which troubleshooting is performed and then the FootPrint image file is generated again in operation 558. Once it is determined that the FootPrint image file is O.K., the method for scheduling the intelligent backup and making a footprint snapshot is done.

Figure 13:
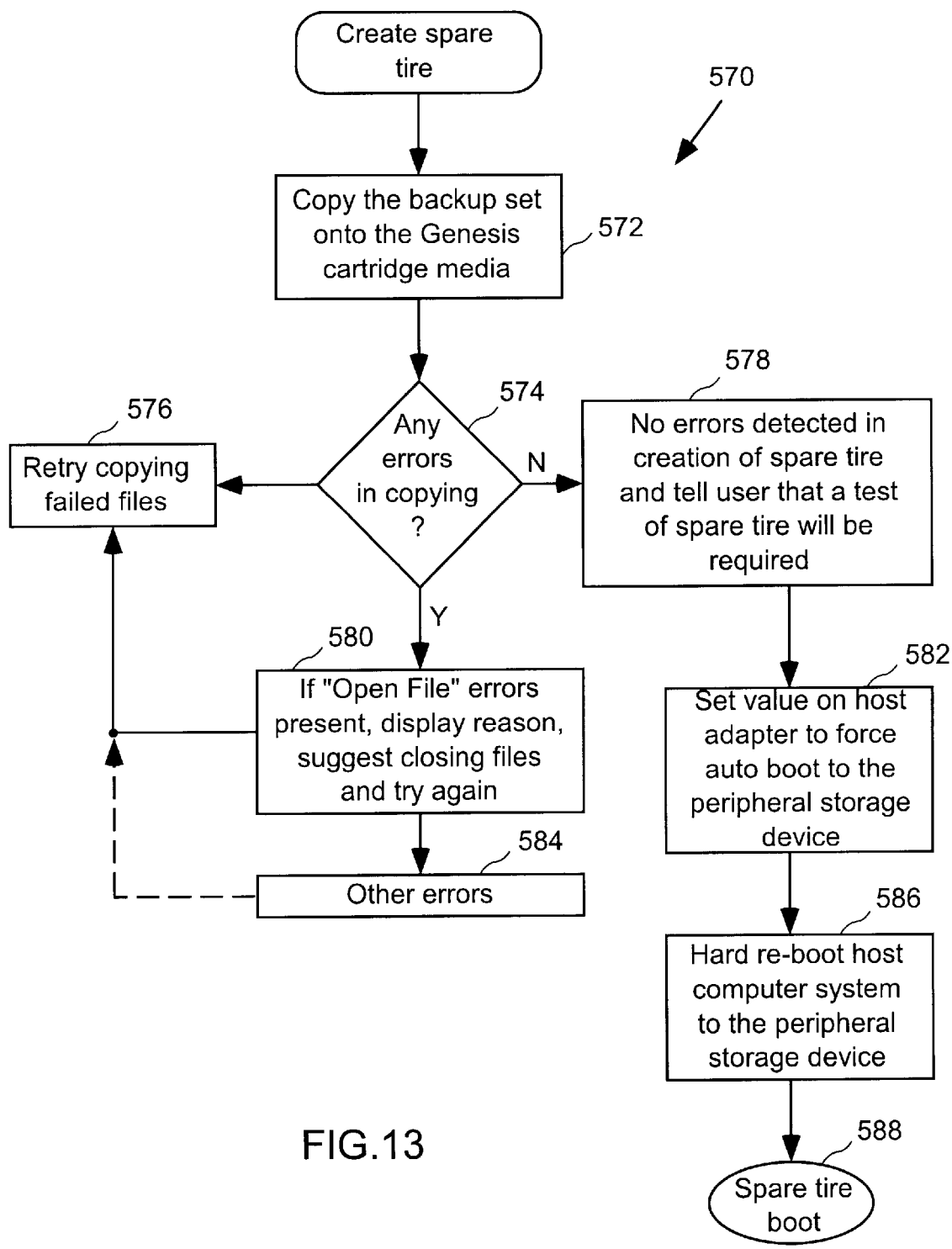
FIG. 13 shows a flowchart diagram detailing the method operations performed in creating a SpareTire in accordance with one embodiment of the present invention.

FIG. 13 shows a flowchart diagram 570 detailing the method operations performed in creating a SpareTire in accordance with one embodiment of the present invention. The method begins at an operation 572 where the backup set selected by the user (including the default backup set) is copied from the host computer system's logical hard drives onto the Genesis cartridge media that has been previously partitioned to match the logical local drives of the host computer system. Once the backup set has been copied onto the Genesis cartridge media in operation 572, the method will proceed to an operation 574.

In operation 574, it is determined whether there were any errors in performing the copying operation. If copying errors are detected, then the method will proceed to an operation 580. In operation 580, if errors occurred due to "open files," then the reason for such errors will be displayed and the user will be prompted to close the files and retry the copying operation. At that point, the method will proceed to an operation 576 where a copying operation will again be performed to copy the failed files. If the copying problem was not the result of open files, then the method will proceed to an operation 584 in which other errors are detected and displayed to the user.

After the user has corrected such problems, the method will again proceed to operation 576 where the copying is again re-tried for those failed files. Once there are no errors in the copying operation, the method will proceed to an operation 578 where the user is informed that a test of the SpareTire will be required. Next, the method will proceed to an operation 582 where a value is set on the host adapter to force an automatic boot to the peripheral storage device. As mentioned above, the host adapter is preferably an Adaptec host adapter or one capable of processing a special Adaptec BIOS, which allows the peripheral storage device to be the boot device, even when an EIDE device is connected to the computer system. Next, the method will proceed to an operation 586 where a hard re-boot of the host computer system is performed to the peripheral storage device. At that point, the SpareTire will be booted at operation 588, and the creation of the SpareTire will be complete.

Figure 14:
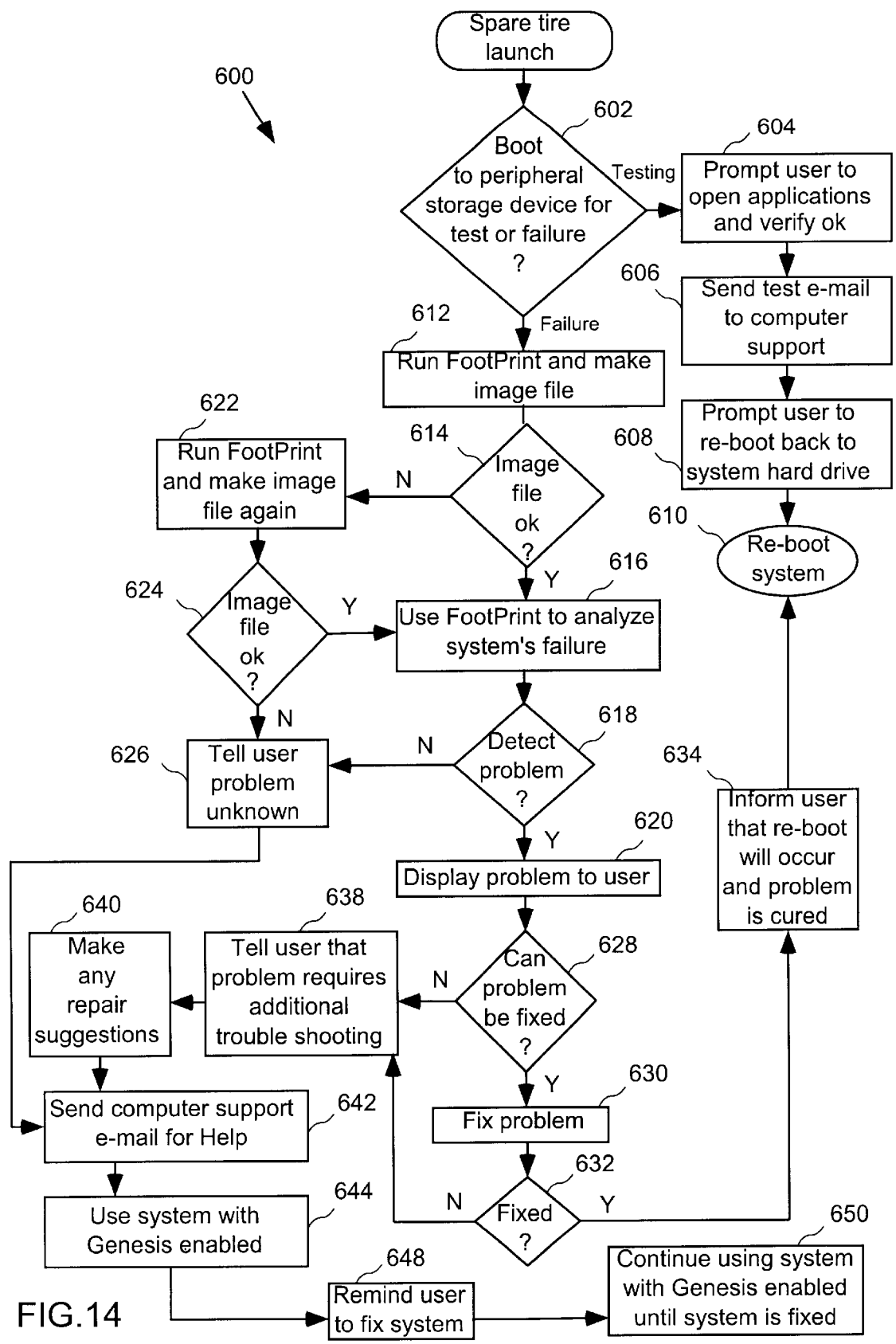
FIG. 14 shows a detailed flowchart diagram illustrating the method operations performed in launching the SpareTire software in accordance with one embodiment of the present invention.

FIG. 14 shows a detailed flowchart diagram 600 illustrating the method operations performed in launching the SpareTire software in accordance with one embodiment of the present invention. The method begins at an operation 602 where it is determined whether booting to the peripheral storage device is performed for test purposes or in the case of a system failure. If booting to the peripheral storage device is performed for testing purposes, then the method will proceed to an operation 604 where the user is prompted to open applications and verify that they have been successfully copied to the peripheral storage device media in the order that they should have appeared if the user were working from the host computer system's hard drive.

The method will then proceed to an operation 606 in which a test e-mail message is sent to the appropriate computer support personnel. Once the e-mail test has been performed, the method will proceed to an operation 608 where the user is prompted to re-boot back to the system hard drive and then the testing aspect of the method will end at operation 610 where the system is re-booted.

On the other hand, in operation 602, the booting to the peripheral storage device may occur because a failure has occurred within the host computer system. In one embodiment, if the user desires to boot from the peripheral storage device, then the user will be instructed by the Adaptec BIOS to press "<CTRL><J>." At that point, the method will proceed to an operation 612 where a FootPrint image file will be generated to provide an image of the host computer system files after the failure has occurred (i.e., the after image).

The method will then proceed to an operation 614 where it is determined whether the Footprint image file is O.K. If the FootPrint image file is not O.K., then the method will proceed to an operation 622 where the FootPrint module will be run to generate another image file after the system failure has occurred. At this point, the method will proceed to a decision operation 624 where it is again determined whether the FootPrint image file is O.K. If the FootPrint image file is not O.K., then the method will proceed to an operation 626 where the user is informed that the problem is unknown. On the other hand, if it is determined that the FootPrint image file is O.K. in either operation 624 or 614, then the method will proceed to an operation 616. In operation 616, the FootPrint image file is used to determine the nature of the system failure. Next, the method will proceed to operation 618 where it is determined whether the problem can be detected. If the problem cannot be detected, then the method will proceed to an operation 626 where the user is informed that the problem is unknown.

From operation 626, the method will proceed to an operation 642 where the computer support personnel is sent an e-mail message indicating that a system failure has occurred and that the problem is unknown. However, if it is determined in operation 618 that the problem can be detected, then the method will proceed to an operation 620 where the problem is displayed to the user. The method then proceeds to a decision operation 628 where it is determined whether the problem can be fixed. If the problem cannot be fixed, then the method will proceed to an operation 638 where the user is informed that the problem requires additional troubleshooting.

However, if the problem can be fixed, then the method will proceed from operation 628 to operation 630 in which the problem is fixed. The method now proceeds to a decision operation 632 where it is determined whether the problem is fixed. If the problem is not fixed, then the method will also proceed to operation 638 where the user is informed that the problem requires additional troubleshooting. However, if it is determined in operation 632 that the problem is fixed, then the method will proceed to an operation 634 where the user is informed that a re-boot will occur and that the problem will be cured. At that point, the method will proceed to operation 610 where the system is re-booted and normal operation can continue from the host computer system's hard drive.

In the event the user is informed that the problem requires additional troubleshooting in operation 638, the method will proceed to an operation 640 where any repair that can be performed is suggested. From here, the method will proceed to operation 642 where the computer support personnel is sent an e-mail message notifying them that a failure has occurred within the host computer system, and information regarding the possible system failures is provided. At that point, the method will proceed to an operation 644 where the system can continue to be used from the Genesis-enabled peripheral storage device. In this manner, the user's productivity will not suffer while the computer system's hard drive is being repaired.

While the user is using the computer system with the Genesis-enabled peripheral storage device, the method will proceed to an operation 648 where the user is reminded to fix the problem. The method now proceeds to an operation 650 where the user may continue using the computer system with the Genesis-enabled peripheral storage device until the computer system is fixed, and the SpareTire launch of method 600 will be complete.

Figure 15:
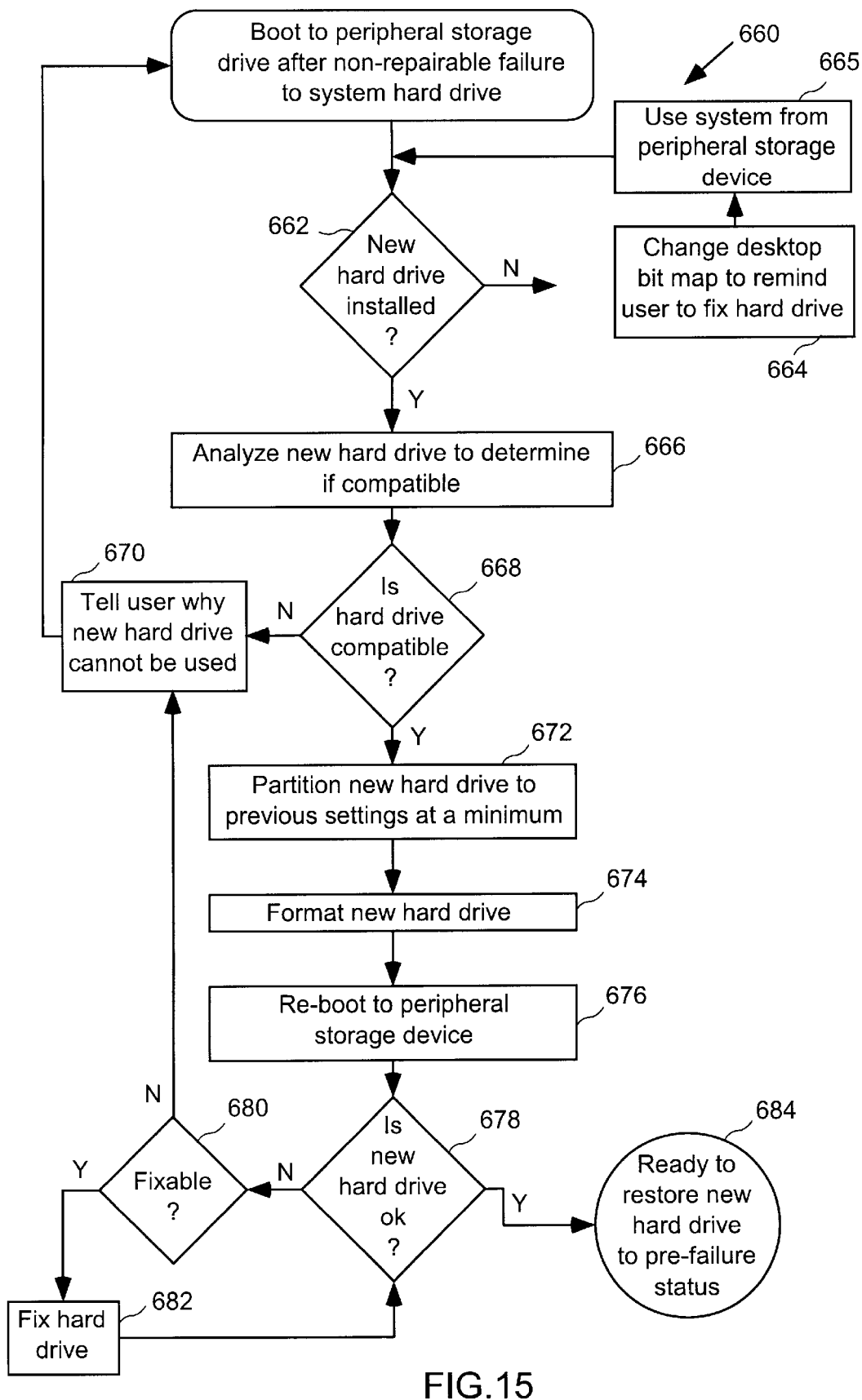
FIG. 15 shows a flowchart diagram illustrating the method operations performed in booting to the peripheral storage device after a non-repairable failure has occurred to the host computer system's hard drive in accordance with one embodiment of the present invention.

FIG. 15 shows a flowchart diagram 660 illustrating the method operations performed in booting to the peripheral storage device after a non-repairable failure has occurred to the host computer system's hard drive. The method begins at a decision operation 662 where it is determined whether a new hard drive has been installed. If a new hard drive has not been installed, then the method will proceed to an operation 664 where the desktop bitmap is changed to remind the user that the system's hard drive should be repaired. This reminder essentially provides the user with a warning that the intelligent Genesis backup protection system is only a temporary fix and, therefore, that appropriate action should be taken to fix the host computer system's hard drive permanently. The method now proceeds to an operation 665 where the system is used from the peripheral storage device, and the method will revert to operation 662.

When a new hard drive has been installed, the method will proceed to an operation 666 in which it is determined whether the new hard drive is compatible with the host computer system. If it is determined in operation 668 that the new hard drive is not compatible, then the user will be informed that a compatible hard drive needs to be installed in operation 670. When a new hard drive that is compatible is installed, the method will proceed to an operation 672 where the new hard drive is partitioned to match the settings that existed in the host computer's hard drive before the system failure. Next, the method will proceed to an operation 674 where the new hard drive is formatted. After formatting, the method proceeds to an operation 676 where a re-boot to the peripheral storage device is performed. At this point, it is determined in operation 678 whether the new hard drive is O.K. If the new hard drive is not O.K., then the method will proceed to an operation 680 where it is determined whether the new hard drive can be fixed.

If the new hard drive can be fixed, then the method will proceed to an operation 682 where the hard drive is fixed. On the other hand, if the new hard drive cannot be fixed, then the method will proceed to an operation 670 where the user is informed that the new hard drive cannot be used and another hard drive needs to be installed. If the new hard drive is determined to be O.K. in operation 678, then the method will proceed to operation 684 where the user is informed that the new hard drive is ready to be restored to its pre-failure status. Of course, if the user added or modified programs or files when working off of the Genesis-enabled media, those changes will also be copied to the new hard drive(s).

Figure 16:
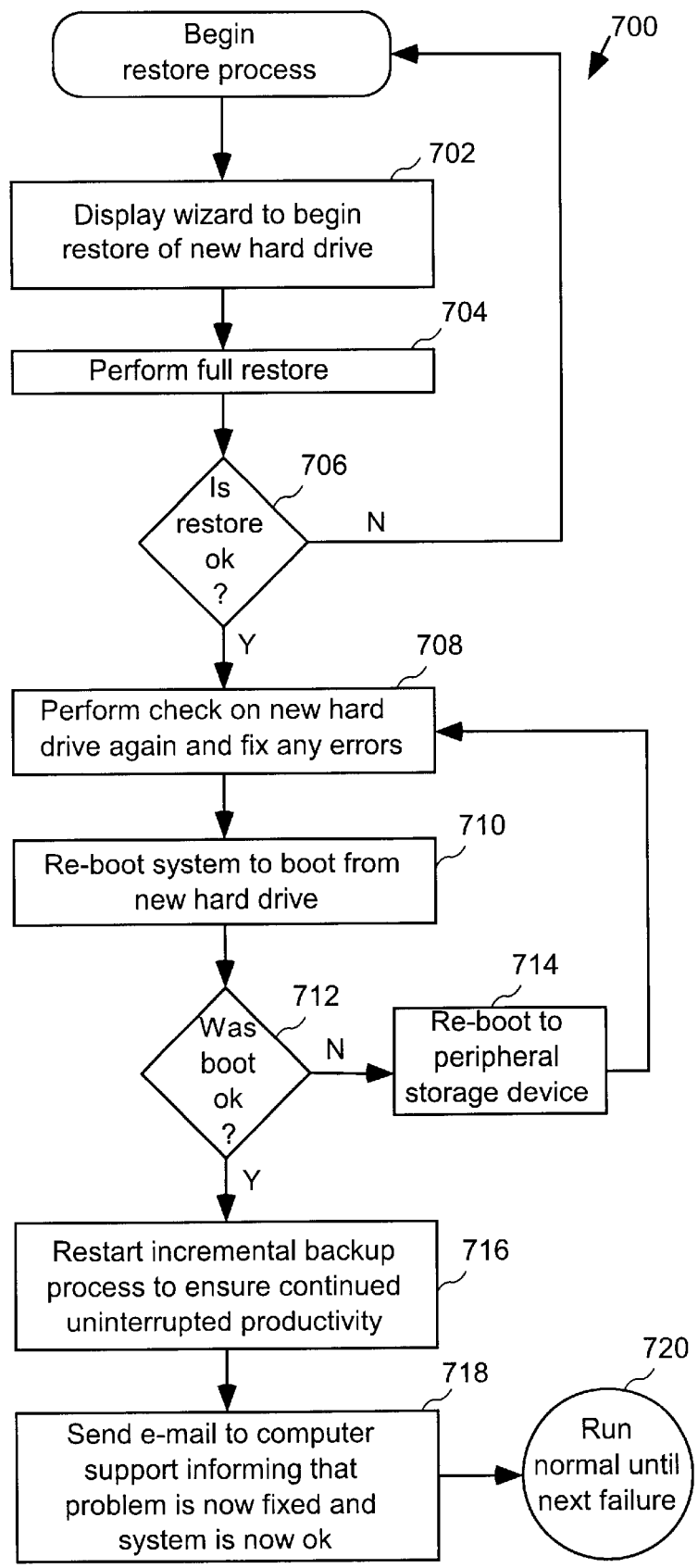
FIG. 16 shows a flowchart diagram illustrating the method operations performed during a restore process in accordance with one embodiment of the present invention.

FIG. 16 shows a flowchart diagram 700 illustrating the method operations performed during a restore process in accordance with one embodiment of the present invention. The restore process begins at an operation 702 where the SpareTire Wizard graphical user interface 353 (see FIG. 6B) is displayed to the user to enable restoration of the new or repaired hard drive(s). Specifically, as shown in frame 360', the user is provided with an option to select the Perform Restore link 361, which launches the full restoration of the new hard drive performed in operation 704. The method now proceeds to a decision operation 706 where it is determined whether the restoration was performed satisfactorily. If the restoration did not restore the hard drive to a satisfactory condition, then the method will proceed back to the beginning of the restoration process.

On the other hand, if the restoration is determined to be O.K. in operation 706, then the method will proceed to an operation 708 where a check is performed on the new hard drive and any errors are fixed. The method now proceeds to an operation 710 where the system is booted from the new hard drive. Now, the method proceeds to a decision operation 712 where it is determined whether the boot to the new hard drive is O.K. If the boot is not performed properly, then the method proceeds to an operation 714 where a re-boot to the peripheral storage device is performed and the method proceeds back to operation 708. If the boot to the restored hard drive is O.K., then the method will proceed from operation 712 to operation 716 where the incremental backup process is restarted to ensure continued uninterrupted productivity in case another failure occurs to the new hard drive(s).

The method then proceeds to an operation 718 in which an e-mail message is sent to the computer support personnel informing them that the problem has now been fixed and that the system is now running O.K. Now, the method proceeds to an operation 720 where the user may run off of the new restored hard drive(s) until another failure occurs and re-booting to the peripheral storage device is again required.

The invention may employ various computer-implemented operations involving data stored in computer systems to drive computer software, including application programs, operating system programs, peripheral device drivers, etc. These operations are those requiring physical manipulation of physical quantities. Usually, though not necessarily, these quantities take the form of electrical or magnetic signals capable of being stored, transferred, combined, compared, or otherwise manipulated. Further, the manipulations performed are often referred to using terms such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 17:
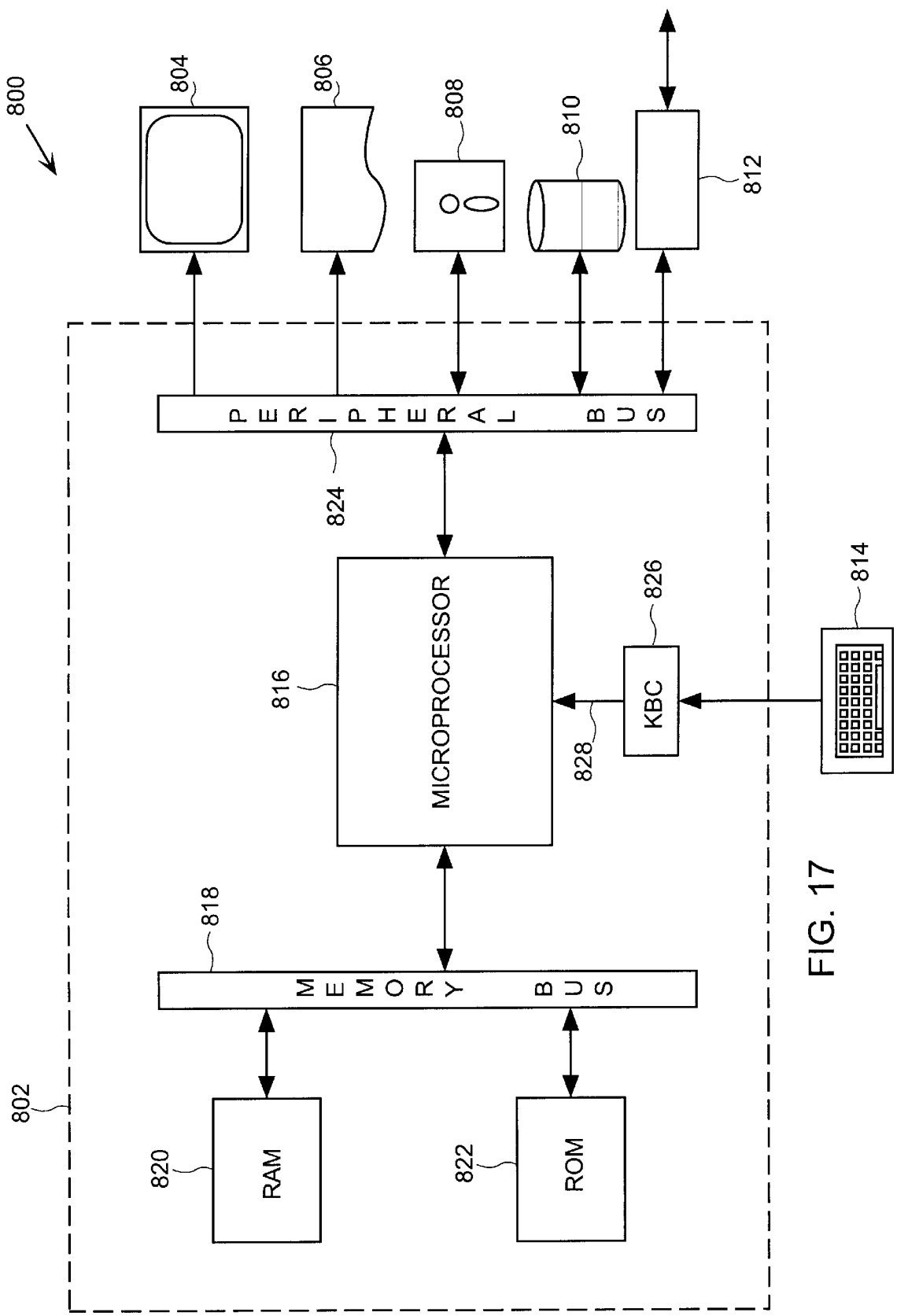
FIG. 17 is a block diagram of an exemplary computer system for carrying out at least, part the processing according to the invention.

FIG. 17 is a block diagram of an exemplary computer system 800 for carrying out the processing according to the invention. The computer system 800 includes a digital computer 802, a display screen (or monitor) 804, a printer 806, a floppy disk drive 808, a hard disk drive 810, a network interface 812, and a keyboard 814. The digital computer 802 includes a microprocessor 816, a memory bus 818, random access memory (RAM) 820, read only memory (ROM) 822, a peripheral bus 824, and a keyboard controller 826. The digital computer 800 can be a personal computer (such as an IBM compatible personal computer, a Macintosh computer, or Macintosh compatible computer), a workstation computer (such as a Sun Microsystems or Hewlett-Packard workstation), or some other type of computer.

The microprocessor 816 is a general purpose digital processor which controls the operation of the computer system 800. The microprocessor 816 can be a single-chip processor or can be implemented with multiple components.

Using instructions retrieved from memory, the microprocessor 816 controls the reception and manipulation of input data and the output and display of data on output devices. According to the invention, a particular function of microprocessor 816 is to assist in execution and rendering of the software operations of the intelligent Genesis backup protection system.

The memory bus 818 is used by the microprocessor 816 to access the RAM 820 and the ROM 822. The RAM 820 is used by the microprocessor 816 as a general storage area and as scratch-pad memory, and can also be used to store input data and processed data. The ROM 822 can be used to store instructions or program code followed by the microprocessor 816 as well as other data.

The peripheral bus 824 is used to access the input, output, and storage devices used by the digital computer 802. In the described embodiment, these devices include the display screen 804, the printer device 806, the floppy disk drive 808, the hard disk drive 810, and the network interface 812. The keyboard controller 826 is used to receive input from keyboard 814 and send decoded symbols for each pressed key to microprocessor 816 over bus 828.

The display screen 804 is an output device that displays images of data provided by the microprocessor 816 via the peripheral bus 824 or provided by other components in the computer system 800. The printer device 806 when operating as a printer provides an image on a sheet of paper or a similar surface. Other output devices such as a plotter, typesetter, etc. can be used in place of, or in addition to, the printer device 806.

The floppy disk drive 808 and the hard disk drive 810 can be used to store various types of data. The floppy disk drive 808 facilitates transporting such data to other computer systems, and hard disk drive 810 permits fast access to large amounts of stored data.

The microprocessor 816 together with an operating system operates to execute computer code and produce and use data. The computer code and data may reside on the RAM 820, the ROM 822, or the hard disk drive 810. The computer code and data could also reside on a removable program medium and be loaded or installed onto the computer system 800 when needed. Removable program mediums include, for example, CD-ROM, PC-CARD, floppy disk, and magnetic tape.

The network interface 812 is used to send and receive data over a network connected to other computer systems. An interface card or similar device and appropriate software implemented by the microprocessor 816 can be used to connect the computer system 800 to an existing network and transfer data according to standard protocols.

The keyboard 814 is used by a user to input commands and other instructions to the computer system 800. Other types of user input devices can also be used in conjunction with the present invention. For example, pointing devices such as a computer mouse, a track ball, a stylus, or a tablet can be used to manipulate a pointer on a screen of a general purpose computer.

The invention can also be embodied as computer readable code on a computer readable medium. The computer readable medium is any data storage device that can store data that can be thereafter be read by a computer system. Examples of the computer readable medium include read-only memory, random access memory, CD-ROMs, magnetic tape, and optical data storage devices. The computer readable medium can also be distributed over network-coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. For example, although a preferred type of peripheral storage device is a Jaz™ drive, any type of peripheral storage devices or built-in computer storage devices can be used. In addition, the storage devices can be either physically located next to the computer system itself or remotely networked over, e.g., a local area network (LAN) or the Internet.

In some embodiments, exemplary peripheral-type storage devices may include an extra hard drive(s), a digital video disk (DVD) drive, a CDRW drive, a CDR drive, a Magneto Optical Disk drive, etc. Furthermore, any type of host adapter can be used, regardless of whether it is integrated into a computer's motherboard or is integrated onto a host adapter card. Accordingly, the present embodiments are to be considered as illustrative and not restrictive, and the invention is not to be limited to the details given herein, but may be modified within the scope and equivalents of the appended claims.

What is claimed is:

1. A method for managing a secondary storage device connected to a computer system having a primary storage device, comprising:

hooking a partition session selector device driver in a layered drive structure;

performing an application programming interface call to obtain information related to storage devices connected to the computer system;

trapping the application programming interface call; and communicating with the partition session selector device driver directly via an interface call to manage a user accessible representation of the primary and secondary storage devices.

2. The method of claim 1, wherein the operation of communicating with the partition session selector driver includes obtaining information related to the secondary storage device, and the method further comprises:

obtaining information related to storage devices connected to the computer system from a system registry to compile a complete set of data relating to the physical and logical representations of the primary and secondary storage devices, the complete set of data comprising the information obtained from the application programming interface, the partition session selector device driver, and the system registry.

3. The method of claim 1, wherein the partition session selector device driver is hooked in the layered drive structure before any physical drives.

4. The method of claim 1, wherein the partition session selector device driver is configured to hide the representation of the secondary storage device from a user when the computer system boots from the primary storage device and to hide the representation of the primary storage device from a user when the computer system boots from the secondary storage device.

5. The method of claim 1, wherein the application programming interface call is trapped by the partition session selector device driver.

6. The method of claim 1, wherein the interface call in the operation of communicating with the partition session selector device driver is an IOCTL interface call specific to the partition session selector device driver.

7. The method of claim 1, wherein the secondary storage device is one of a hard drive and a removable media drive.

8. The method of claim 1, wherein the computer system is a personal computer.

9. A method for managing a secondary storage device connected to a computer system having a primary storage device, comprising:
hooking a partition session selector device driver in a layered drive structure;
performing an application programming interface call to obtain information related to storage devices connected to the computer system;
trapping the application programming interface call;
communicating with the partition session selector device driver directly via an interface call to manage a user accessible representation of the primary and secondary storage devices; and
obtaining information related to storage devices connected to the computer system from a system registry to compile a complete set of data relating to the physical and logical representations of the primary and secondary storage devices, the complete set of data comprising the information obtained from the application programming interface, the partition session selector device driver, and the system registry.

10. The method of claim 9, wherein the operation of communicating with the partition session selector driver includes obtaining information related to the secondary storage device.

11. The method of claim 9, wherein the partition session selector device driver is hooked in the layered drive structure before any physical drives.

12. The method of claim 9, wherein the partition session selector device driver is configured to hide the representation of the secondary storage device from a user when the computer system boots from the primary storage device and to hide the representation of the primary storage device from the user when the computer system boots from the secondary storage device.

13. The method of claim 9, wherein the application programming interface call is trapped by the partition session selector device driver.

14. The method of claim 9, wherein the interface call in the operation of communicating with the partition session selector device driver is an IOCTL interface call specific to the partition session selector device driver.

15. The method of claim 9, wherein the secondary storage device is one of a hard drive and a removable media drive.

16. The method of claim 9, wherein the computer system is a personal computer.

17. A computer readable media containing program instructions for managing a secondary storage device connected to a computer system having a primary storage device, the computer readable media comprising:
program instructions for hooking a partition session selector device driver in a layered drive structure;
program instructions for performing an application programming interface call to obtain information related to storage devices connected to the computer system;
program instructions for trapping the application programming interface call; and
program instructions for communicating with the partition session selector device driver directly via an interface call to manage a user accessible representation of the primary and secondary storage devices.

18. The computer readable media of claim 17, wherein the program instructions for communicating with the partition session selector driver include program instructions for obtaining information related to the secondary storage device, and the computer readable media further comprises:
program instructions for obtaining information related to storage devices connected to the computer system from a system registry to compile a complete set of data relating to the physical and logical representations of the primary and secondary storage devices, the complete set of data comprising the information obtained from the application programming interface, the partition session selector device driver, and the system registry.

19. The computer readable media of claim 17, wherein the partition session selector device driver is hooked in the layered drive structure before any physical drives.

20. The computer readable media of claim 17, wherein the partition session selector device driver is configured to implement program instructions for hiding the representation of the secondary storage device from a user when the computer system boots from the primary storage device and to implement program instructions for hiding the primary storage device from the user when the computer system boots from the secondary storage device.

21. The computer readable media of claim 17, wherein the application programming interface call is trapped by the partition session selector device driver.

22. The computer readable media of claim 17, wherein the interface call in the program instructions for communicating with the partition session selector device driver is an IOCTL interface call specific to the partition session selector device driver.

23. The computer readable media of claim 17, wherein the secondary storage device is one of a hard drive and a removable media drive.

24. The computer readable media of claim 17, wherein the computer system is a personal computer.

* * * * *